(12) United States Patent
Chang et al.

(10) Patent No.: US 12,055,698 B2
(45) Date of Patent: Aug. 6, 2024

(54) LENS ASSEMBLY

(71) Applicants: Sintai Optical (Shenzhen) Co., Ltd., ShenZhen (CN); Asia Optical Co., Inc., Taichung (TW)

(72) Inventors: Hsi-Ling Chang, Taichung (TW); Chun-Yang Yao, Taichung (TW); Ming-Huang Tseng, Taichung (TW); Chien-Hung Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 565 days.

(21) Appl. No.: 17/363,399

(22) Filed: Jun. 30, 2021

(65) Prior Publication Data
US 2022/0026691 A1    Jan. 27, 2022

(30) Foreign Application Priority Data
Jul. 24, 2020   (TW) ................................ 109125119

(51) Int. Cl.
G02B 9/64    (2006.01)
G02B 15/14   (2006.01)
G02B 27/00   (2006.01)

(52) U.S. Cl.
CPC ........... G02B 15/1455 (2019.08); G02B 9/64 (2013.01); G02B 27/0025 (2013.01)

(58) Field of Classification Search
CPC .... G02B 15/1455; G02B 15/145; G02B 9/64; G02B 27/0025; G02B 13/0065

USPC .......................................................... 359/676
See application file for complete search history.

(56) References Cited

U.S. PATENT DOCUMENTS

| | | | |
|---|---|---|---|
| 7,295,380 B2 | 11/2007 | Sueyoshi | |
| 7,417,673 B2 | 8/2008 | Wright et al. | |
| 9,377,606 B2 | 6/2016 | Nakahara | |
| 9,906,732 B2 | 2/2018 | Irie et al. | |
| 10,157,439 B2 | 12/2018 | Nash et al. | |
| 10,281,687 B2 | 5/2019 | Shi | |
| 2004/0179245 A1* | 9/2004 | Mihara | G02B 15/143 358/514 |
| 2005/0275948 A1* | 12/2005 | Sueyoshi | G02B 13/009 359/676 |

(Continued)

FOREIGN PATENT DOCUMENTS

| | | |
|---|---|---|
| CN | 101257579 A | 9/2008 |
| CN | 101924879 A | 12/2010 |

(Continued)

Primary Examiner — William R Alexander
(74) Attorney, Agent, or Firm — McClure, Qualey & Rodack, LLP

(57) ABSTRACT

A lens assembly includes a first lens group, a second lens group, a third lens group, a fourth lens group, and a fifth lens group, all of which are arranged in order from a first side to a second side along an axis. The first lens group is with negative refractive power. The second lens group is with positive refractive power. The third lens group is with refractive power. The fourth lens group is with refractive power. The fifth lens group is with refractive power. The lens assembly further includes a first reflective element disposed between the first lens group and the fifth lens group, wherein the first reflective element includes a first reflective surface.

20 Claims, 34 Drawing Sheets

(56) References Cited

U.S. PATENT DOCUMENTS

| | | | |
|---|---|---|---|
| 2006/0056048 A1* | 3/2006 | Sato | G02B 13/009 359/684 |
| 2006/0274426 A1* | 12/2006 | Sueyoshi | G02B 13/009 359/676 |
| 2007/0139788 A1* | 6/2007 | Watanabe | G02B 15/145 359/681 |
| 2008/0007841 A1* | 1/2008 | Souma | G02B 15/1445 359/680 |
| 2008/0247053 A1* | 10/2008 | Iwasawa | G02B 15/145113 359/676 |
| 2009/0040621 A1 | 2/2009 | Kudo | |
| 2010/0322607 A1* | 12/2010 | Kuroda | G02B 13/009 348/208.11 |
| 2011/0075270 A1* | 3/2011 | Mihara | H04N 23/54 359/691 |
| 2012/0026603 A1* | 2/2012 | Wang | G02B 15/144511 359/686 |
| 2012/0075717 A1* | 3/2012 | Tada | G02B 15/143507 359/684 |
| 2012/0092776 A1* | 4/2012 | Mihara | G02B 15/144 359/683 |
| 2016/0363745 A1 | 12/2016 | Kubota | |
| 2020/0150406 A1* | 5/2020 | Chen | G02B 9/60 |
| 2021/0333515 A1 | 10/2021 | Li et al. | |
| 2021/0333516 A1 | 10/2021 | Li et al. | |
| 2021/0333517 A1 | 10/2021 | Li et al. | |
| 2022/0244509 A1* | 8/2022 | Chang | G02B 17/0896 |

FOREIGN PATENT DOCUMENTS

| | | |
|---|---|---|
| CN | 101185322 B | 2/2012 |
| CN | 103048765 A | 4/2013 |
| CN | 104122660 A | 10/2014 |
| CN | 105068228 A | 11/2015 |
| CN | 107851301 A | 3/2018 |
| CN | 108037578 A | 5/2018 |
| CN | 108983403 A | 12/2018 |
| CN | 105453539 B | 2/2019 |
| CN | 111399179 A | 7/2020 |
| CN | 111399180 A | 7/2020 |
| CN | 111399181 A | 7/2020 |
| EP | 1 788 419 A1 | 5/2007 |
| IN | 101185322 B | 2/2012 |
| JP | 2001318314 | 11/2001 |
| JP | 2004309684 A | 11/2004 |
| JP | 2016-188986 A | 11/2016 |
| KR | 20130089428 A | 8/2013 |
| TW | 200907455 A | 2/2009 |
| TW | 201118413 A | 6/2011 |
| WO | 2004/107010 A1 | 12/2004 |

\* cited by examiner

LENS ASSEMBLY

BACKGROUND OF THE INVENTION

Field of the Invention

The invention relates to a lens assembly.

DESCRIPTION OF THE RELATED ART

The development of optical zoom technology has been quite mature. A large number of optical zoom lenses are used in digital single-lens reflex camera with interchangeable lens and digital non-interchangeable lens camera. Today's thin and light smartphone cannot be equipped with traditional optical zoom lens because the total length of the optical zoom lens is longer and the total length becomes longer as the zoom ratio increases. Therefore, a lens assembly needs a new structure having miniaturization, high resolution, and optical zoom at the same time, in order to meet the requirements of smart phone for optical zoom function.

BRIEF SUMMARY OF THE INVENTION

The invention provides a lens assembly to solve the above problems. The lens assembly of the invention is provided with characteristics of a decreased total lens length, an increased resolution, an optical zoom function, and still has a good optical performance. In addition, the purpose of the present invention is to provide the lens assembly having a zoom control method at the same time. A clear image can be obtained regardless of whether it is at a high zoom ratio or at a low zoom ratio.

The lens assembly in accordance with an exemplary embodiment of the invention includes a first lens group, a second lens group, a third lens group, a fourth lens group, and a fifth lens group, all of which are arranged in order from a first side to a second side along an axis. The first lens group is with negative refractive power. The second lens group is with positive refractive power. The third lens group is with refractive power. The fourth lens group is with refractive power. The fifth lens group is with refractive power. The lens assembly further includes a first reflective element disposed between the first lens group and the fifth lens group, wherein the first reflective element includes a first reflective surface.

In another exemplary embodiment, the lens assembly further includes a first stop disposed between the first lens group and the fifth lens group, wherein the first stop includes an inner circumferential portion and an outer circumferential portion, and the inner circumferential portion and the outer circumferential portion are non-circular.

In yet another exemplary embodiment, the first lens group includes a 1-1 lens which is with negative refractive power and includes a concave surface facing the first side along the axis, the second lens group includes a 2-1 lens which is a biconvex lens with positive refractive power and includes a convex surface facing the first side along the axis and another convex surface facing the second side along the axis, the third lens group includes a 3-1 lens which is with refractive power acid includes a convex surface facing the second side along the axis, the fourth lens group includes a 4-1 lens which is with refractive power and includes a convex surface facing the second side along the axis, the fifth lens group includes a 5-1 lens which is with positive refractive power, the second lens group can move along the axis, the first lens group is fixed, and the third lens group and the fourth lens group are fixed or can move along the axis to perform zooming from a wide-angle end to a telephoto end for the lens assembly, the lens assembly further includes a beam splitter and at least two image sensors, wherein the beam splitter is disposed between the fifth lens group and the second side, the image sensors are disposed on one side of the beam splitter respectively, and the beam splitter splits the visible light into at least two light beams with different bandwidths and the image sensors receive the light beams with different bandwidths respectively, and the second lens group further includes the first stop, wherein the first stop is a variable stop and the 2-1 lens and the first stop are arranged in order from the first side to the second side along the axis.

In another exemplary embodiment, the lens assembly satisfies at least one of the following conditions: $3<TL1/D_{L4}<8$; $0<TL2/D_{L4}<4$; $0<D_{REF}/D_{MAX}<0.5<TL1/TL2<3.5$; $0.1<D_{MAX}/TL1<0.8$; $0.2<D_{MAX}/TL2<1$; $2<TTL/D_{LOBJ}<7$; $4<TTL/D_{LIMG}<10$; $4<TL1/D_{RER}<6$; $1<TL2/D_{REF}<5$; $80<TC23_{WIDE}/TC23_{TELE}<120$; wherein $D_{L4}$ is an effective optical diameter of an object side surface of the 2-1 lens, $D_{REF}$ is an effective optical diameter of the first reflective surface, $D_{MAX}$ is a maximum effective optical diameter of all lenses, TL1 is an interval from an object side surface of the 1-1 lens to the first reflective surface along the axis, TL2 is an interval from the first reflective surface to an image plane along the axis, TTL is an interval from an object side surface of the lens closest to the first side to the image plane along the axis, $Dh_{LOBJ}$ is an effective optical diameter of the object side surface of the lens closest to the first side, $D_{LIMG}$ is an effective optical diameter of an object side surface of the lens closest to the second side, $TC23_{WIDE}$ is an interval from the first lens group to the second lens group along the axis when the lens assembly is at a wide-angle end, and $TC23_{TELE}$ is an interval from the first lens group to the second lens group along the axis when the lens assembly is at a telephoto end.

In yet another exemplary embodiment, the first lens group includes a 1-1 lens which includes a concave surface facing the first side along the axis, the second lens group includes a 2-1 lens which is a biconvex lens and includes a convex surface facing the first side along the axis and another convex surface facing the second side along the axis, the third lens group includes a 3-1 lens which is with refractive power and includes a convex surface facing the second side along the axis, the fourth lens group includes a 4-1 lens which is with refractive power and includes a convex surface facing the second side along the axis, and the fifth lens group includes a 5-1 lens which is with positive refractive power.

In another exemplary embodiment, the first lens group further includes a 1-2 lens disposed between the 1-1 lens and the second lens group, wherein the 1-2 lens is a biconvex lens or a meniscus lens with positive refractive power, the 1-1 lens is a biconcave lens, and the 1-1 lens and the 1-2 lens are arranged in order from the first side to the second side along the axis and the second lens group further includes a 2-2 lens disposed between the first lens group and the 2-1 lens, wherein the 2-2 lens is a meniscus lens with negative refractive power and includes a convex surface facing the first side along the axis and a concave surface facing the second side along the axis, and the 2-2 lens, the 2-1 lens, and the first stop are arranged in order from the first side to the second side along the axis.

In yet another exemplary embodiment, the 1-2 lens is a biconvex lens and includes a convex surface facing the first side along the axis and another convex surface facing the second side along the axis, the third lens group is with positive refractive power and further includes a 3-2 lens disposed between the 3-1 lens and the fourth lens group, wherein the 3-2 lens is a meniscus lens with negative refractive power and includes a concave surface facing the first side along the axis and a convex surface facing the second side along the axis, the 3-1 lens is a biconvex lens with positive refractive power and further includes another convex surface facing the first side along the axis, and the 3-1 lens and the 3-2 lens are arranged in order from the first side to the second side along the axis, the fourth lens group is with negative refractive power, wherein the 4-1 leans is a meniscus lens with negative refractive power and further includes a concave surface facing the first side along the axis, and the fifth lens group is with positive refractive power, wherein the 5-1 lens is a meniscus lens and includes a convex surface facing the first side along the axis and a concave surface facing the second side along the axis.

In another exemplary embodiment, the 1-2 lens is a meniscus lens and includes a convex surface facing the first side along the axis and a concave surface facing the second side along the axis, the third lens group is with negative refractive, power, wherein the 3-1 lens is a meniscus lens with negative refractive power and further includes a concave surface facing the first side along the axis, the fourth lens group is with positive refractive power, wherein the 4-1 lens is a biconvex lens with positive refractive power and further includes another convex surface facing the first side along the axis, and the fifth lens group is with negative refractive power and further includes a 5-2 lens disposed between the fourth lens group and the 5-1 lens, wherein the 5-2 lens is a biconcave lens or a meniscus lens with negative refractive power and the 5-1 lens is a biconvex lens or a meniscus lens.

In yet another exemplary embodiment, the 5-2 lens is a meniscus lens and includes a concave surface facing the first side along the axis and a convex surface facing the second side along the axis and the 5-1 lens is a meniscus lens and includes a concave surface facing the first side along the axis and a convex surface facing the second side along the axis.

In another exemplary embodiment, the 5-2 lens is a biconcave lens and includes a concave surface facing the first side along the axis and another concave surface facing the second side along the axis and the 5-1 lens is a biconvex lens and includes a convex surface facing the first side along the axis and another convex surface facing the second side along the axis.

In yet another exemplary embodiment, the lens assembly further includes a second reflective element disposed between the first side and the first lens group, the second reflective element includes a second reflective surface, and the fifth lens group can move along the axis to perform auto focus.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens group, a second lens group, a third lens group, a fourth lens group, and a fifth lens group. The first lens group which is with negative refractive power. The second lens group which is with positive refractive power. The third lens group which is with refractive power. The fourth lens group which is with refractive power. The fifth lens group which is with refractive power. The first lens group, the second lens group, the third lens group, the fourth lens group, and the fifth lens group are arranged in order from a first side to a second side along an axis. The lens assembly further includes a first reflective element disposed between the first lens group and the fifth lens group, wherein the first reflective element includes a first reflective surface.

Figure 1A:
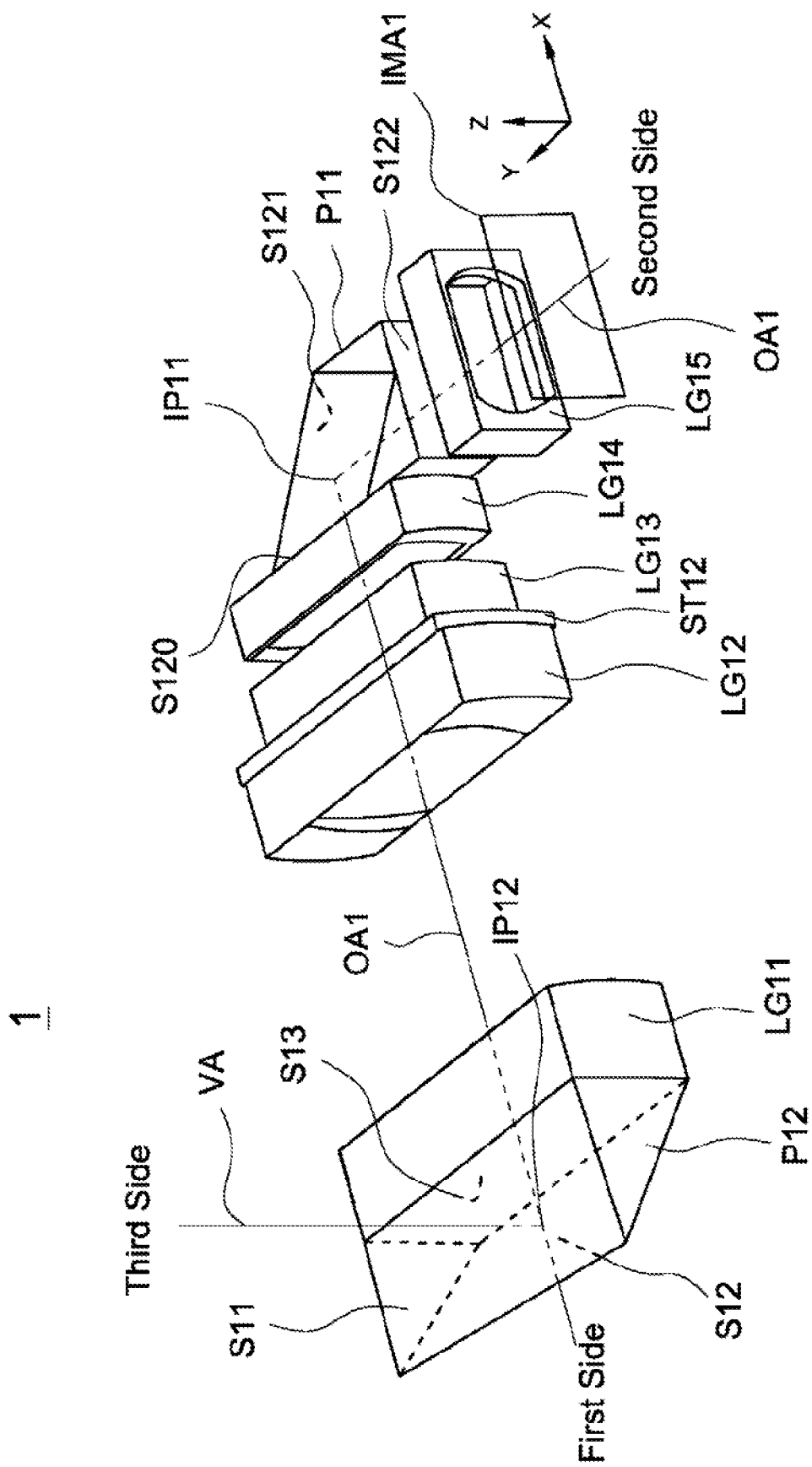
FIGS. 1A, 1G are three-dimensional lens layout diagrams of a lens assembly at wide-angle end and at telephoto end in accordance with a first embodiment of the invention respectively.

Referring to FIG. 1A. Lens assembly 1 includes a second reflective element P12, a first lens group LG11, a second lens group LG12, a second stop ST12, a third lens group LG13, a fourth lens group LG14, a first reflective element P11, and a fifth lens group LG15. The first lens group LG11 is with negative refractive power, the second lens group LG12 is with positive refractive power, the second stop ST12 is a fixed stop, the third lens group LG13 is with positive refractive power, the fourth lens group LG14 is with negative refractive power, and the fifth lens group LG15 is with positive refractive power. The second reflective element P12 includes a second incident surface S11, a second reflective surface S12, and a second exit surface S13. The first reflective element. P11 includes a first incident surface S120, a first reflective surface S121, and a first exit surface S122.

The second reflective element P12, the first lens group LG11, the second lens group LG12, the second stop ST12, the third lens group LG13, the fourth lens group LG14, the first reflective element P11, and the fifth lens group LG15 are arranged in order from a first side to a second side along an axis OA1. The optical path from the object side to the image plane IMA1 is called the axis OA1 and the optical path can change direction by a prism or a mirror at least once. The axis OA1 intersects the second reflective surface S12 at a point IP12, and intersects the first reflective surface S121 at a point IP11 and then changes direction to the second side. A vertical axis VA passes through the second incident surface S11 perpendicularly and intersects the axis OA1 and the second reflective surface S12 at point IP12. The connection direction of the point IP12 and point IP11 is equivalent to the X axis in space. The axis OA1 from the point IP11 to the second side is equivalent to the Y axis in space. The vertical axis VA is equivalent to the Z axis in space. The X axis, axis, and Z axis are perpendicular to each other.

The second lens group LG12 and the fourth lens group LG14 can move along the axis OA1. Specifically, the second lens group LG12 and the fourth lens group LG14 can move to the first side or the second side along the axis OA1 and the first lens group LG11 and the third lens group LG13 are fixed not moving along the axis OA1. The fifth lens group LG15 can move along axis OA1. Specifically, the fifth lens group LG15 can move to the point IP11 or the second side along the axis OA1.

In operation, the light from the third side incident on the second reflective element P12 from the second incident surface S11, then reflected by the second reflective surface S12 to change propagation direction, sequentially passes through the second exit surface S13, the first lens soup LG11, the second lens group LG12, the second stop ST12, the third lens group LG13, the fourth lens group LG14, and the first incident surface S120, then reflected by the first reflective surface S121 to change propagation direction, then sequentially passes through the first exit surface S122 and the fifth lens group LG15, and finally imaged on an image plane IMA1. The image plane IMA1 and the second incident surface S11 are perpendicular to each other.

A detailed description of a lens assembly in accordance with a first embodiment of the invention is as follows. Referring to FIG. 1A, FIG. 1B, FIG. 1D, and FIG. 1G. The lens assembly 1 includes a second reflective element P12, a first lens group LG11, a second lens group LG12, a second stop ST12, a third lens group LG13, a fourth lens group LG14, a first reflective element P11, and a fifth lens group. LG15. The second reflective element P12 is a prism and includes a second incident surface S11, a second reflective surface S12, and a second exit surface S13. The second incident surface S11 faces the third side along the vertical axis VA. The second reflective surface S12 faces the second side along the axis OA1. The second exit surface S13 faces the second side along the axis OA1. The second incident surface S11 and the second exit surface S13 are perpendicular to each other. The second reflective element P12 can also be a reflective mirror. The second reflective element P12 can also only include one reflective surface when the second reflective element P12 is a reflective mirror.

The first lens group LG11 is with negative refractive power and includes a 1-1 lens L11 and a 1-2 lens L12, both of which are arranged in order from the first side to the second side along the axis OA1. The 1-1 lens L11 is a biconcave lens with negative refractive power and includes a concave surface S14 Ewing the first side along the axis OA1 and another concave surface S15 facing the second side along the axis OA1. The 1-2 lens L12 is a biconvex lens with positive refractive power and includes a convex surface S16 facing the first side along the axis OA1 and another convex surface S17 facing the second side along the axis OA1. Both of the 1-1 lens L11 and the 1-2 lens L12 are aspheric lenses. The second lens group LG12 is with positive refractive power and includes a 2-2 lens L13, a 2-1 lens L14, and a first stop ST11, all of which are arranged in order from the first side to the second side along the axis OA1. The 2-2 lens L1.3 is a meniscus lens with negative refractive power and includes a convex surface S18 facing the first side along the axis OA1 and a concave surface S19 facing the second side along the axis OA1. The 2-1 lens L14 is a biconvex lens with positive refractive power and includes a convex surface S110 facing the first side along the axis OA1 and another convex surface S111 facing the second side along the axis OA1. The first stop ST11 is a variable stop which can be driven the mechanism of the variable stop by the built-in driving element (not shown) to change the variable stop size to achieve multi-stage changes of the variable stop size. Both of the 2-2 lens L13 and the 2-1 lens L14 are aspheric lenses. The second stop ST12 is a fixed stop, that is, a flat plate for shading and the hole size of the second stop ST12 remains unchanged. The third lens group LG13 is with positive refractive power and includes a 3-1 lens L15 and a 3-2 lens L16, both of which are arranged in order from the first side to the second side along the axis OA1. The 3-1 lens L15 is a biconvex lens with positive refractive power and includes a convex surface S114 facing the first side along the axis OA1 and another convex surface S115 facing the second side along, the axis OA1. The 3-2 lens L16 is a meniscus lens with negative refractive power and includes a concave surface S116 facing the first side along the axis OA1 and a convex surface S117 facing the second side along the axis OA1. Both of the 3-1 lens L15 and the 3-2 lens L16 are aspheric lenses. The fourth lens group LG14 is with negative refractive power and includes a 4-1 lens L17. The 4-1 lens L17 is a meniscus lens with negative refractive power and includes a concave surface S118 facing the first side along the axis OA1 and a convex surface S119 facing the second side along the axis OA1. The 4-1 lens L17 is an aspheric lens.

The first reflective element P11 is a prism and includes a first incident surface S120, a first reflective surface S121, and a first exit surface S122. The first incident surface S120 faces the first side along the axis OA1. The first reflective surface S121 faces the second side along the axis OA1. The first exit surface S122 faces the second side along the axis OA1. The first incident surface S120 and the first exit surface S122 are perpendicular to each other. The first reflective element P11 can also be a reflective mirror. The first reflective element P11 can also only include one reflective surface when the first reflective element P11 is a reflective mirror.

The fifth lens group LG15 is with positive refractive power and includes 5-1 lens L18. The 5-1 lens L18 is a meniscus lens with positive refractive power and includes a convex surface S123 facing the first side along the axis OA1 and a concave surface S124 facing the second side along the axis OA1. The 5-1 lens L18 is an aspheric lens.

When the first stop ST11 and the second stop ST12 are viewed from the front along the axis OA1, the shapes of the inner circumferential portion and the outer circumferential portion are non-circular. The shape of the inner circumferential portion can be non-circular, such as polygon, polygon symmetrical to axis OA1, polygon asymmetric to axis OA1, racetrack shape, bottle shape, oak barrel shape or upper half of red wine bottle, wave shape, flower shape, leaf shape, cloud shape, star shape, zigzag shape, heart shape, shape composed of straight lines and arcs, or shape composed of irregular lines. Such a design is benefit to the effective reduction in size, thickness and volume of the lens assembly 1, wherein some of the shapes such as wave, cloud, star, and zigzag can also reduce stray light and ghost images, malting the lens assembly 1 effectively thinned out. The shapes of the first stop ST11 and the second stop ST12 are not limited to the aforementioned non-circular shape, and the shape may also be circular.

During zooming, the first lens group LG11 is fixed, the second lens group LG12 moves to the first side along the axis OA1, the third lens group LG13 is fixed, and the fourth lens group LG14 moves to the first side along the axis OA1 to adjust the interval between the first lens group LG11 and the second lens group LG12 be decreased, the interval between the second lens group LG12 and the second stop ST1.2 be increased, the interval between the third lens group LG13 and the fourth lens group LG14 be decreased, and the interval between the fourth lens group LG14 and the first incident surface S120 of the first reflective element P11 be increased, making the lens assembly 1 zooming from the wide-angle end to the middle end and then to the telephoto end. The above-mentioned intervals change as the lens assembly 1 zooms from the wide-angle end to the middle end and then to the telephoto end can be clearly seen in FIG. 1B, FIG. 1D, and FIG. 1G. The fifth lens group LG15 can move to the second side or the point IP11 along the axis OA1 for auto focus.

In addition, the lens assembly 1 satisfies at least one of the following conditions:

$$3 < TL1/D_{L4} < 8 \tag{1}$$

$$0 < TL2/D_{L4} < 4 \tag{2}$$

$$0 < D_{REF}/D_{MAX} < 2 \tag{3}$$

$$0.5 < TL1/TL2 < 3.5 \tag{4}$$

$$0.1 < D_{MAX}/TL1 < 0.8 \tag{5}$$

$$0.2 < D_{MAX}/TL2 < 1 \tag{6}$$

$$2 < TTL/D_{LOBJ} < 7 \tag{7}$$

$$4 < TTL/D_{LIMG} < 10 \tag{8}$$

$$4 < TL1/D_{RER} < 6 \tag{9}$$

$$1 < TL2/D_{REF} < 5 \tag{10}$$

$$80 < TC23_{WIDE}/TC23_{TELE} < 120 \tag{11}$$

wherein $D_{L4}$ is an effective optical diameter of an object side surface S110 of the 2-1 lens L14, $D_{REF}$ is an effective optical diameter of the first reflective surface S121, $D_{MAX}$ is a maximum effective optical diameter of all lenses, TL1 is an interval from an object side surface S14 of the 1-1 lens L11 to an image plane IMA1 along the axis OA1, IL2 is an interval from the first reflective surface S121 to the image plane IMA1 along the axis OA1, TTL is an interval from an object side surface S14 of the lens closest to the first side (i.e., 1-1 lens) to the image plane IMA1 along the axis OA1, the interval TTL is the total optical system length of the lens assembly 1. $D_{LOBJ}$ is an effective optical diameter of the object side surface S14 of the lens closest to the first side (i.e., 1-1 lens), $D_{LIMG}$ is an effective optical diameter of an object side surface S123 of the lens closest to the second side (i.e., 5-1 lens), $TC23_{WIDE}$ is an interval from the first lens group LG11 to the second lens group LG12 along the axis OA1 when the lens assembly 1 is at the wide-angle end, and $TC23_{TELE}$ is interval from the first lens group LG11 to the second lens group LG12 along the axis OA1 when the lens assembly 1 is at the telephoto end. When the lens assembly 1 satisfies at least one of the above conditions (1)-(11), the refractive power of the lens assembly 1 can be effectively distributed to reduce the sensitivity of the lens assembly 1.

With the above design of the lenses, stop ST11, stop ST12, reflective element P12, reflective element P11, and at least any one of the conditions (1)-(11) satisfied, the lens assembly 1 can have an effective decreased total lens length, an effective increased resolution, an effective corrected aberration, and true optical zoom function can be realized.

Figure 1B:
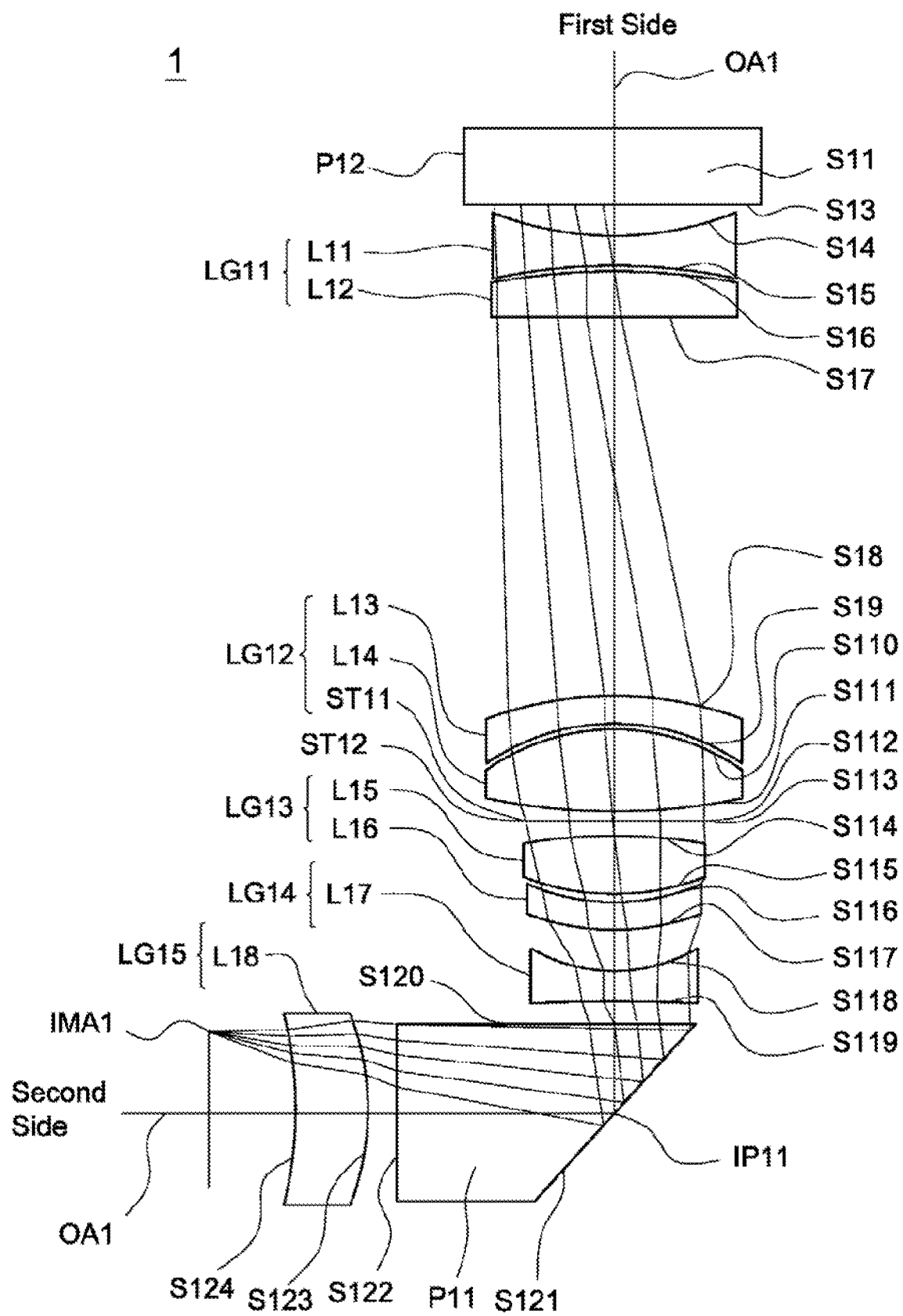
FIGS. 1B, 1D are lens layout and optical path diagrams of the lens assembly at wide-angle end and at middle end in accordance with the first embodiment of the invention respectively.
Figure 1C:
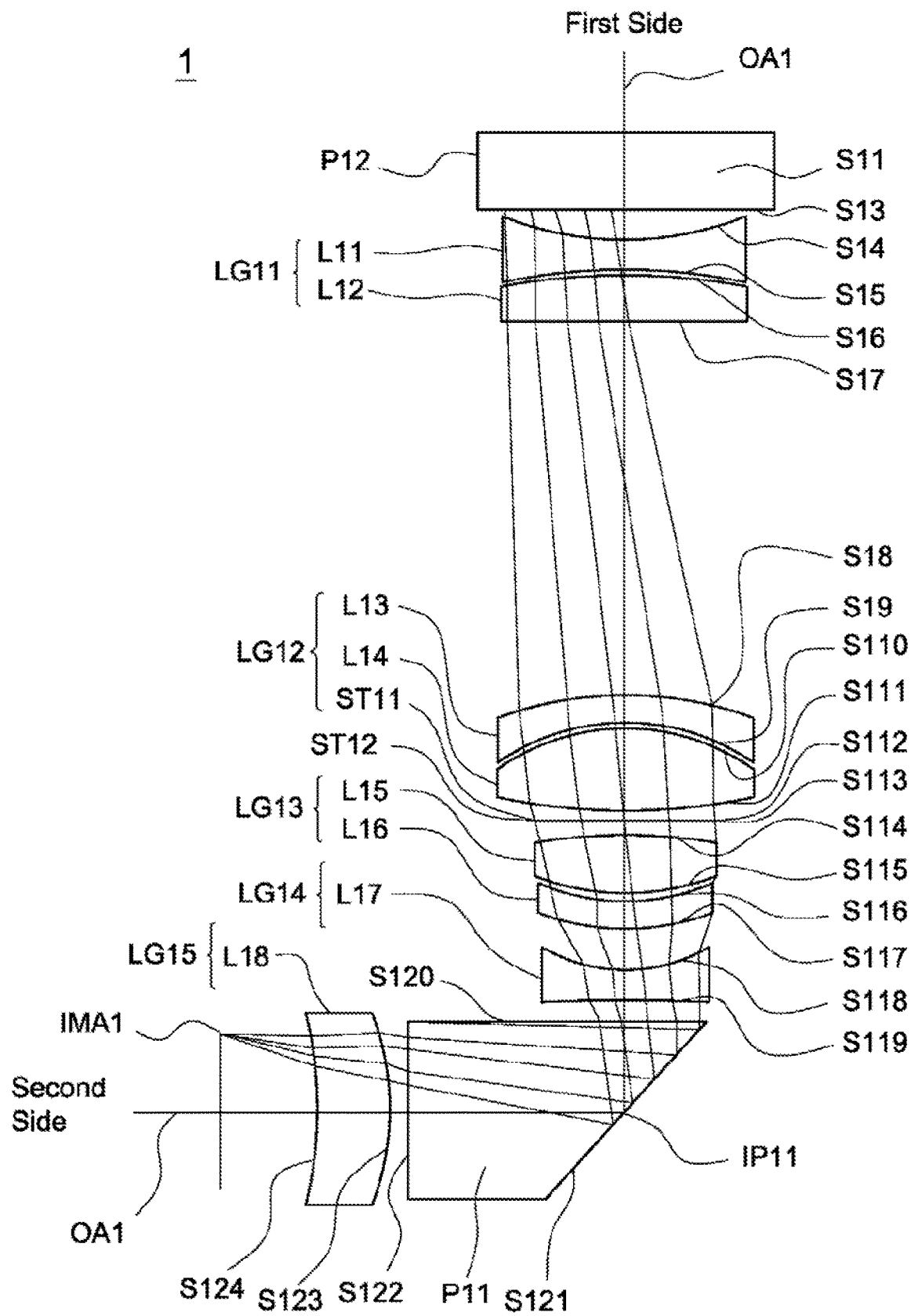
FIGS. 1C, 1F, 1H are lens layout and optical path diagrams of the lens assembly at wide-angle end when object distance is equal to 500 mm, at middle end when the object distance is equal to 1000 mm, and at telephoto end when the object distance is equal to 3200 mm in accordance with the first embodiment of the invention respectively.
Figure 1D:
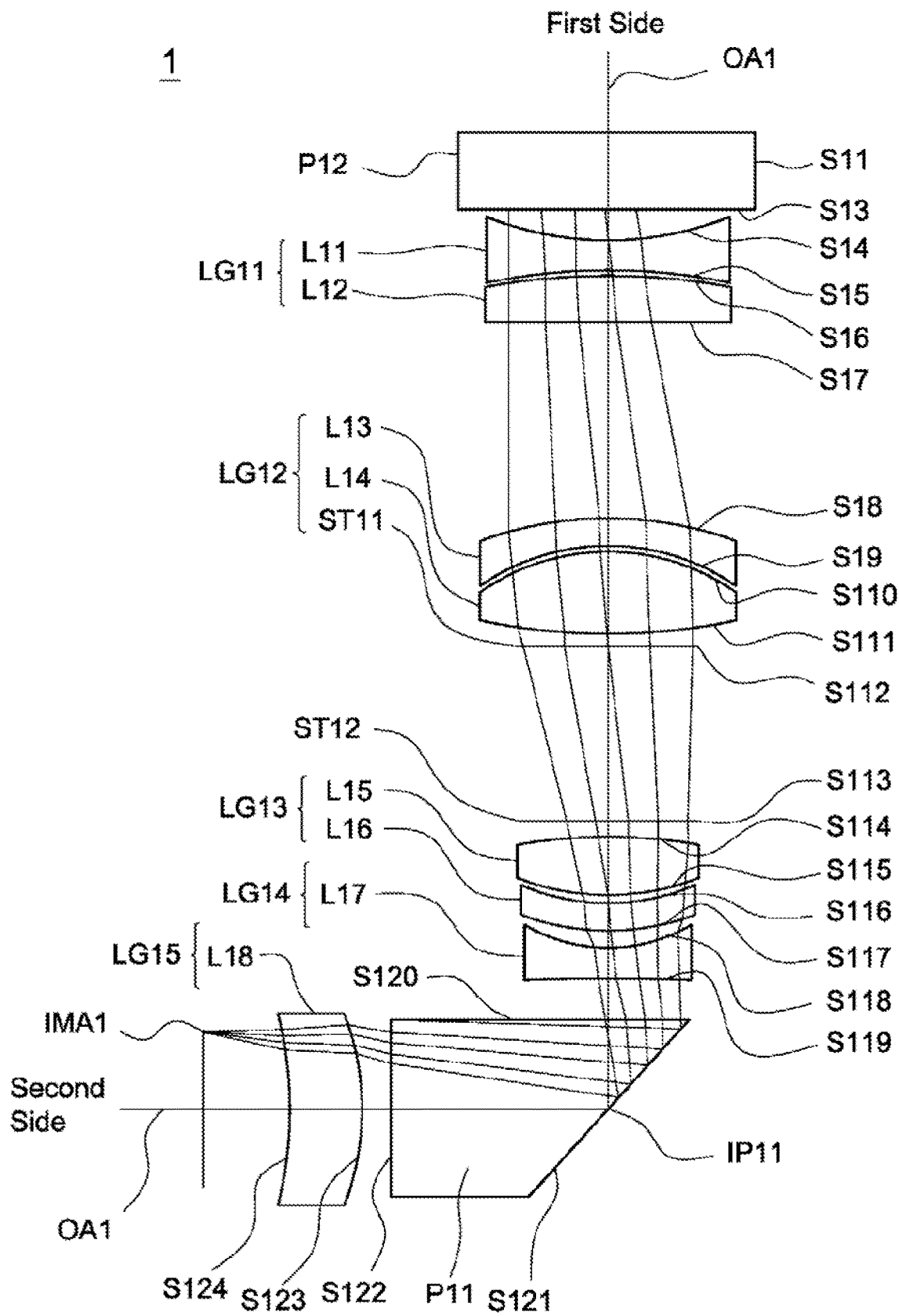
Figure 1E:
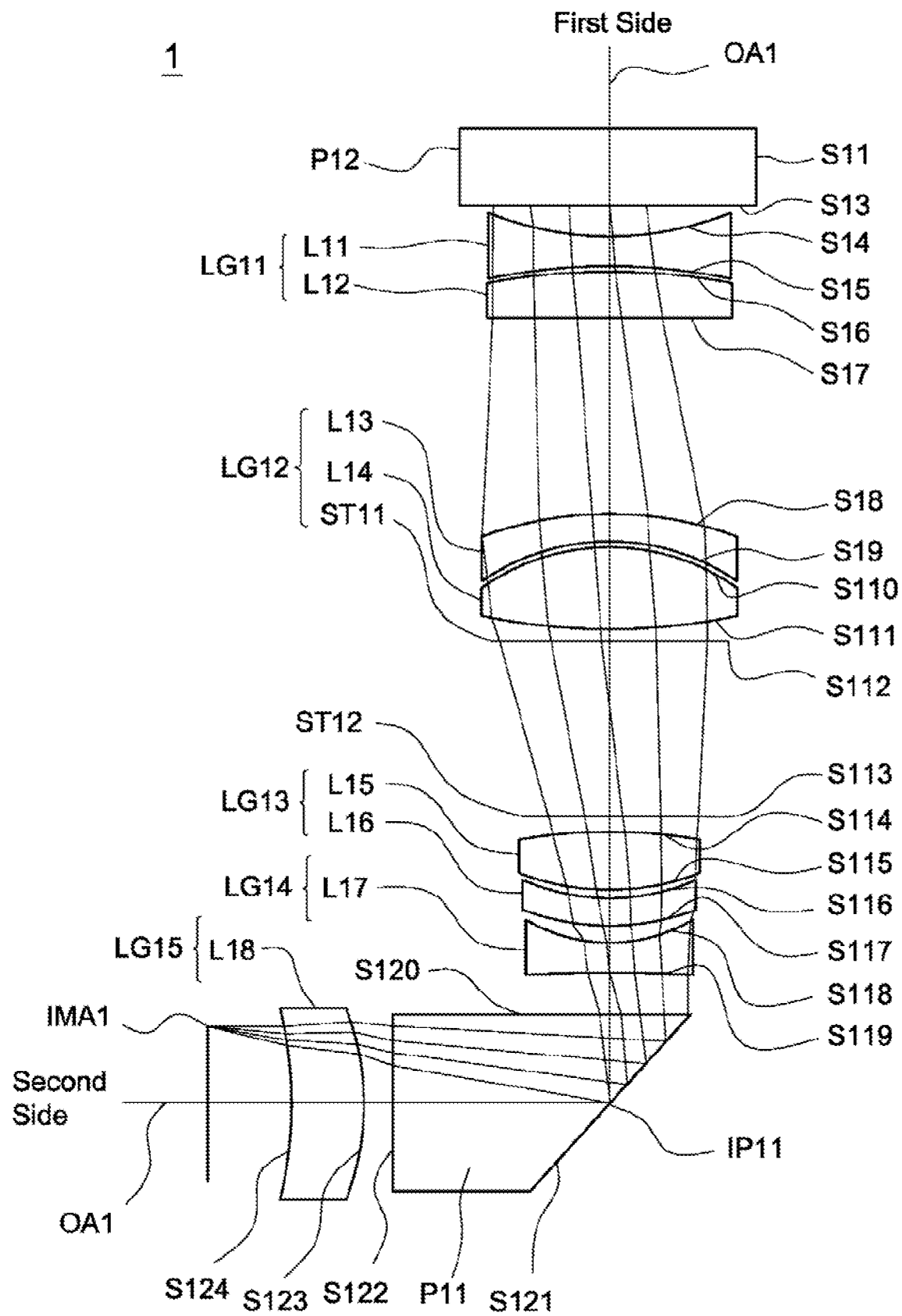
FIG. 1E is a lens layout and optical path diagram of the lens assembly at middle end when the first stop is adjusted to become larger in accordance with the first embodiment of the invention.
Figure 1F:
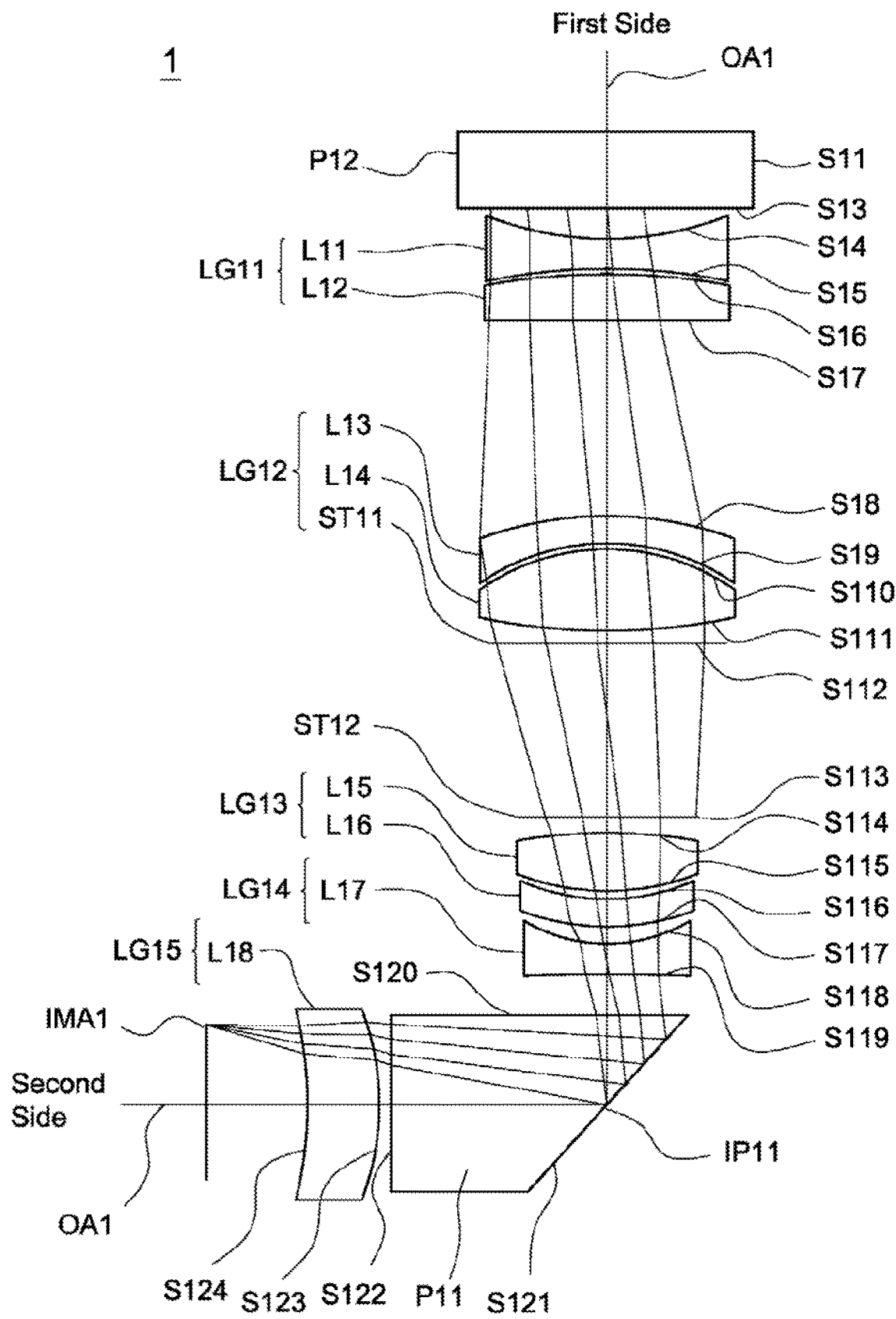
Figure 1G:
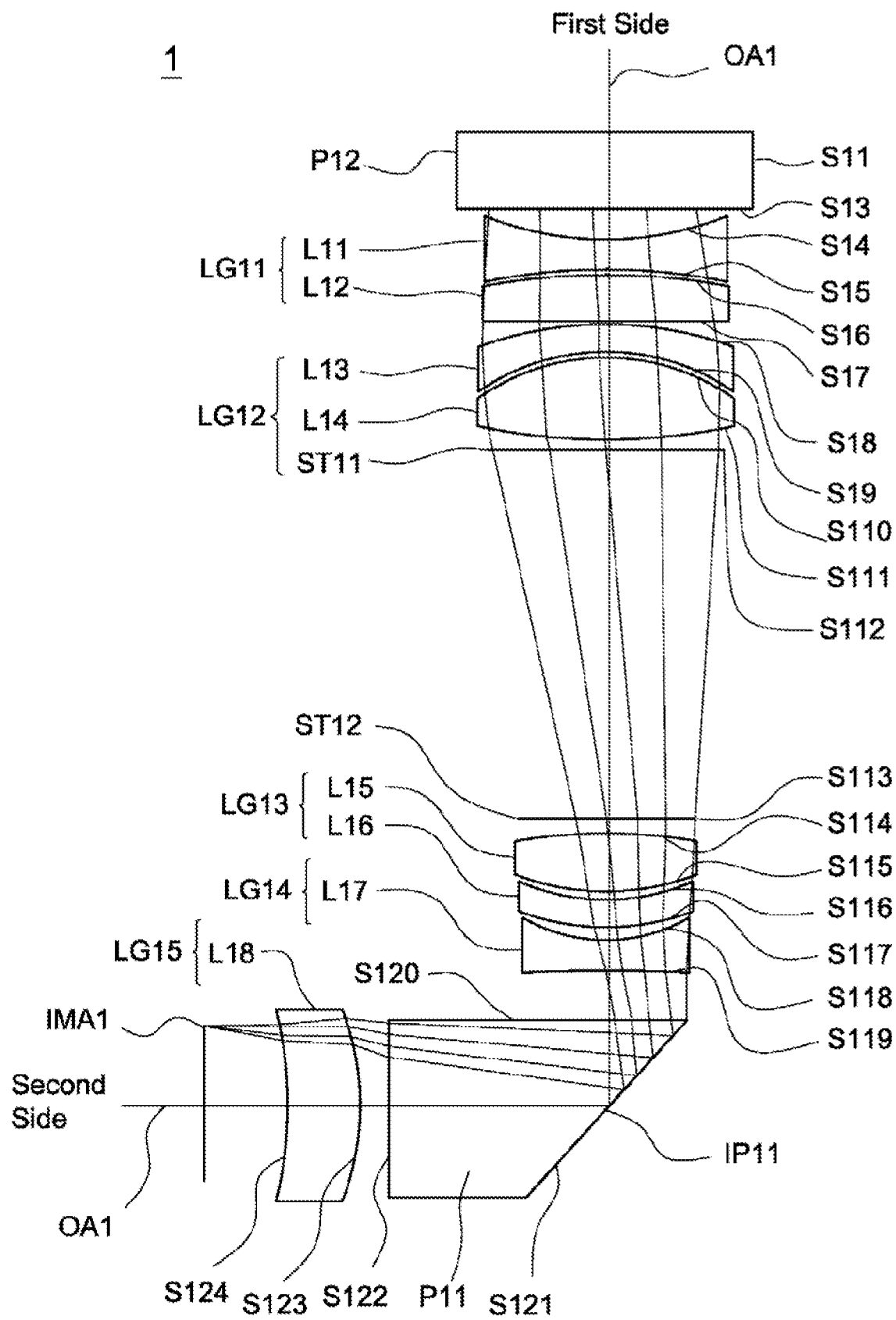

Table 1 shows the optical specification of the lens assembly 1 in FIG. 1B, FIG. 1D, and FIG. 1G when the lens assembly 1 is at wide-angle end, middle end, telephoto end respectively.

TABLE 1

| | | |
|---|---|---|
| W(Wide-angle End) | Effective Focal Length = 11.268 mm | F-number = 3.27 |
| | Total Lens Length = 44.611 mm | Field of View = 2.700 mm |
| | | The Effective Diameter of the First Stop = 6.632 mm |
| M(Middle End) | Effective Focal Length = 17.375 mm | F-number = 4.38 |
| | Total Lens Length = 44.611 mm | Field of View = 2.700 mm |
| | | The Effective Diameter of the First Stop = 6.632 mm |
| T(Telephoto End) | Effective Focal Length = 28.201 mm | F-number = 4.48 |
| | Total Lens Length = 44.611 mm | Field of View = 2.700 mm |

TABLE 1-continued

The Effective Diameter of the First Stop = 8.903732 mm

| Surface Number | Radius of Curvature (mm) | Thickness (mm) | Nd | Vd | Effective Focal Length (mm) | Remark |
|---|---|---|---|---|---|---|
| S10 | ∞ | ∞ | | | | Object |
| S11 | ∞ | 32 | 1.8467 | 23.778 | | P12, The Second Incident Surface |
| S12 | ∞ | 32 | | | | P12, The Second Reflective Surface |
| S13 | ∞ | 1 | | | | P12, The Second Exit Surface |
| S14 | −11.38266025 | 1 | 1.533596 | 70.40009 | −13.538536 | L11 |
| S15 | 20.5253282 | 0.179671657 | | | | |
| S16 | 24.63350185 | 1.560610345 | 1.659759 | 26.49972 | 33.362931 | L12 |
| S17 | −215.2377891 | 12.80734803 (W) 6.73816466 (M) 0.151818238 (T) | | | | |
| S18 | 14.22542308 | 1 | 1.761106 | 26.5 | −29.085743 | L13 |
| S19 | 8.418462882 | 0.076161295 | | | | |
| S110 | 8.396058294 | 2.812462303 | 1.672838 | 70.40019 | 9.354533 | L14 |
| S111 | −21.97689326 | 0.395521163 | | | | |
| S112 | ∞ | 0 (W) 6.069171 (M) 12.65603264 (T) | | | | ST11 |
| S113 | ∞ | 0.469237424 | | | | ST12 |
| S114 | 14.33492346 | 1.973488794 | 1.671037 | 44.05754 | 10.624357 | L15 |
| S115 | −13.50758398 | 0.232781189 | | | | |
| S116 | −6.653070158 | 1 | 1.727704 | 37.10005 | −268.93814 | L16 |
| S117 | −7.323197603 | 1.405830637 (W) 0.700209712 (M) 0.370267035 (T) | | | | |
| S118 | −5.062.220343 | 1 | 1.732581 | 35.5346 | −7.192.297 | L17 |
| S119 | −124.3936417 | 0.700468567 (W) 1.405964160 (M) 1.736099298 (T) | | | | |
| S120 | ∞ | 3 | 32.003397 | 28.32009 | | P11, The First Incident Surface |
| S121 | ∞ | 7.998076622 | | | | P11, The First Reflective Surface |
| S122 | ∞ | 1.088429416 | | | | P11, The First Exit Surface |
| S123 | 6.070231801 | 2.664505049 | 1.536919 | 70.40143 | 23.0703 | L18 |
| S124 | 10.05004807 | 3.246438358 | | | | |

The aspheric surface sag z of each aspheric lens in table 1 can be calculated by the following formula:

$$z = ch^2/\{1+[1-(k+l)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A | B | C | D | E | F | G |
|---|---|---|---|---|---|---|---|---|
| S14 | −0.893309773 | 5.25E−05 | 6.54E−06 | 8.51E−08 | −1.02E−08 | −2.07E−10 | 3.27E−11 | −9.89E−13 |
| S15 | 2.662830677 | 4.09E−05 | −4.11E−07 | 1.11E−07 | 1.30E−09 | 3.40E−11 | −2.95E−11 | −2.42E−12 |
| S16 | 4.555551479 | 3.37E−05 | 9.14E−07 | −2.24E−08 | −5.21E−08 | −3.65E−10 | −1.25E−11 | −1.31E−12 |
| S17 | −360.2810556 | 5.42E−05 | 5.37E−06 | 8.77E−09 | −8.97E−09 | −5.19E−10 | −3.37E−12 | 1.12E−12 |
| S18 | 0.200819563 | 2.60E−06 | 3.35E−07 | −1.60E−08 | −1.14E−09 | 3.96E−11 | 3.39E−12 | −2.07E−13 |
| S19 | 0.003475007 | 6.04E−06 | −1.62E−06 | −7.48E−08 | −1.92E−09 | −1.14E−10 | −5.57E−12 | −2.70E−13 |
| S110 | 0.022974725 | 2.99E−06 | 7.26E−07 | −1.50E−08 | −1.99E−09 | −1.19E−11 | −1.39E−12 | 1.36E−14 |
| S111 | −5.841582038 | 4.43E−05 | 1.80E−06 | 6.34E−08 | 2.25E−09 | 5.97E−11 | 1.97E−12 | 1.52E−13 |
| S114 | 10.09714353 | −8.67E−04 | −6.18E−05 | 1.74E−06 | −1.57E−07 | −2.63E−09 | 1.62E−09 | −2.28E−10 |
| S115 | 17.03061342 | −2.31E−03 | 9.16E−05 | 8.78E−06 | 9.06E−07 | −1.34E−07 | −2.09E−0S | 1.47E−09 |
| S116 | −1.201682466 | 6.78E−04 | 1.24E−04 | 3.64E−06 | −9.18E−07 | −2.44E−08 | 2.86E−09 | −1.78E−10 |
| S117 | 2.61078484 | 2.99E−03 | −5.55E−05 | 2.30E−05 | −4.56E−06 | 3.16E−07 | 1.25E−08 | −1.38E−09 |
| S118 | −3.678589984 | −1.64E−04 | 1.34E−05 | 3.67E−05 | −1.02E−05 | 9.28E−07 | −1.54E−08 | −1.18E−09 |

TABLE 2-continued

| Surface Number | k | A | B | C | D | E | F | G |
|---|---|---|---|---|---|---|---|---|
| S119 | −50.74589068 | 9.08E−04 | 4.00E−05 | 1.33E−05 | −5.59E−06 | 3.81E−07 | 2.28E−08 | −2.38E−09 |
| S123 | 0.358091343 | −1.81E−03 | 2.90E−05 | −6.56E−06 | 9.48E−08 | 1.86E−08 | −2.29E−10 | −3.96E−11 |
| S124 | 8.455125532 | −2.48E−03 | 2.74E−05 | −9.28E−06 | −5.09E−07 | −2.12E−07 | 5.32E−08 | −3.48E−09 |

Table 3 shows the parameters and condition values for conditions (1)-(11) in accordance with the first embodiment of the invention. It can be seen frons Table 3 that the lens assembly 1 of the first embodiment satisfies the conditions (1)-(11).

TABLE 3

| | | | | | | |
|---|---|---|---|---|---|---|
| TL1 | 29.61 mm(W) | $D_{L4}$ | 9.48 min | TL2 | 15.00 mm(W) | |
| | 29.61 mm(M) | | | | 15.00 mm(M) | |
| | 29.61 mm(T) | | | | 15.00 mm(T) | |
| $D_{MAX}$ | 9.48 mm | $D_{LOBJ}$ | 8.84 mm | TTL | 44.611 mm | |
| $D_{LIMJ}$ | 6.54 mm | $D_{REF}$ | 6 mm | | | |
| $TL1/D_{L4}$ | 3.12(W) | $TL2/D_{L4}$ | 1.58(W) | $D_{REF}/$ | 0.63 | |
| | 3.12(M) | | 1.58(M) | $D_{MAX}$ | | |
| | 3.12(T) | | 1.58(T) | | | |
| TL1/TL2 | 1.97(W) | $D_{MAX}/TL1$ | 0.32(W) | $D_{MAX}/$ | 0.63(W) | |
| | 1.97(M) | | 0.32(M) | TL2 | 0.63(M) | |
| | 1.97(T) | | 0.32(T) | | 0.63(T) | |
| $TTL/D_{LOBJ}$ | 5.05 | $TTL/D_{LIMG}$ | 6.82 | TL1/ | 4.94(W) | |
| | | | | $D_{REF}$ | 4.94(M) | |
| | | | | | 4.94(T) | |
| $TL2/D_{REF}$ | 2.5(W) | $TC23_{WIDE}/$ | 84.36 | | | |
| | 2.5(M) | $TC23_{TELE}$ | | | | |
| | 2.5(T) | | | | | |

Figure 2A:
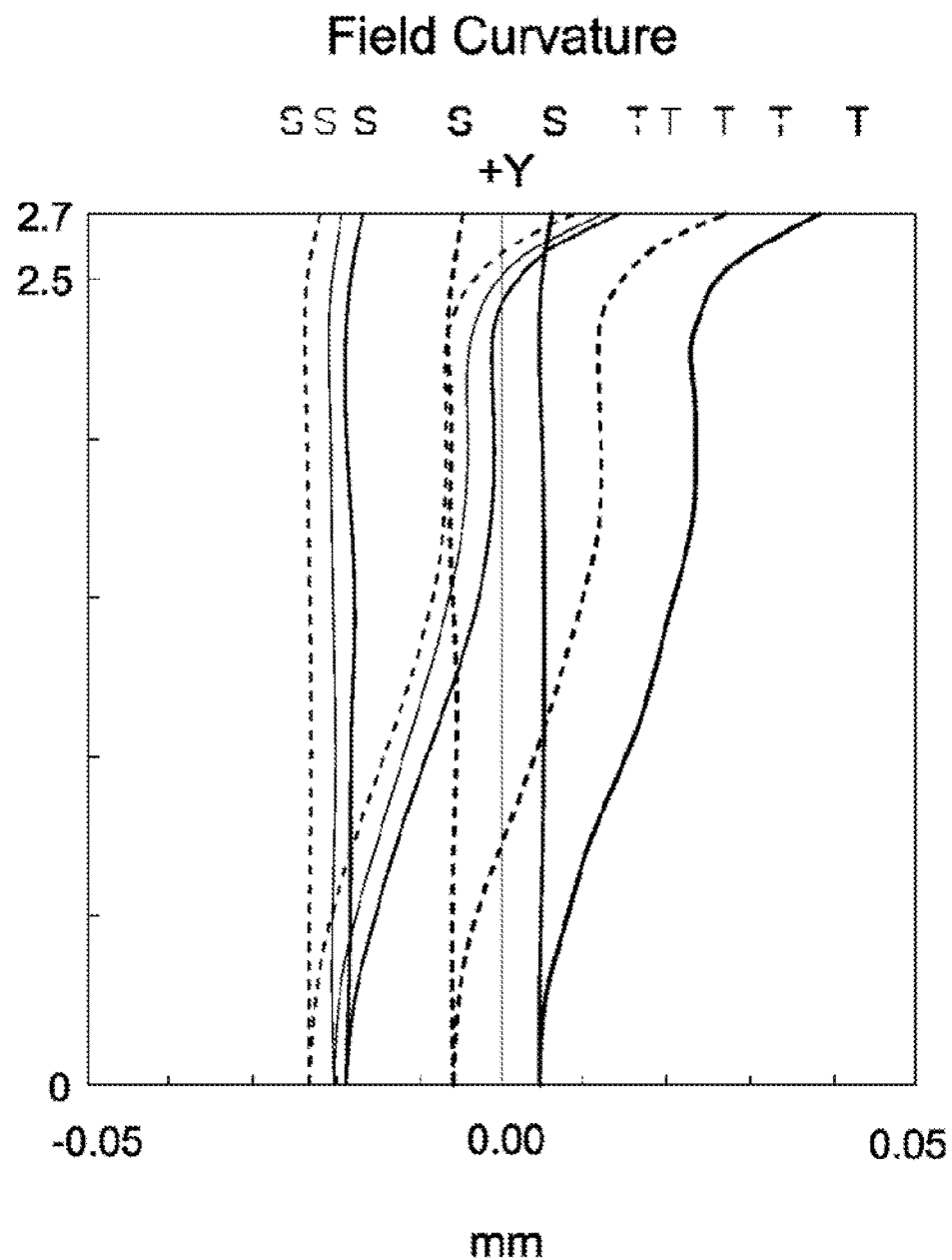
FIGS. 2A, 2B, 2C depict a field curvature diagram, distortion diagram, and modulation transfer function diagram of the lens assembly at wide-angle end in accordance with the first embodiment of the invention respectively.
Figure 2B:
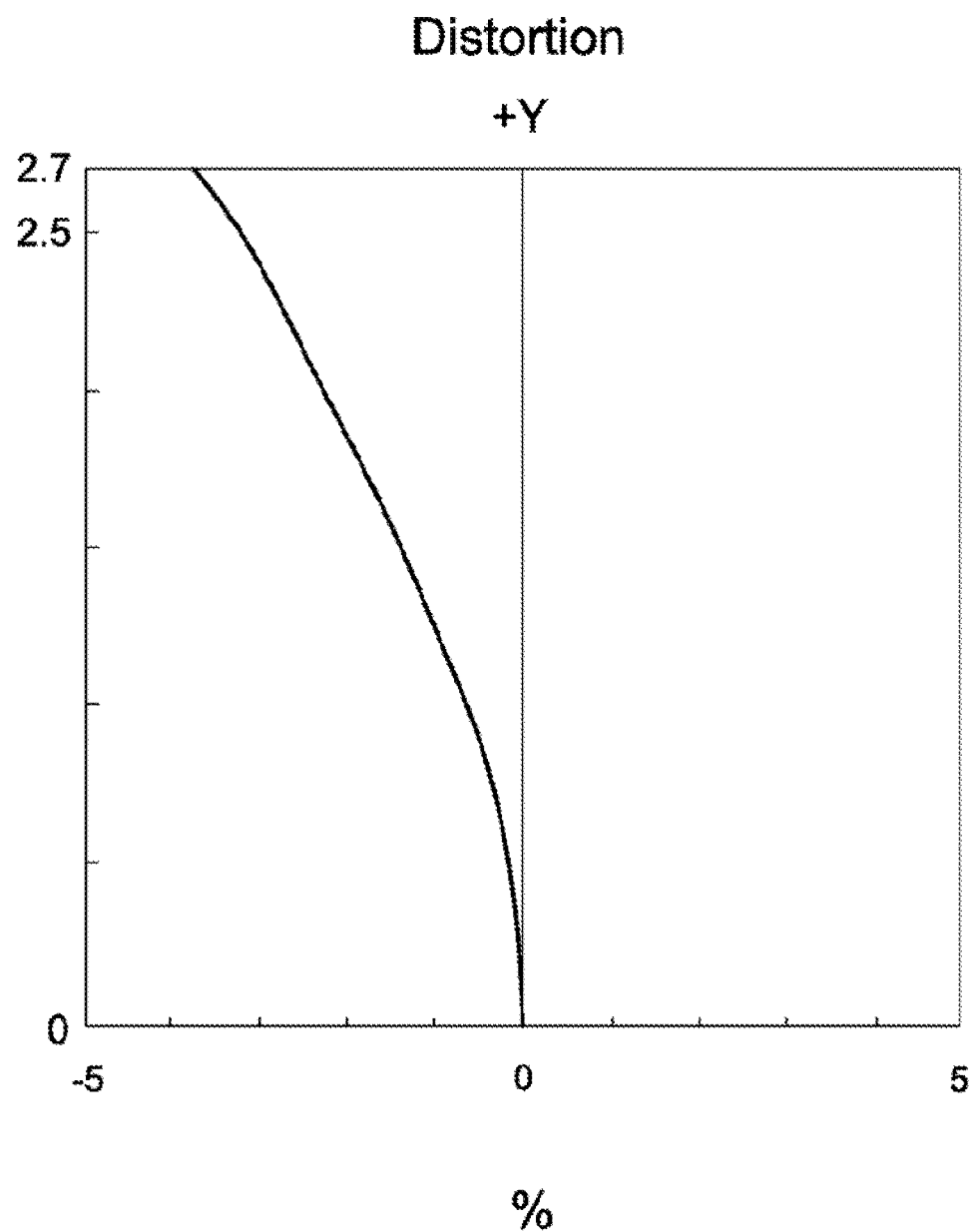
Figure 2C:
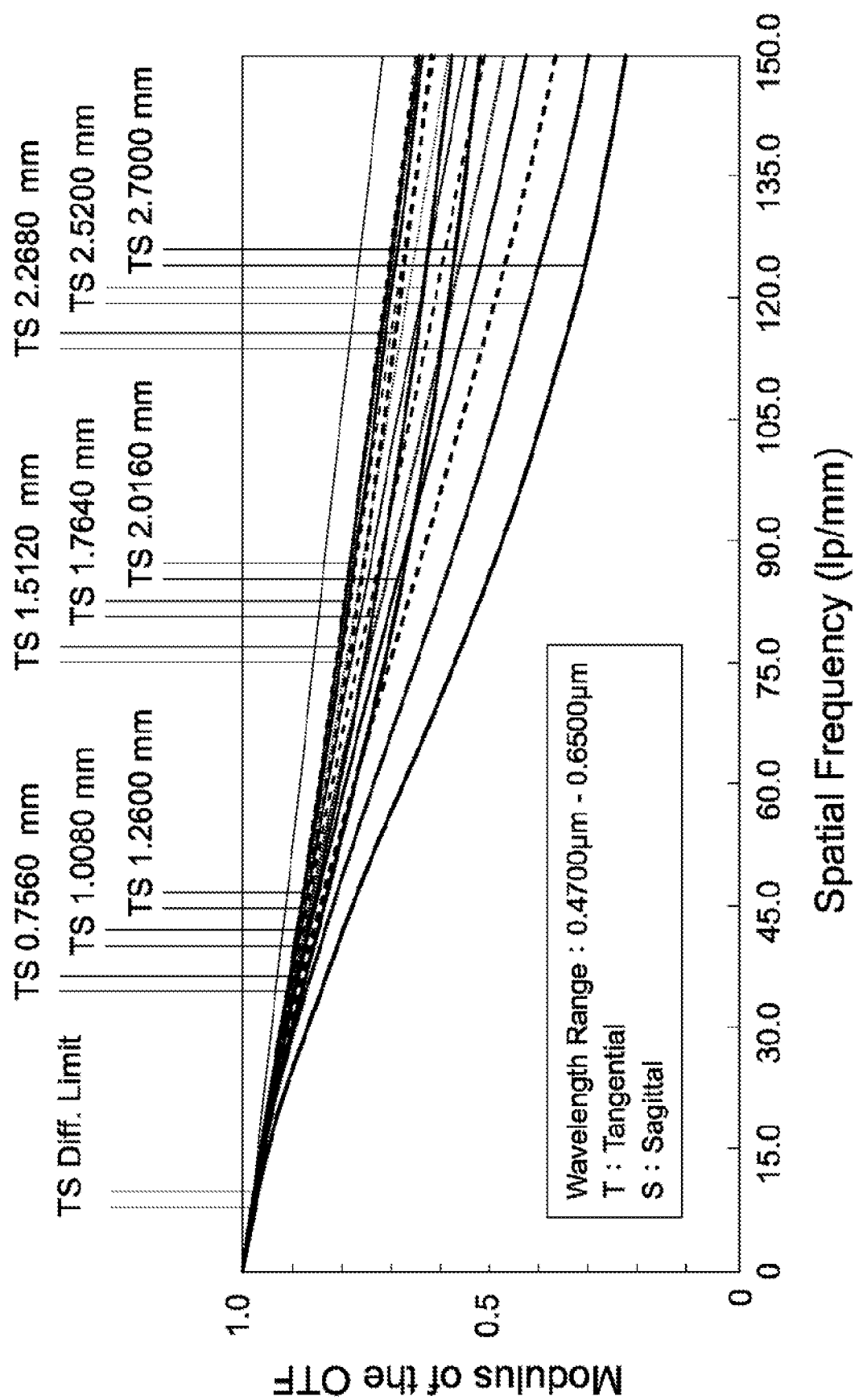

In addition, the lens assembly 1 of the first embodiment can meet the requirements of optical performance as seen in FIGS. 2A-2C. It can be seen from FIG. 2A that the field curvature of tangential direction and sagittal direction in the lens assembly 1 of the first embodiment ranges from −0.03 mm to 0.03 mm. It can be seen from FIG. 2B that the distortion in the lens assembly 1 of the first embodiment ranges from −4% to 0%. It can be seen from FIG. 2C that the modulation transfer function of tangential direction and sagittal direction in the lens assembly 1 of the first embodiment ranges from 0.22 to 1.0. It is obvious that the field curvature and the distortion of the lens assembly 1 of the first embodiment can be corrected effectively, the image resolution can meet the requirements. Therefore, the lens assembly 1 of the tint embodiment is capable of good optical performance.

Figure 1H:
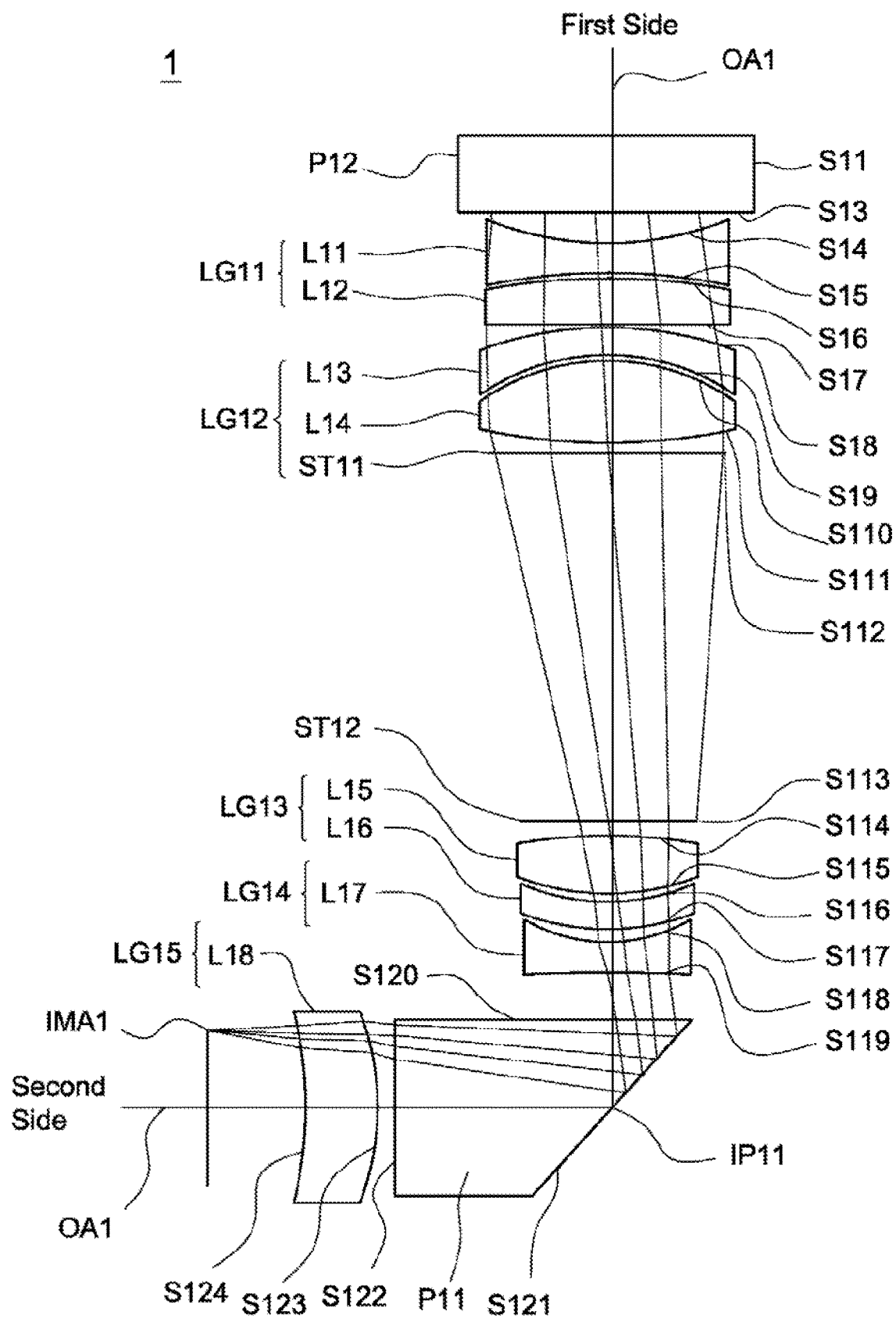

Table 4 shows the optical specification of the lens assembly 1 in FIG. 1C, FIG. 1F, and FIG. 1H, when the lens assembly 1 is at wide-angle end, middle end, telephoto end and an object (not shown) is disposed in front of the second incident surface S11 at a distance of 500 mm, 1000 mm, 3200 mm respectively. When the lens assembly 1 performs auto focus, the fifth lens group LG15 moves from the second side to the first side along the axis OA1. Table 4 shows that the interval from the first exit surface S122 of the first reflective element P11 to the fifth lens group LG15 is the smallest when the lens assembly 1 is at middle end and the object distance is equal to 1000 mm.

TABLE 4

| | | |
|---|---|---|
| W(Wide-angle End) | Object Distance = 500 mm | Effective Focal Length = 11.099 mm |
| | F-number = 3.27 | Total Lens Length = 45.611 mm |
| | | The Effective Diameter of the First Stop = 6.632 mm |
| M(Middle End) | Object Distance = 1000 mm | Effective Focal Length = 17.0622 mm |
| | F-number = 3.27 | Total Lens Length = 45.611 mm |
| | | The Effective Diameter of the First Stop = 8.903732 mm |
| T(Telephoto End) | Object Distance = 3200 mm | Effective Focal Length = 27.7901 mm |
| | F-number = 4.48 | Total Lens Length = 45.611 mm |
| | | The Effective Diameter of the First Stop = 8.903732 mm |

| Surface Number | Radius of Curvature (mm) | Thickness (mm) | Nd | Vd | Effective Focal Length (mm) | Remark |
|---|---|---|---|---|---|---|
| S10 | ∞ | 500 (W) | | | | Object |
| | | 1000 (M) | | | | |
| | | 3200 (T) | | | | |
| S11 | ∞ | 3.2 | 1.8467 | 23.778 | | P12, The Second Incident Surface |
| S12 | ∞ | 3.2 | | | | P12, The Second Reflective Surface |
| S13 | ∞ | 1 | | | | P12, The Second. Exit Surface |
| S14 | −11.38266025 | 1 | 1.533596 | 70.40009 | −13.538536 | L11 |
| S15 | 20.5253282 | 0.179671657 | | | | |
| S16 | 24.63350185 | 1.560610345 | 1.659759 | 26.49972 | 33.362931 | L12 |
| S17 | −215.2377891 | 12.80734803 (W) | | | | |
| | | 6.73816466 (M) | | | | |
| | | 0.151818238 (T) | | | | |
| S18 | 14.22542308 | 1 | 1.761106 | 26.5 | −29.085743 | L13 |
| S19 | 8.418462882 | 0.076161295 | | | | |
| S110 | 8.396058294 | 2.812462303 | 1.672838 | 70.40019 | 9.354533 | L14 |
| S111 | 721.97689326 | 0.395521163 | | | | |
| S112 | ∞ | 0 (W) | | | | ST11 |
| | | 6.069171 (M) | | | | |
| | | 12.65603264 (T) | | | | |

TABLE 4-continued

| | | | | | | |
|---|---|---|---|---|---|---|
| S113 | ∞ | 0.469237424 | | | | ST12 |
| S114 | 14.33492346 | 1.973488794 | 1.671037 | 44.05754 | 10.624357 | L15 |
| S115 | −13.50758398 | 0.232781189 | | | | |
| S116 | −6.653070158 | 1 | 1.727704 | 37.10005 | −268.93814 | L16 |
| S117 | −7.323197603 | 1.405830637 (W)<br>0.700209712 (M)<br>0.370267035 (T) | | | | |
| S118 | −5.062220343 | 1 | 1.732581 | 35.5346 | −7.192297 | L17 |
| S119 | −124.3936417 | 0.700468567 (W)<br>1.405964160 (M)<br>1.736099298 (T) | | | | |
| S120 | ∞ | 3 | 2.003397 | 28.32009 | | P11, The First Incident Surface |
| S121 | ∞ | 7.998076622 | | | | P11, The First Reflective Surface |
| S122 | ∞ | 0.589608 (Object Distance = 500 mm)<br>0..490103(Object Distance = 1000 mm)<br>0.603906 (Object Distance = 3200 mm) | | | | P11, The First Exit Surface |
| S123 | 6.070231801 | 2.664505049 | 1.536919 | 70.40143 | 23.0703 | L18 |
| S124 | 10.05004807 | 3.745.2.19 (Object Distance = 500 mm)<br>3.844795(Object Distance = 1000 mm)<br>3.730909 (Object Distance = 3200 min) | | | | |

Table 5 shows the optical specification of the lens assembly 1 in FIG. 1E, when the lens assembly 1 is at middle end and the aperture of the first stop (that is, the effective diameter of the first stop) is adjusted to 8.903732 mm. Compared with the lens assembly 1 of Table 1 which also at middle end and the effective diameter of the first stop is equal to 6.632 mm, Table 5 shows that F-number has changed from 4.38 to 3.27, which means the amount of light entering the lens assembly is increased.

TABLE 5

M(Middle End) Effective Focal Length = 17.375 mm F-number = 3.27
Total Lens Length = 45.611 mm Field of View = 2.7 mm
The Effective Diameter of the First Stop = 8.903732 mm

| Surface Number | Radius of Curvature (mm) | Thickness (mm) | Nd | Vd | Effective Focal Length (mm) | Remark |
|---|---|---|---|---|---|---|
| S10 | ∞ | ∞ | | | | Object |
| S11 | ∞ | 3.2 | 1.8467 | 23.778 | | P12, The Second Incident Surface |
| S12 | ∞ | 3.2 | | | | P12, The Second Reflective Surface |
| S13 | ∞ | | | | | P12, The Second Exit Surface |
| S14 | −11.38266025 | 1 | 1.533596 | 70.40009 | −13.538536 | L11 |
| S15 | 2.05253282 | 0.17967657 | | | | |
| S16 | 24.63350185 | 1.560610345 | 1.659759 | 26.49972 | 33.362931 | L12 |
| S17 | −215.2377891 | 6.73816466 (M | | | | |
| S18 | 14.22542308 | 1 | 1.761106 | 26.5 | −29.085743 | L13 |
| S19 | 8.418462882 | 0.0761612.95 | | | | |
| S110 | 8.396058294 | 2.812462303 | 1.672838 | 70.40019 | 9.354533 | L14 |
| S111 | −21.97689326 | 0.395521163 | | | | |
| S112 | ∞ | 6.069171 (M) | | | | ST11 |
| S113 | ∞ | 0.469237424 | | | | ST12 |
| S114 | 14.33492346 | 1.973488794 | 1.671037 | 44.05754 | 10.624357 | L15 |
| S115 | −13.50758398 | 0.232781189 | | | | |
| S116 | −6.653070158 | 1 | 1.727704 | 37.10005 | −268.93814 | L16 |
| S117 | −7.323197603 | 0.700209712 (M) | | | | |
| S118 | −5.062220343 | 1 | 1.732581 | 35.5346 | −7.192297 | L17 |
| S119 | −124.3936417 | 1.405964 (M) | | | | |
| S120 | ∞ | 3 | 2.003397 | 28.32009 | | P11, The First Incident Surface |

TABLE 5-continued

| | | | | | | |
|---|---|---|---|---|---|---|
| S121 | ∞ | 7.998076622 | | | | P11, The First Reflective Surface |
| S122 | ∞ | 1.088429 | | | | P11, The First Exit Surface |
| S123 | 6.070231801 | 2.664505049 | 1.536919 | 70.40143 | 23.0703 | L18 |
| S124 | 10.05004807 | 3.246438358 | | | | |

Figure 3:
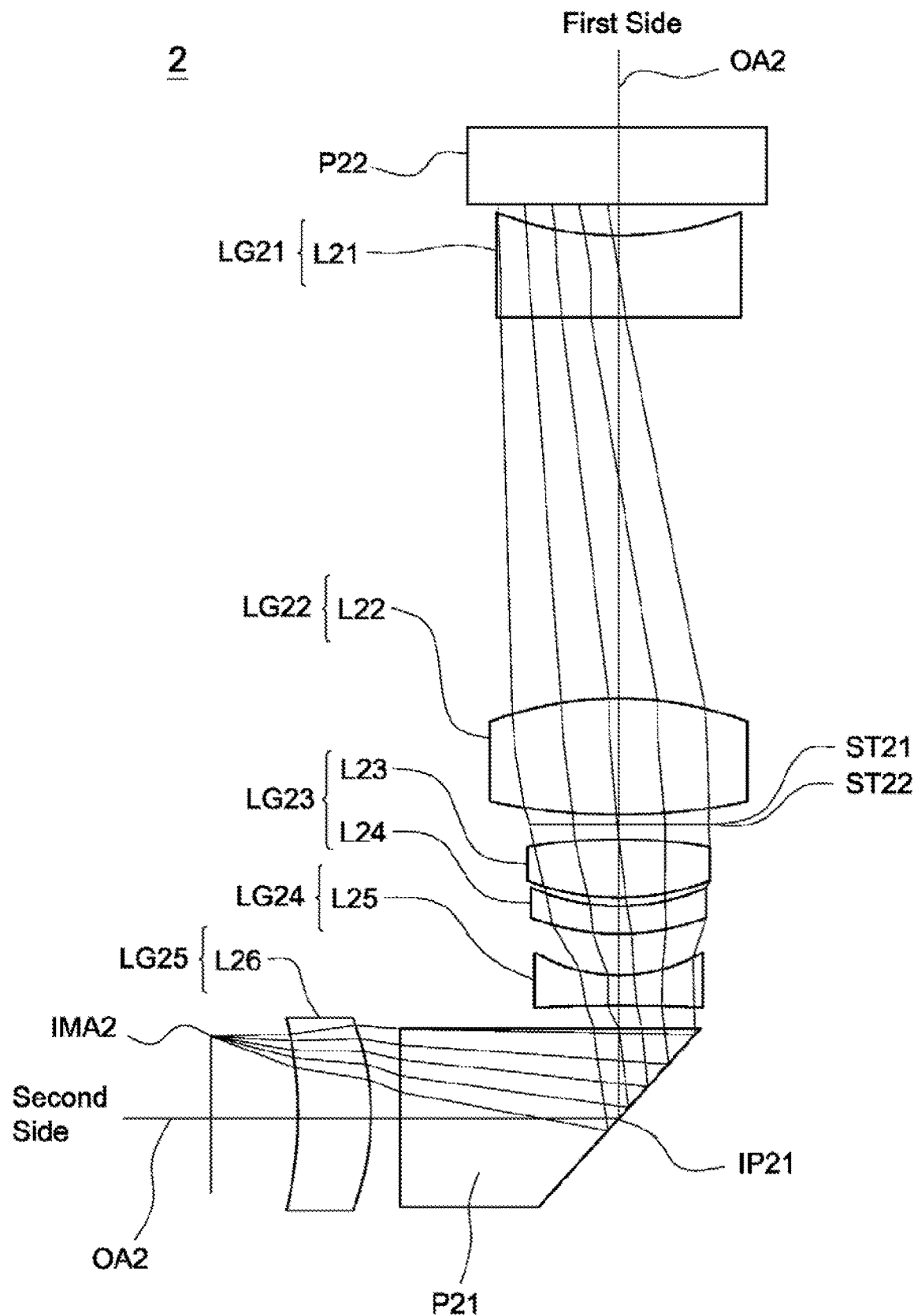
FIG. 3 is a lens layout and optical path diagram of a lens assembly at wide-angle end in accordance with a second embodiment of the invention.

Referring to FIG. 3. The lens assembly 2 includes a second reflective element P22, a first lens group LG21, a second lens group LG22, a second stop ST22, a third lens group LG23, a fourth lens group LG24, a first reflective element P21, and a fifth lens group LG25. The second reflective element P22 is a prism and includes a second incident surface, a second reflective surface (not shown), and a second exit surface. The second incident surface faces the third side (not shown) along the vertical axis VA (not shown). The second reflective surface (not shown) faces the second side along the axis OA2. The second exit surface faces the second side along the axis OA2. The second incident surface and the second exit surface are, perpendicular to each other. The second reflective element P22 can also be a reflective mirror. The second reflective element P22 can also only include one, reflective surface when the second reflective element P22 is a reflective mirror.

The first lens group LG21 is with negative refractive power and includes a 1-1 lens L21. The 1-1 lens L21 is a meniscus lens with negative refractive power and includes a concave surface facing the first side along the axis OA2 and a convex surface facing the second side along the axis OA2. The second lens group LG22 is with positive refractive power and includes a 2-1 lens L22 and a first stop ST21, both of which are arranged in order from the first side to the second side along the axis OA2. The 2-1 lens L22 is a biconvex lens with positive refractive power and includes a convex surface facing the first side along the axis OA2 and another convex surface facing the second side along the axis OA2. The first stop ST21 is a variable stop which can be driven the mechanism of the variable stop by the built-in driving element (not shown) to change the variable stop size to achieve multi-stage changes of the variable stop size. The second stop ST22 is a fixed stop which is the same as the second stop ST12 in the first embodiment, so it will not be described here again. The third lens group LG23 is with positive refractive power and includes a 3-1 lens L23 and a 3-2 lens L24, both of which are arranged in order from the first side to the second side along the axis OA2. The 3-1 lens L23 is a biconvex lens with positive refractive power and includes a convex surface facing the first side along the axis OA2 and another convex surface facing the second side along the axis OA2. The 3-2 lens L24 is a meniscus lens with negative refractive power and includes a concave surface facing the first side along the axis OA2 and a convex surface facing the second side along the axis OA2. The fourth lens group LG24 is with negative refractive power and includes a 4-1 lens L25. The 4-1 lens L25 is a meniscus lens with negative refractive power and includes a concave surface facing the first side along the axis OA2 and a convex surface facing the second side along the axis OA2.

The first reflective element P21 is a prism and includes a first incident surface, a first reflective surface, and a first exit surface. The first incident surface faces the first side along the axis OA2. The first reflective surface faces the second side along the axis OA2. The first exit surface faces the second side along the axis OA2. The first incident surface and the first exit surface are perpendicular to each other. The first reflective element P21 can also be a reflective mirror. The first reflective element P21 can also only include one reflective surface when the first reflective element P21 is a reflective mirror.

The fifth lens group LG25 is with positive refractive power and includes a 5-1 lens L26. The 5-1 lens L26 is a meniscus lens with positive refractive power and includes a convex surface facing the first side along the axis OA2 and a concave surface facing the second side along the axis OA2.

The shapes of the first stop ST21 and the second stop ST22 are the same as those of the first stop ST11 and the second stop ST12 in the first embodiment, and will not be described here again. During zooming, the movement of each lens group is the same as that of in the first embodiment, and will not be described here again. The fifth lens group LG25 can move to the second side or the point IP21 along the axis OA2 for auto focus. In operation, the optical path of the light from the third side (not shown) is similar to that of in the first embodiment, and will not be described here again.

Figure 4:
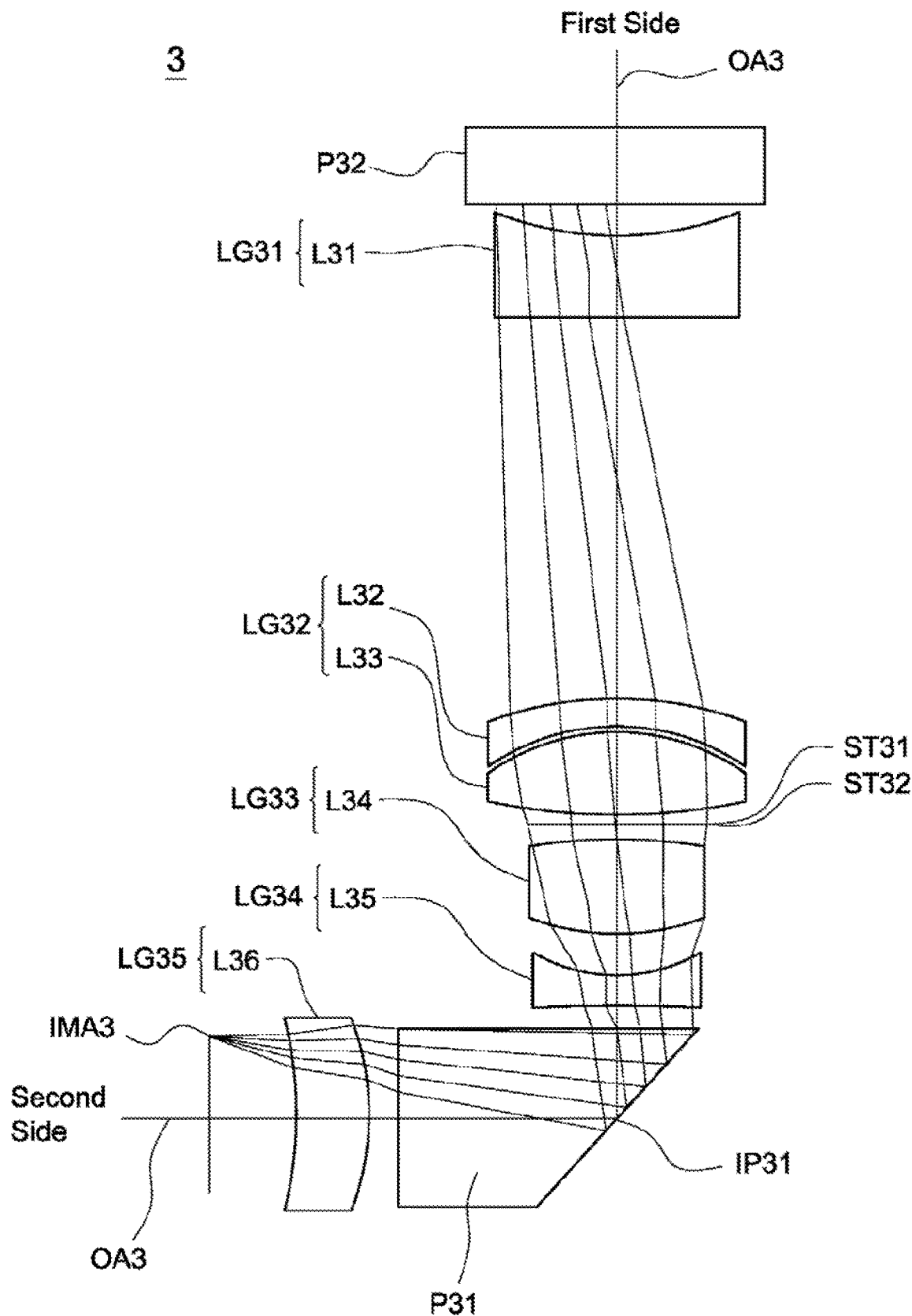
FIG. 4 is a lens layout and optical path diagram of a lens assembly at wide-angle end in accordance with a third embodiment of the invention.

Referring to FIG. 4. The lens assembly 3 includes a second reflective element P32, a first lens group LG31, a second lens group LG32, a second stop ST32, a third lens group LG33, a fourth lens group LG34, a first reflective element P31, and a fifth lens group LG35. The second reflective element P32 is a prism and includes a second incident surface, a second reflective surface (not shown), and a second exit surface. The second incident surface faces the third side (not shown) along the vertical axis VA (not shown). The second reflective surface (not shown) faces the second side along the axis OA3. The second exit surface faces the second side along the axis OA3. The second incident surface and the second exit surface are, perpendicular to each other. The second reflective element P32 can also be a reflective mirror. The second reflective element P32 can also only include one, reflective surface when the second reflective element P32 is a reflective mirror.

The first lens group LG31 is with negative refractive power and includes a 1-1 lens L31. The 1-1 lens L31 is a meniscus lens with negative refractive power and includes a concave surface facing the first side along the axis OA3 and a convex surface facing the second side along the axis OA3. The second lens group LG32 is with positive refractive power and includes a 2-2 lens L32, a 2-1 lens L33, and a first stop ST31, all of which are arranged in order from the first side to the second side along the axis OA3. The 2-2 lens L32 is a meniscus lens with negative refractive power and includes a convex surface facing the first side along the axis OA3 and a concave surface facing the second side along the axis OA3. The 2-1 lens L33 is a biconvex lens with positive refractive power and includes a convex surface facing the first side along the axis OA3 and another convex surface facing the second side along the axis OA3. The first stop ST31 is a variable stop which is the same as the first stop ST11 in the first embodiment, so it will not be described here again. The second stop ST32 is a fixed stop which is the same as the second stop ST12 in the first embodiment, so it will not be described here again. The third lens group LG33 is with positive refractive power and includes a 3-1 lens L34. The 3-1 lens L34 is a biconvex lens with positive refractive power and includes a convex surface facing the first side along the axis OA3 and another convex surface facing the second side along the axis OA3. The fourth lens group LG34 is with negative refractive power and includes a 4-1 lens L35. The 4-1 lens L35 is a meniscus lens with negative refractive power and includes a concave surface facing the first side along the axis OA3 and a convex surface facing the second side along the axis OA3.

The first reflective element P31 is a prism and includes a first incident surface, a first reflective surface, and a first exit surface. The first incident surface faces the first side along the axis OA3. The first reflective surface faces the second side along the axis OA3. The first exit surface faces the second side along the axis OA3. The first incident surface and the first exit surface are perpendicular to each other. The first reflective element P31 can also be a reflective mirror. The first reflective element P31 can also only include one reflective surface when the first reflective element P31 is a reflective mirror.

The fifth lens group LG35 is with positive refractive power and includes 5-1 lens L36. The 5-1 lens L36 is a meniscus lens with positive refractive power and includes a convex surface facing the first side along the axis OA3 and a concave surface facing the second side along the axis OA3.

The shapes of the first stop ST31 and the second stop ST32 are the same as those of the first stop ST11 and the second stop ST12 in the first embodiment, and will not be described here again. During zooming, the movement of each lens group is the same as that of in the first embodiment, and will not be described here again. The fifth lens group LG35 can move to the second side or the point IP31 along the axis OA3 for auto focus. In operation, the optical path of the light from the third side (not shown) is similar to that of in the first embodiment, and will not be described here again.

Figure 5A:
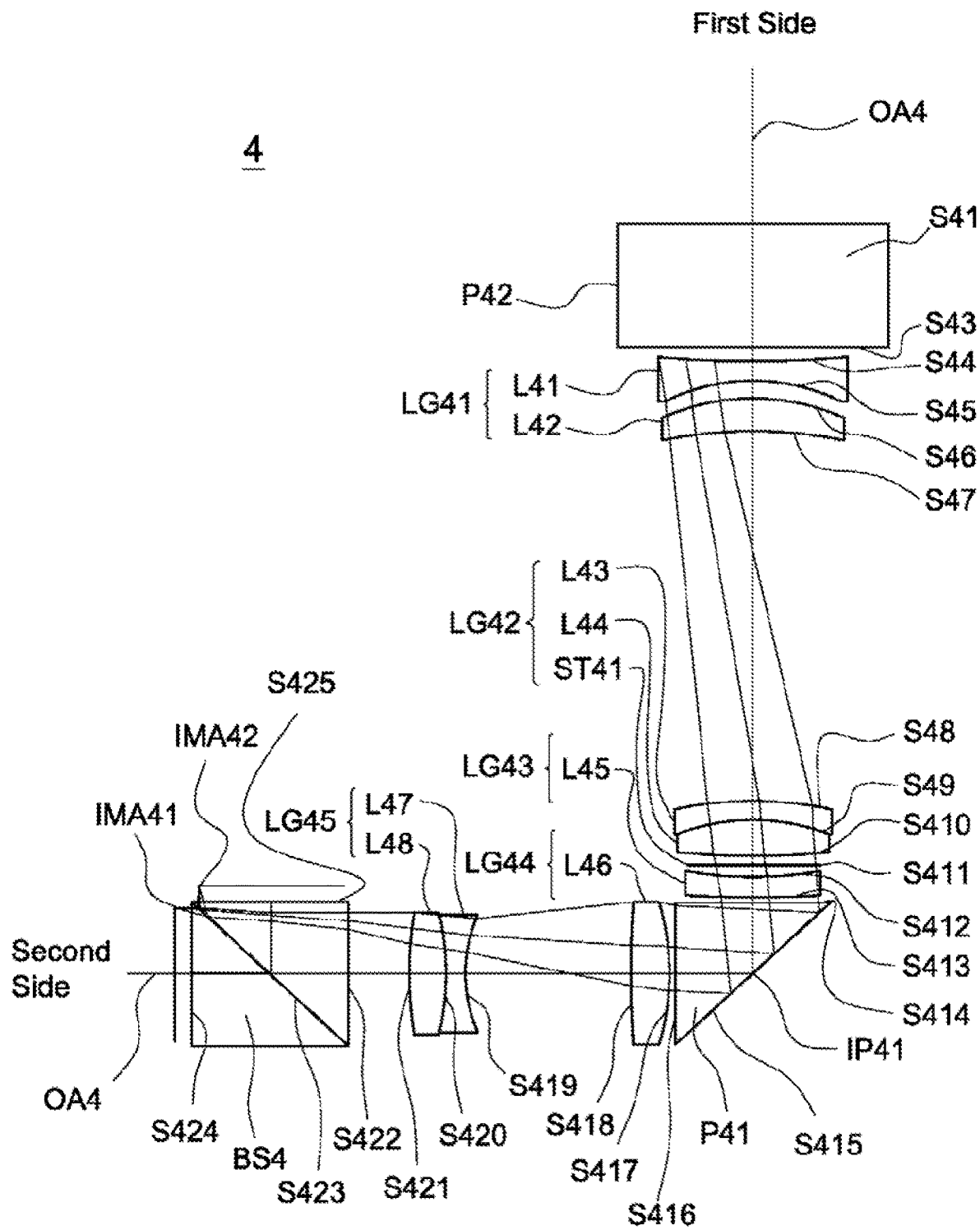
FIGS. 5A, 5B are lens layout and optical path diagrams of a lens assembly at wide-angle end and at telephoto end in accordance with a fourth embodiment of the invention respectively.
Figure 5B:
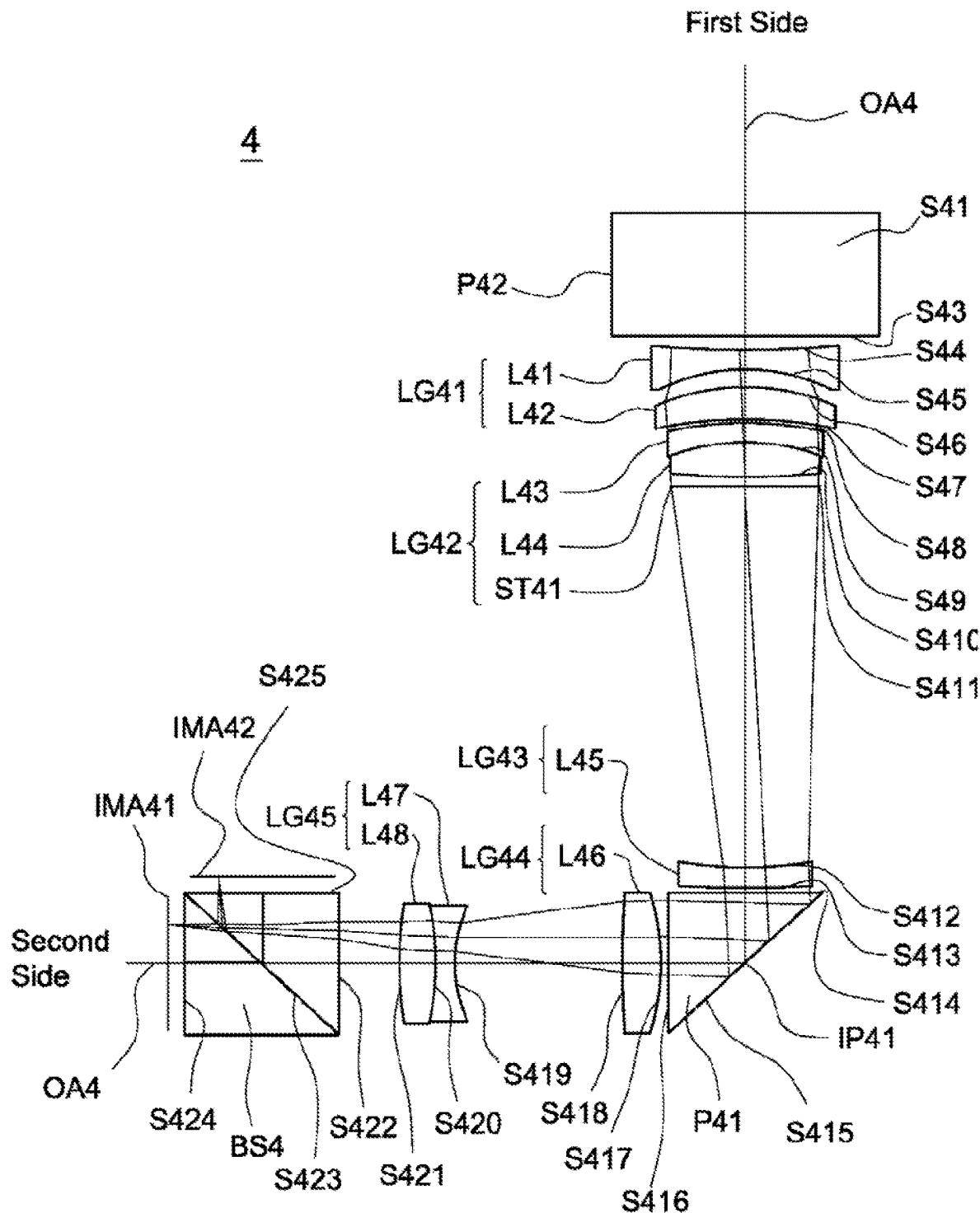

Referring to FIG. 5A and FIG. 5B. The lens assembly 4 includes a second reflective element P42, a first lens group LG41, a second lens group LG42, a third lens group LG43, a first reflective element P41, a fourth lens group LG44, a fifth lens group LG45, and a beam splitter BS4, all of which are arranged in order from a tint side to a second side along an axis OA4. The second reflective element P42 is a prism and includes a second incident surface S41, a second reflective surface S42. (not shown), and a second exit surface S43. The second incident surface S41 faces the third side (not shown) along a vertical axis VA (not shown). The second reflective surface S42 (not shown) faces the second side along the axis OA4. The second exit surface S43 faces the second side along the axis OA4. The second incident surface S41 and the second exit surface S43 are perpendicular to each other. The second reflective element P42 can also be a reflective mirror. The second reflective element P42 can also only include one reflective surface when the second reflective element P42 is a reflective mirror.

The first lens group LG41 is with negative refractive power and includes a 1-1 lens L41 and a 1-2 lens L42, both of which are arranged in order from the first side to the second side along the axis OA4. The 1-1 lens L41 is a biconcave lens with negative refractive power and includes a concave surface S44 facing the first side along the axis OA4 and another concave surface S45 facing the second side along the axis OA4. The 1-2 lens L42 is a meniscus lens with positive refractive power and includes a convex surface S46 facing the first side along the axis OA4 and a concave surface S47 facing the second side along the axis OA4. Both of the 1-1 lens L41 and the 1-2 lens L42 are spherical lenses. The second lens group LG42 is with positive refractive power and includes a 2-2 lens L43, a 2-1 lens L44, and a first stop ST41, all of which are arranged in order from the first side to the second side along the axis OA4. The 2-2 lens L43 is a meniscus lens with negative refractive power and includes a convex surface S48 facing the first side along the axis OA4 and a concave surface S49 facing the second side along the axis OA4. The 2-1 lens L44 is a biconvex lens with positive refractive power and includes a convex surface S49 facing the first side along the axis OA4 and another convex surface S410 facing the second side along the axis OA4. The first stop ST41 is a variable stop which can be driven the mechanism of the variable stop by the built-in driving element (not shown) to change the variable stop size to achieve multi-stage changes of the variable stop size. Both of the 2-2 lens L43 and the 2-1 lens L44 are spherical lenses. The third lens group LG43 is with negative refractive power and includes a 3-1 lens L45. The 3-1 lens L45 is a meniscus lens with negative refractive power and includes a concave surface S412 facing the first side along the axis OA4 and a convex surface S413 facing the second side along the axis OA4. The 3-1 lens L45 is a spherical lens.

The first reflective element P41 is a prism and includes a first incident surface S414, a first reflective surface S415, and a first exit surface S416. The first incident surface S414 faces the first side along the axis OA4. The first reflective surface S415 faces the second side along the axis OA4. The first exit surface S416 faces the second side along the axis OA4. The first incident surface S414 and the first exit surface S416 are perpendicular to each other. The first reflective element P41 can also be a reflective mirror. The first reflective element P41 can also only include one reflective surface when the first reflective element P41 is a reflective mirror. The fourth lens group LG44 is with positive refractive power and includes a 4-1 lens L46. The 4-1 lens L46 is a biconvex lens with positive refractive power and includes a convex surface S417 facing the first side along the axis OA4 and another convex surface S418 facing the second side along the axis OA4. The 4-1 lens L46 is a spherical lens. The fifth lens group LG45 is with negative refractive power and includes a 5-2 lens L47 and a 5-1 lens L48, both of which are arranged in order from the first side to the second side along the axis OA4. The 5-2 lens L47 is a biconcave, lens with negative refractive power and includes a concave surface facing S419 facing the first side along the axis OA4 and another concave surface S420 facing the second side along the axis OA4. The 5-1 lens L48 is a biconvex lens with positive refractive power and includes a convex surface S420 facing the first side along the axis OA4 and another convex surface S421 facing the second side along the axis OA4. Both of the 5-2 lens L47 and the 5-1 lens L48 are spherical lenses.

The beam splitter BS4 includes an incident surface S422, a light splitting surface S423, an exit surface S424, and another exit surface S425. The light splitting surface S423 can decompose visible light into one blue-green light (one red-green light) and one red-green light (one blue-green light) according to different wavelength range, so that the blue-green light (red-green light) penetrates the light splitting surface S423 and red-green light (blue-green light) is reflected by the light splitting surface S423.

The shape of the first stop ST4*l* is the same as that of the first stop ST11 in the first embodiment, and will not be described here again. During zooming, the first lens group LG41 is fixed, the second lens group LG42 moves to the first side along the axis OA4, the third lens group LG43 is fixed, and the fourth lens group LG44 is fixed to adjust the interval between the first lens group LG41 and the second lens group LG42 be decreased, the interval between the second lens group LG42 and the third lens group LG43 be increased, making the lens assembly 4 zooming from the wide-angle end to the telephoto end. The above-mentioned intervals change as the lens assembly 4 zooms from the wide-angle end to the telephoto end can be clearly seen in FIG. 5A and FIG. 5B. The fifth lens group LG45 can move to the second side or the point IP41 along the axis OA4 for auto focus.

In operation, the light (not shown) from the third side incident on the second reflective element P42 from the second incident surface S41, then reflected by the second reflective surface S42 (not shown to change propagation direction, sequentially passes through the second exit surface S43, the first lens group LG41, the second lens group LG42, the third lens group LG43, and the first incident surface S414, then reflected by the first reflective surface S415 to change propagation direction, then sequentially passes through the first exit surface S416, the fourth lens group LG44, the fifth lens group LG45, and finally incident on the beam splitter SB4 from the incident surface S4.22. The light splitting surface S423 can divide the light (visible light) into two different visible light bandwidths. One of the visible light bandwidth beams penetrates to the image plane IMA41 and the other visible light bandwidth beam is reflected to the image plane IMA42, for example, the blue-green light (red-green light) directly penetrates and the red-green light (blue-green light) is directly reflected. The blue-green light (red-green light) penetrates the light splitting surface S423 and then exits the beam splitter BS4 from the exit surface S424 and is imaged on the image plane IMA41. The red-green light (a blue-green light) is reflected by the light splitting surface S423 and then exits the beam splitter BS4 from the exit surface S425 and is imaged on the image plane IMA42.

In addition, the lens assembly 4 satisfies at least one of the conditions (1)-(11), wherein the definition of each parameter is the same as that of in the first embodiment, and will not be described here again. When any one of the above conditions (1)-(11) is satisfied, the refractive power of the lens assembly 4 can be effectively distributed to reduce the sensitivity of the lens assembly 4. With the above design of the lenses, stop ST41, reflective element P42, reflective element P41, beam splitter BS4, and at least any one of the conditions (1)-(11) satisfied, the lens assembly 4 can have an effectively decreased total lens length, an effective increased resolution, an effective corrected aberration, and true optical zoom function can be realized.

Table 6 shows the optical specification of the lens assembly 4 in FIG. 5A and FIG. 5B, when the leas assembly 4 is at ide-angle end and telephoto end respectively.

TABLE 6

| W(Wide-angle End) | Effective Focal Length = 15.2738 mm | F-number = 3.64 |
| --- | --- | --- |
| | Total Lens Length = 70.9181 mm | Field of View = 4.3 mm |
| | The Effective Diameter of the First Stop = 7.4110 mm | |
| T(Telephoto End) | Effective Focal Length = 42.6504 mm | F-number = 5.47 |
| | Total Lens Length = 70.9181 mm | Field of View = 2.35 mm |
| | The Effective Diameter of the First Stop = 8.4476 mm | |

| Surface Number | Radius of Curvature (mm) | Thickness (mm) | Nd | Vd | Effective Focal Length (mm) | Remark |
| --- | --- | --- | --- | --- | --- | --- |
| S40 | ∞ | ∞ | | | | Object |
| S41 | ∞ | 1.7 | 2.003397 | 28.32009 | | P42, The Second Incident Surface |
| S42 | ∞ | 3.7 | 2.003397 | 28.32009 | | P42, The Second Reflective Surface |
| S43 | ∞ | 1 | | | | P42, The Second Exit Surface |
| S44 | −51.5506 | 1.1452 | 1.51633 | 64 | −16.398504 | L41 |
| S45 | 10.2428 | 1.1159 | | | | |
| S46 | 11.9444 | 2.0738 | 1.64831 | 33.8 | 35.213406 | L42 |
| S47 | 23.1996 | 23.1040 (M) 0.1976 (T) | | | | |
| S8 | 21.4226 | 1.1452 | 1.76182 | 26.5 | −27.983501 | L43 |
| S49 | 10.4727 | 2.2588 | 1.6583.2 | 57.1 | 11.981236 | L44 |
| S410 | −29.5933 | 0.5913 | | | | |
| S411 | ∞ | 0.6257 (M) 23.5331 (T) | | | | ST4 1. |
| S412 | −20.1015 | 1.2616 | 1.650044 | 57.00025 | −41.95269 | L45 |
| S413 | −77.6590 | 0.3925 | | | | |
| S414 | ∞ | 4.4000 | 2.003397 | 28.32009 | | P41, The First Incident Surface |
| S415 | ∞ | 4.4000 | 2.003397 | 28.32009 | | P41, The First Reflective Surface |
| S416 | ∞ | 0.3758 | | | | P41, The First Exit Surface |
| S417 | 17.8194 | 2.2361 | 1.6583.2 | 57.1 | 20.282913 | L46 |
| S418 | −51.2623 | 9.2836 | | | | |
| S419 | −10.0371 | 1.1452 | 1.64831 | 33.8 | −9.633804 | L47 |
| S420 | 17.5258 | 2.1011 | 1.65832 | 57.1 | 16.179948 | L48 |
| S421 | −76.0733 | 3.4623 | | | | |
| S422 | ∞ | 4.4000 | 2.003397 | 28.32009 | | BS4, The Incident Surface |
| S423 | ∞ | 4.4000 | 2.003397 | 28.32009 | | The Light Splitting Surface |
| S424 (S425) | ∞ | 1.0000 | | | | The Exit Surface |

Table 7 shows the parameters and condition values for conditions (1)-(11) in accordance with the fourth embodiment of the invention. It can be seen from Table 7 that the lens assembly 4 of the fourth embodiment satisfies the conditions (1)-(11).

TABLE 7

| TL1 | 38.11 mm(W) 38.11 mm(T) | $D_{L4}$ | 8.72 mm | TL2 | 32.8 mm(W) 32.8 mm(T) |
|---|---|---|---|---|---|
| $D_{MAX}$ | 10.65 mm | $D_{LOBJ}$ | 10.65 mm | TTL | 70.9 mm |
| $D_{LIMG}$ | 7.26 mm | $D_{REF}$ | 10.67 mm | | |
| $TL1/D_{L4}$ | 4.37(W) 4.37(T) | TL2/DL4 | 3.76(W) 3.76(T) | $D_{REF}/D_{MAX}$ | 1.00 |
| TL1/TL2 | 1.16(W) 1.16(T) | $D_{MAX}/TL1$ | 0.28(W) 0.28(T) | $D_{MAX}/TL2$ | 0.32(W) 0.32(T) |
| $TTL/D_{LOBJ}$ | 6.66 | $TTL/D_{LIMG}$ | 9.77 | $TL1/D_{REF}$ | 157(W) 3.57(T) |
| $TL2/D_{REF}$ | 3.07(W) 3.07(T) | $TC23_{WIDE}/TC23_{TELE}$ | 115.5 | | |

Figure 6A:
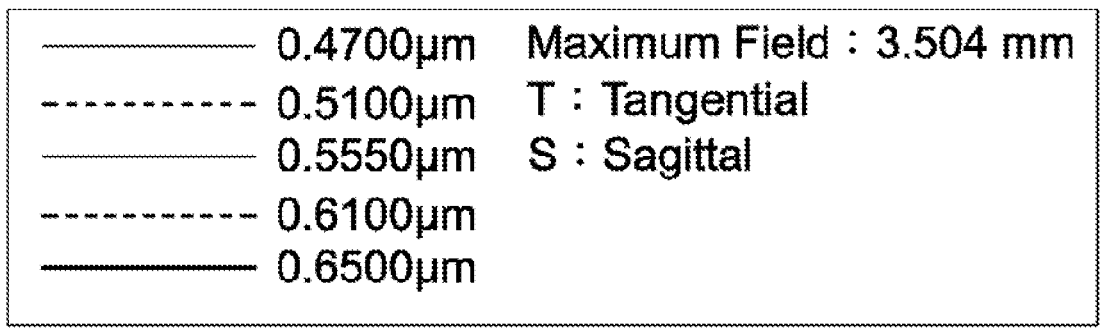
FIGS. 6A, 6B, 6C depict a field curvature diagram, distortion diagram, and modulation transfer function diagram of the lens assembly at wide-angle end in accordance with the fourth embodiment of the invention respectively.
Figure 6A:
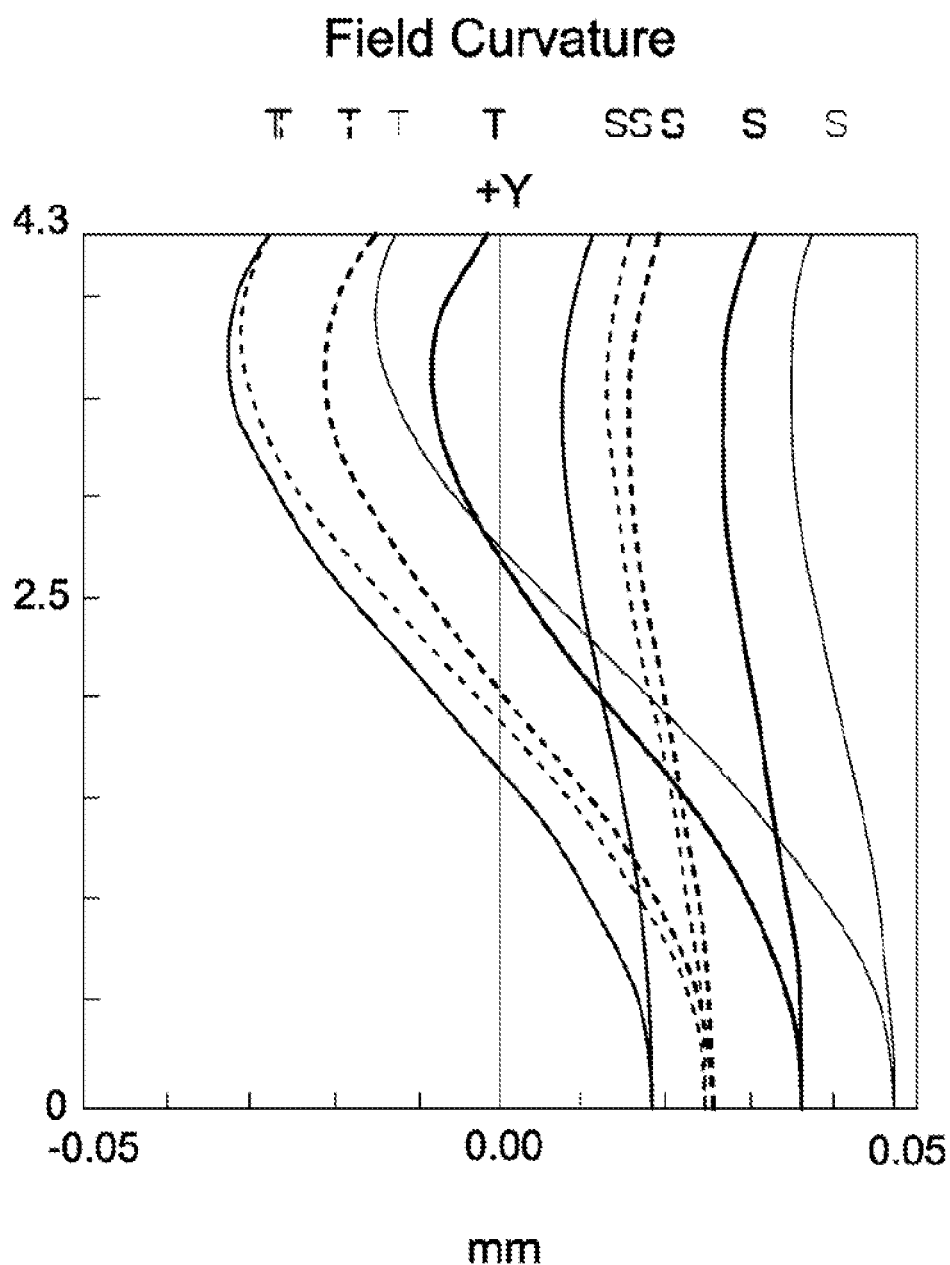
Figure 6B:
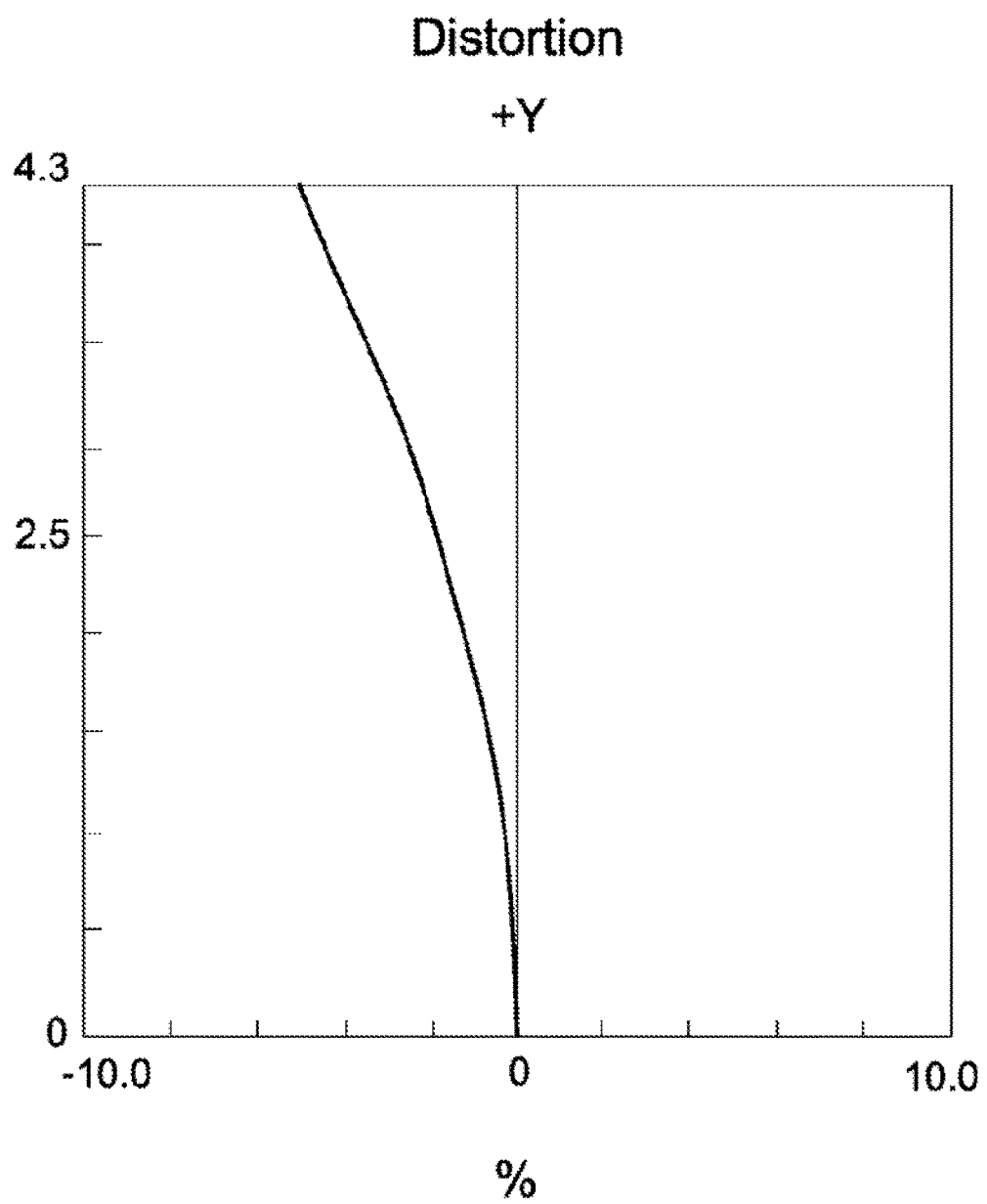
Figure 6C:
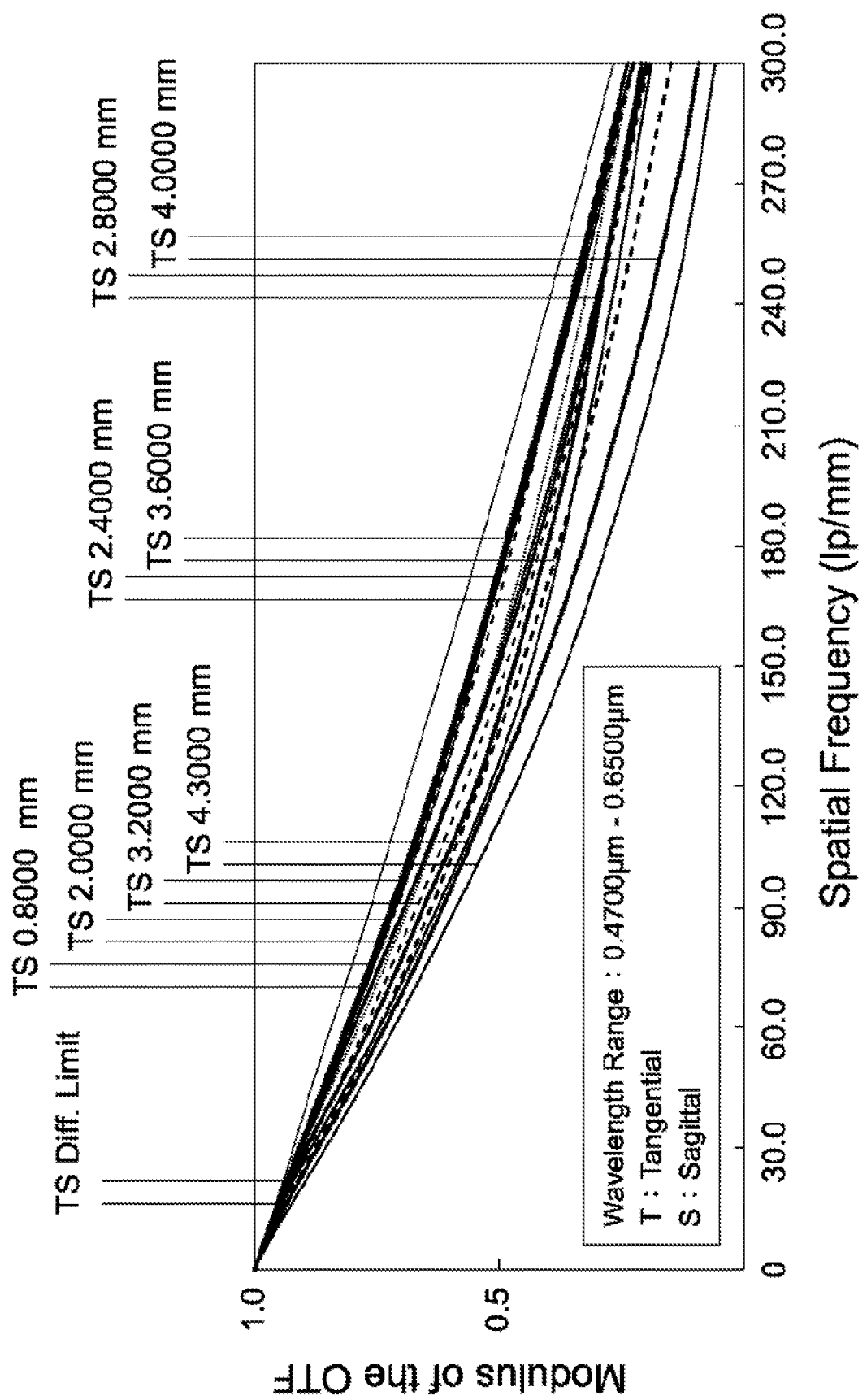

In addition, the lens assembly 4 of the fourth embodiment can meet the requirements of optical performance as seen in FIGS. 6A-6C. It can be seen from FIG. 6A that the field curvature of tangential direction and sagittal direction in the lens assembly 4 of the fourth embodiment ranges from −0.035 min to 0.05 mm. It can be seen from FIG. 6B that the distortion in the lens assembly 4 of the fourth embodiment ranges from −6% to 0%. It can be seen from FIG. 6C that the modulation transfer function of tangential direction and sagittal direction in the lens assembly 4 of the fourth embodiment ranges from 0.06 to 1.0. It is obvious that the field curvature and the distortion of the lens assembly 4 of the fourth embodiment can be corrected effectively, the image resolution can meet the requirements. Therefore, the lens assembly 4 of the fourth embodiment is capable of good optical performance.

Figure 7A:
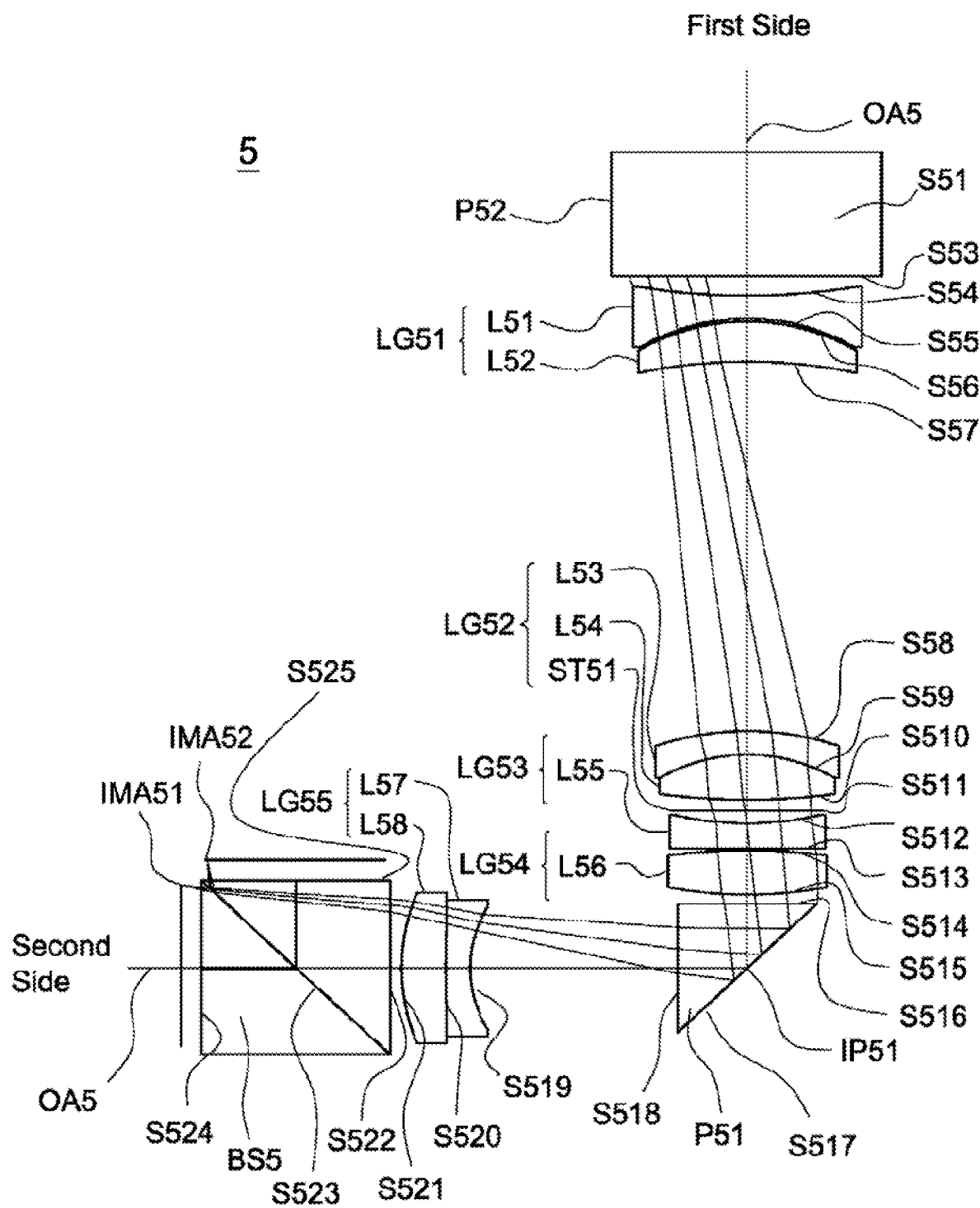
FIGS. 7A, 7B are lens layout and optical path diagrams of a lens assembly at wide-angle end and at telephoto end in accordance with a fifth embodiment of the invention respectively.
Figure 7B:
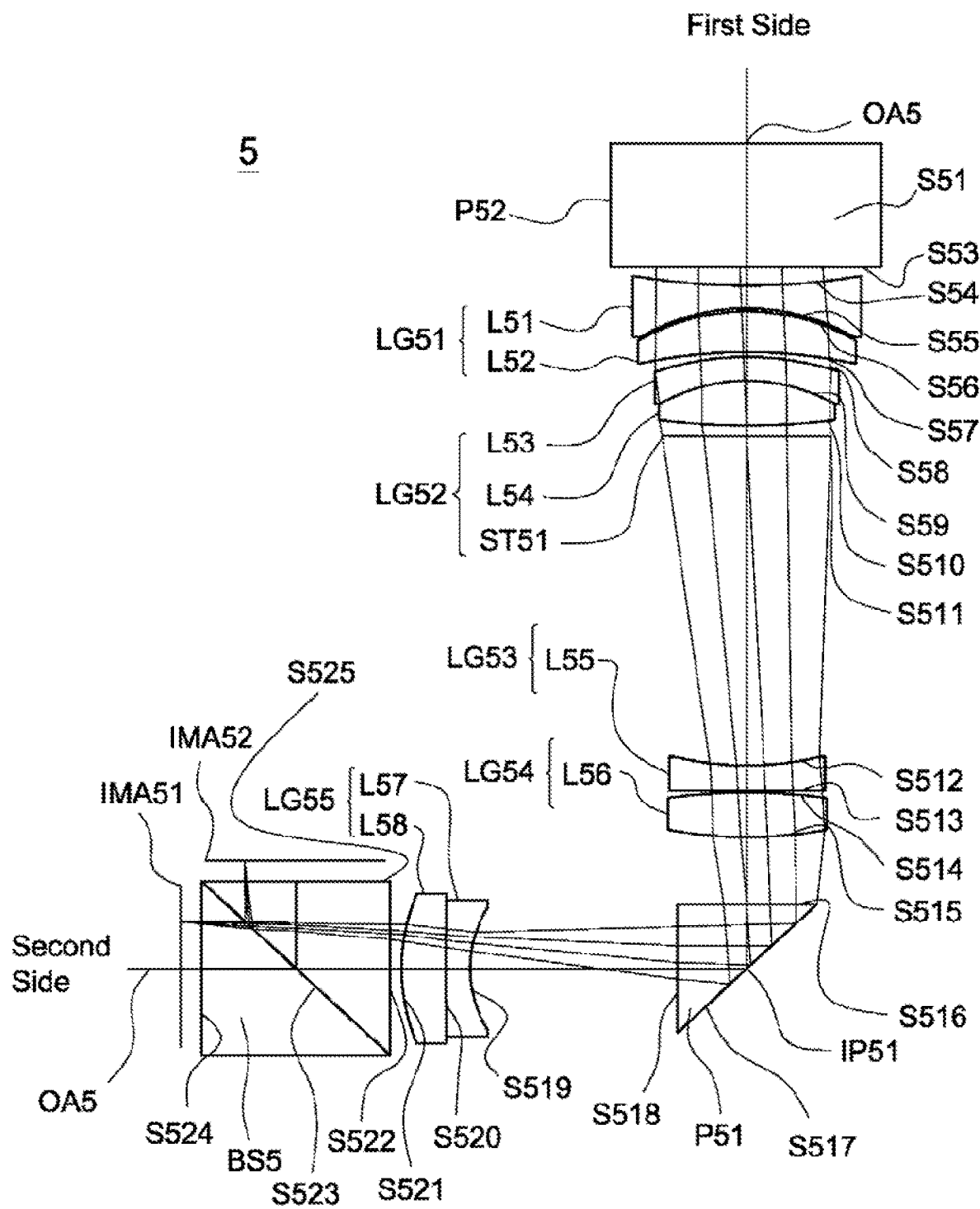

Referring to FIG. 7A and FIG. 7B. The lens assembly 5 includes a second reflective element P52, a first lens group LG51, a second lens group LG52, a third lens group LG53, a fourth lens group LG54, a first reflective element P51, a fifth lens group LG55, and a beam splitter BS5, all of which are arranged in order from a first side to a second side along an axis OA5. The second reflective element P52 is a prism and includes a second incident surface S51, a second reflective surface S52 (not shown), and a second exit surface S53. The second incident surface S51 faces a third side (not shown) along a vertical axis VA (not shown). The second reflective surface S52 (not shown) faces the second side along the axis OA5. The second exit surface S53 faces the second side along the axis OA5. The second incident surface S51 and the second exit surface S53 are perpendicular to each other. The second reflective element P52 can also be a reflective mirror. The second reflective element P52 can also only include one reflective surface when the second reflective element P52 is a reflective mirror.

The first lens group LG51 is with negative refractive power and includes a 1-1 lens L51 and a 1-2 lens L52, both of which are arranged in order from the first side to the second side along the axis OA5. The 1-1 lens L51 is a biconcave lens with negative refractive power and includes a concave surface S54 facing the first side, along the axis OA5 and another concave surface S55 facing the second side along the axis OA5. The 1-2 lens L52 is a meniscus lens with positive refractive power and includes a convex surface S56 facing the first side along the axis OA5 and a concave surface S57 facing the second side along the axis OA5. Both of the 1-1 lens L51 and the 1-2 lens L52 are spherical lenses. The second lens group LG52 is with positive refractive power and includes a 2-2 lens L53, a 2-1 lens L54, and a first stop ST51, all of which are arranged in order from the first side to the second side along the axis OA5. The 2-2 lens L53 is a meniscus lens with negative refractive power and includes a convex surface S58 facing the first side along the axis OA5 and a concave surface S59 facing the second side along the axis OA5. The 2-1 lens L54 is a biconvex lens with positive refractive power and includes a convex surface S59 facing the first side along the axis OA5 and another convex surface S510 facing the second side along the axis OA5. The first stop ST51 is a variable stop which can be driven the mechanism of the variable stop by the built-in driving element (not shown) to change the variable stop size to achieve multi-stage changes of the variable stop size. Both of the 2-2 lens L53 and the 2-1 lens L54 are spherical lenses. The third lens group LG53 is with negative refractive power and includes a 3-1 lens L55. The 3-1 lens L55 is a meniscus lens with negative refractive power and includes a concave surface S512 facing the first side along the axis OA5 and a convex surface S513 facing the second side along the axis OA5. The 3-1 lens L55 is a spherical lens. The fourth lens group LG54 is with positive refractive power and includes a 4-1 lens L56. The 4-1 lens L56 is a biconvex lens with positive refractive power and includes a convex surface S514 facing the first side along the axis OA5 and another convex surface S515 facing the second side along the axis OA5. The 4-1 lens L56 is a spherical lens.

The first reflective element P51 is a prism and includes a first incident surface S516, a first reflective surface S517, and a first exit surface S518. The first incident surface S516 faces the first side along the axis OA5. The first reflective surface S517 faces the second side along the axis OA5. The first exit surface S518 faces the second side along the axis OA5. The first incident surface S516 and the first exit surface S518 are perpendicular to each other. The first reflective element P51 can also be a reflective mirror. The first reflective element P51 can also only include one reflective surface when the first reflective element P51 is a reflective mirror.

The fifth lens group LG55 is with negative refractive power and includes a 5-2 lens L57 and a 5-1 lens L58, both of which are arranged in order from the first side to the second side along the axis OA5. The 5-2 lens L57 is a meniscus lens with negative refractive power and includes a concave surface S519 facing the first side along the axis OA5 and a convex surface S520 facing the second side along the axis OA5. The 5-1 lens L58 is a meniscus lens with positive refractive power and includes a concave surface S520 facing the first side along the axis OA5 and a convex surface S521 facing the second side along the axis OA5. Both of the 5-2 lens L57 and the 5-1 lens L58 are spherical lenses.

The beam splitter BS5 includes an incident surface S522, a light splitting surface S523, an exit surface S524, and another exit surface S525. The function of the light splitting surface S523 is the same as that of the light splitting surface S423 in the fourth embodiment, and will not be described here again. The shape of the first stop ST51 is the same as that of the first stop ST11 in the first embodiment, and will not be described here again.

During zooming, the first lens group LG51 is fixed, the second lens group LG52 moves to the first side along the axis OA5, the third lens group LG53 moves to the first side along the axis OA5, and the fourth lens group LG54 moves to the first side to adjust the interval between the first lens group LG51 and the second lens group LG52 be decreased, the interval between the second lens group LG52 and the third lens group LG53 be increased, the interval between the fourth lens group LG54 and the first reflective element P51 be increased, making the lens assembly 5 zooming from the wide-angle end to the telephoto end. The above-mentioned intervals change as the lens assembly 5 zooms from the wide-angle end to the telephoto end can be clearly seen in FIG. 7A and FIG. 7B.

conditions (1)-(11) satisfied, the lens assembly 5 can have an effectively decreased total lens length, an effective increased resolution, an effective corrected aberration, and true optical zoom function can be realized.

Table 8 shows the optical specification of the lens assembly 5 in FIG. 7A and FIG. 7B, when the lens assembly 5 is at ide-angle end and telephoto end respectively.

TABLE 8

| W(Wide-angle End) | Effective Focal Length = 15.7401 mm | | | F-number = 3.7 | | |
|---|---|---|---|---|---|---|
| | Total Lens Length = 60.5 mm | | | Field of View = 4.300 mm | | |
| | The Effective Diameter of the First Stop = 6.9851 mm | | | | | |
| T(Telephoto End) | Effective Focal Length = 44.061 mm | | | F-number = 7.8 | | |
| | Total Lens Length = 60.5 mm | | | Field of View = 2.35 mm | | |
| | The Effective Diameter of the First Stop = 7.9141 mm | | | | | |

| Surface Number | Radius of Curvature (mm) | Thickness (mm) | Nd | Vd | Effective Focal Length (mm) | Remark |
|---|---|---|---|---|---|---|
| S50 | ∞ | ∞ | | | | Object |
| S51 | ∞ | 3.2 | 2.0033 | 28.32 | | P52, The Second Incident Surface |
| S52 | ∞ | 3.2 | 2.0033 | 28.32 | | P52, The Second Reflective Surface |
| S53 | ∞ | 1 | | | | P52, The Second Exit Surface |
| S54 | −26.6909 | 1.1452 | 1.5234 | 70.4 | −12.957955 | L51 |
| S55 | 9.26013 | 0.1089 | | | | |
| S56 | 9.503319 | 2.0738 | 1.6242 | 39.848 | 25.323824 | L52 |
| S57 | 21.67997 | 18.846 (W) | | | | |
| | | 0.1976 (T) | | | | |
| S58 | 13.11183 | 1.1452 | 2.0033 | 28.32 | −21.137123 | L53 |
| S59 | 7.765575 | 2.2588 | 1.6637 | 57.1 | 9.255225 | L54 |
| S510 | −26.3876 | 0.5913 | | | | |
| S511 | ∞ | 0.6257 (W) | | | | ST51 |
| | | 16.477 (T) | | | | |
| S512 | −13.9083 | 1.2616 | 1.6524 | 34.009 | −21.233642 | L55 |
| S513 | −11145.7 | 0.0938 | | | | |
| S514 | 22.97081 | 2.2361 | 1.6583 | 33.8 | 16.859084 | L56 |
| S515 | −20.8566 | 0.4968 (W) | | | | |
| | | 3.3171 (T) | | | | |
| S516 | ∞ | 3.214 | 2.0034 | 28.32 | | P51, The First Incident Surface |
| S517 | ∞ | 3.214 | 2.0034 | 28.32 | | P51, The First Reflective Surface |
| S518 | ∞ | 9.6651 | | | | P51, The First Exit Surface |
| S519 | −6.1524 | 1.1452 | 1.6464 | 27.042 | −10.096744 | L57 |
| S520 | −103.994 | 2.1011 | 1.6602 | 57.1 | 15.711192 | L58 |
| S521 | −9.53581 | 0.4927 | | | | |
| S522 | ∞ | 4.4 | 2.0033 | 28.32 | | BS5, The Incident Surface |
| S523 | ∞ | 4.4 | 2.0033 | 28.32 | | The Light Splitting Surface |
| S524 (S525) | ∞ | 1 | | | | The Exit Surface |

The fifth lens group LG55 can move to the second side or the point IP51 along the axis OA5 for auto focus. In operation, the light path of the tight from the third side (not shown) is the same as that of in the fourth embodiment, and will not be described here again.

In addition, the lens assembly 5 satisfies at least one of the conditions (1)-(11), wherein the definition of each parameter is the same as that of in the first embodiment, and will not be described here again. When any one of the above conditions (1)-(11) is satisfied, the refractive power of the lens assembly 5 can be effectively distributed to reduce the sensitivity of the lens assembly 5. With the above design of the lenses, stop ST51, reflective element P52, reflective element P51, beam splitter BS5, and at least any one of the Table 9 shows the parameters and condition values for conditions (1)-(11) in accordance with the fifth embodiment of the invention. It can be seen from Table 9 that the lens assembly 5 of the fifth embodiment satisfies the conditions (1)-(11).

TABLE 9

| TL1 | 34.1 mm(W) | DL4 | 8.19 mm | TL2 | 26.42 mm(W) |
|---|---|---|---|---|---|
| | 34.1 mm(T) | | | | 26.42 mm(T) |
| $D_{MAX}$ | 10.65 mm | $D_{LOBJ}$ | 10.65 mm | TTL | 60.5 mm |
| $D_{LIMG}$ | 6.9 mm | $D_{REF}$ | 9.43 mm | | |
| TL1/DL4 | 4.16(W) | TL2/DL4 | 3.23(W) | $D_{REF}/$ | 0.89 |
| | 4.16(T) | | 3.23(T) | $D_{MAX}$ | |
| TL1/TL2 | 1.29(W) | $D_{MAX}$/TL1 | 0.31(W) | $D_{MAX}/$ | 0.40(W) |
| | 1.29(T) | | 0.31(T) | TL2 | 0.40(T) |

TABLE 9-continued

| TTL/ $D_{LOBJ}$ 5.68 | TTL/$D_{LIMG}$ 8.77 | TL1/ 3.62(W) |
| | | $D_{REF}$ 3.62(T) |
| TL2/$D_{REF}$ 2.80(W) | TC23$_{WIDE}$/ 94.25 | |
| 2.80(T) | TC23$_{TELE}$ | |

Figure 8A:
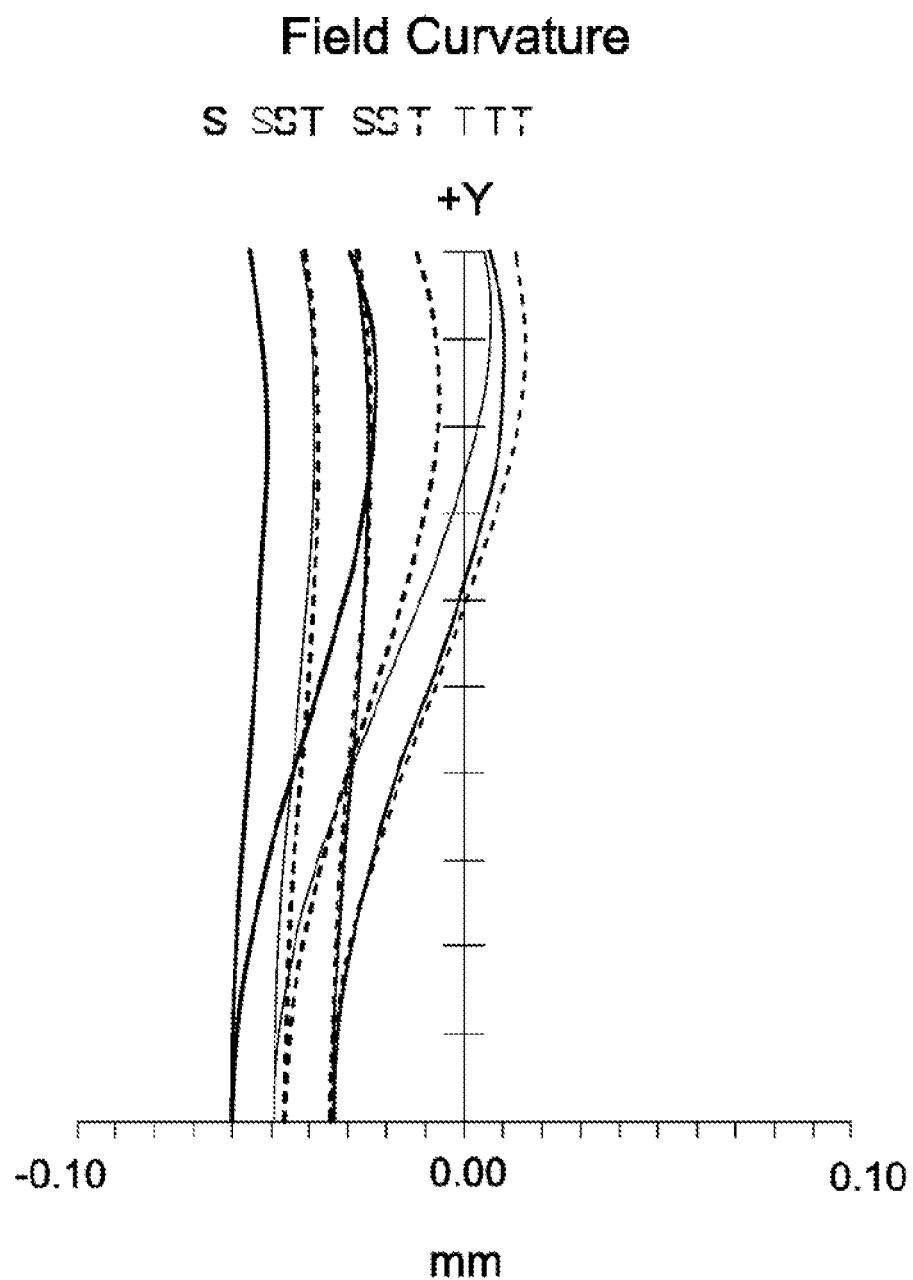
FIGS. 8A, 8B, 8C are field curvature diagram, distortion diagram, and modulation transfer function diagram of the lens assembly at wide-angle end in accordance with the fifth embodiment of the invention respectively.
Figure 8B:
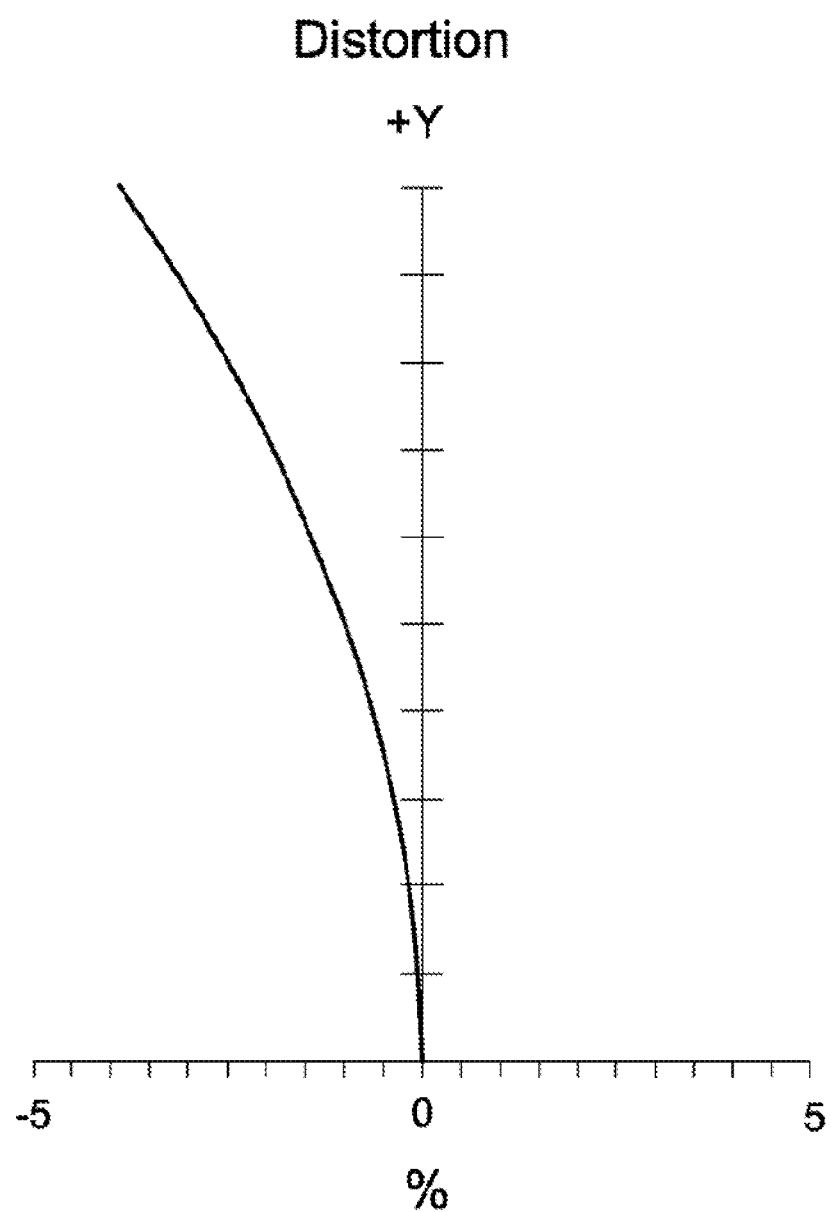
Figure 8C:
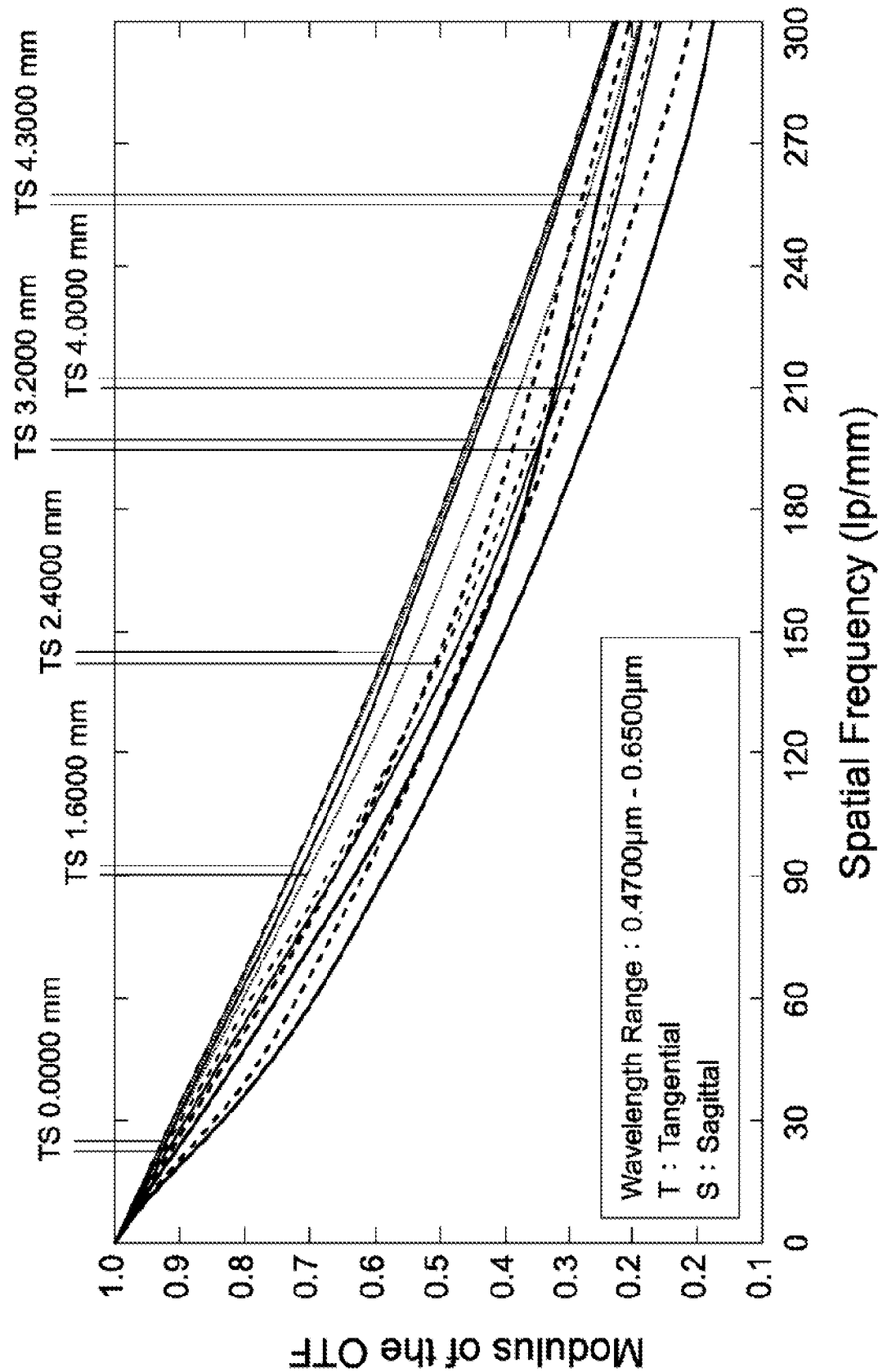

In addition the lens assembly 5 of the fifth embodiment can meet the requirements of optical performance as seen in FIGS. 8A-8C. It can be seen from FIG. 8A that the field curvature of tangential direction and sagittal direction in the lens assembly 5 of the fifth embodiment ranges from −0.06 mm to 0.02 mm. It can be seen from FIG. 8B that the distortion in the lens assembly 5 of the fifth embodiment ranges from −4% to 0%. It can be seen from FIG. 8C that the modulation transfer function of tangential direction and sagittal direction in the lens assembly 5 of the fifth embodiment ranges from 0.08 to 1.0. It is obvious that the field curvature and the distortion of the lens assembly 5 of the fifth embodiment can be corrected effectively, the image resolution can meet the requirements. Therefore, the lens assembly 5 of the fifth embodiment is capable of good optical performance.

Figure 9A:
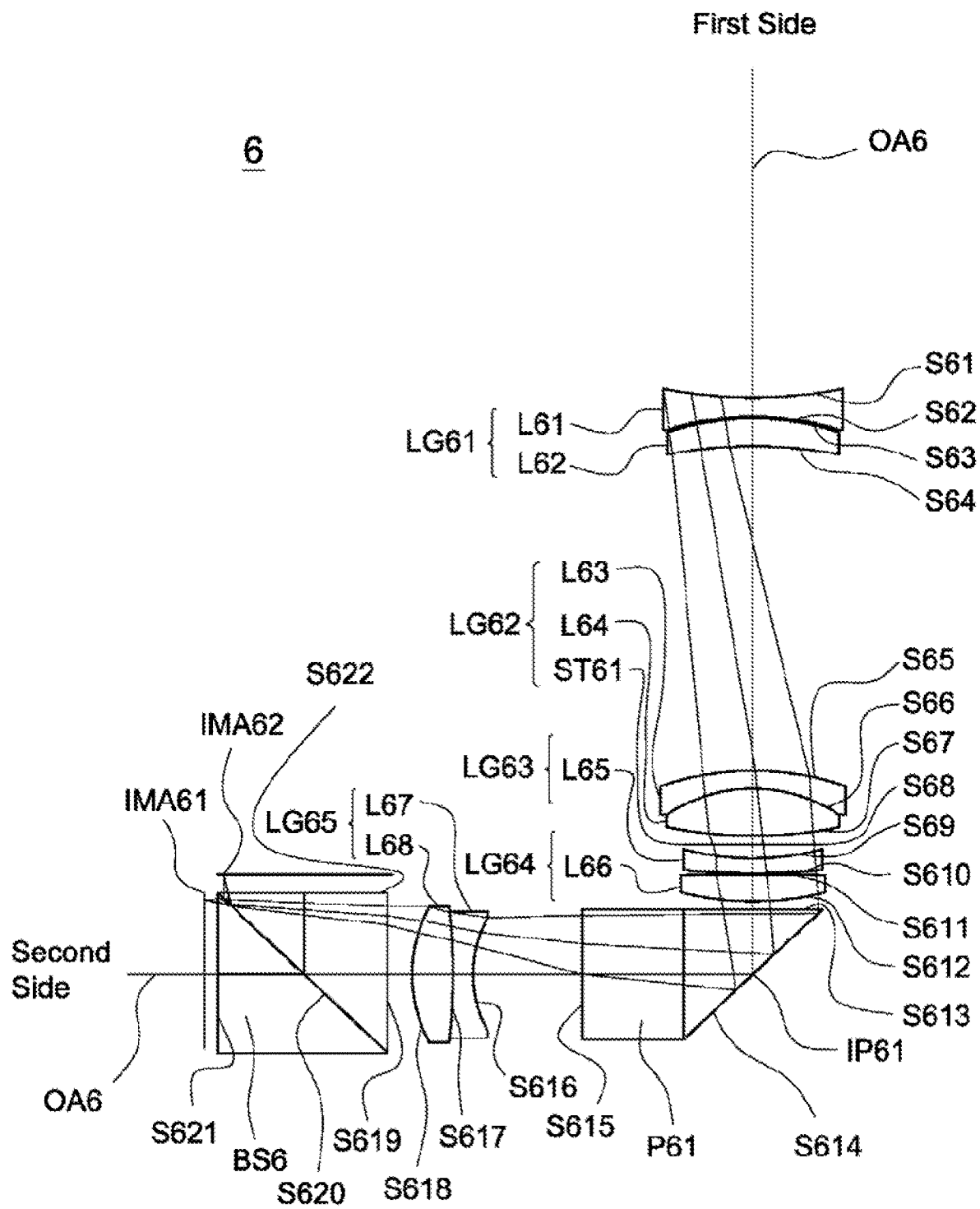
FIGS. 9A, 9B are lens layout and optical path diagrams of a lens assembly at wide-angle end and at telephoto end in accordance with a sixth embodiment of the invention respectively.
Figure 9B:
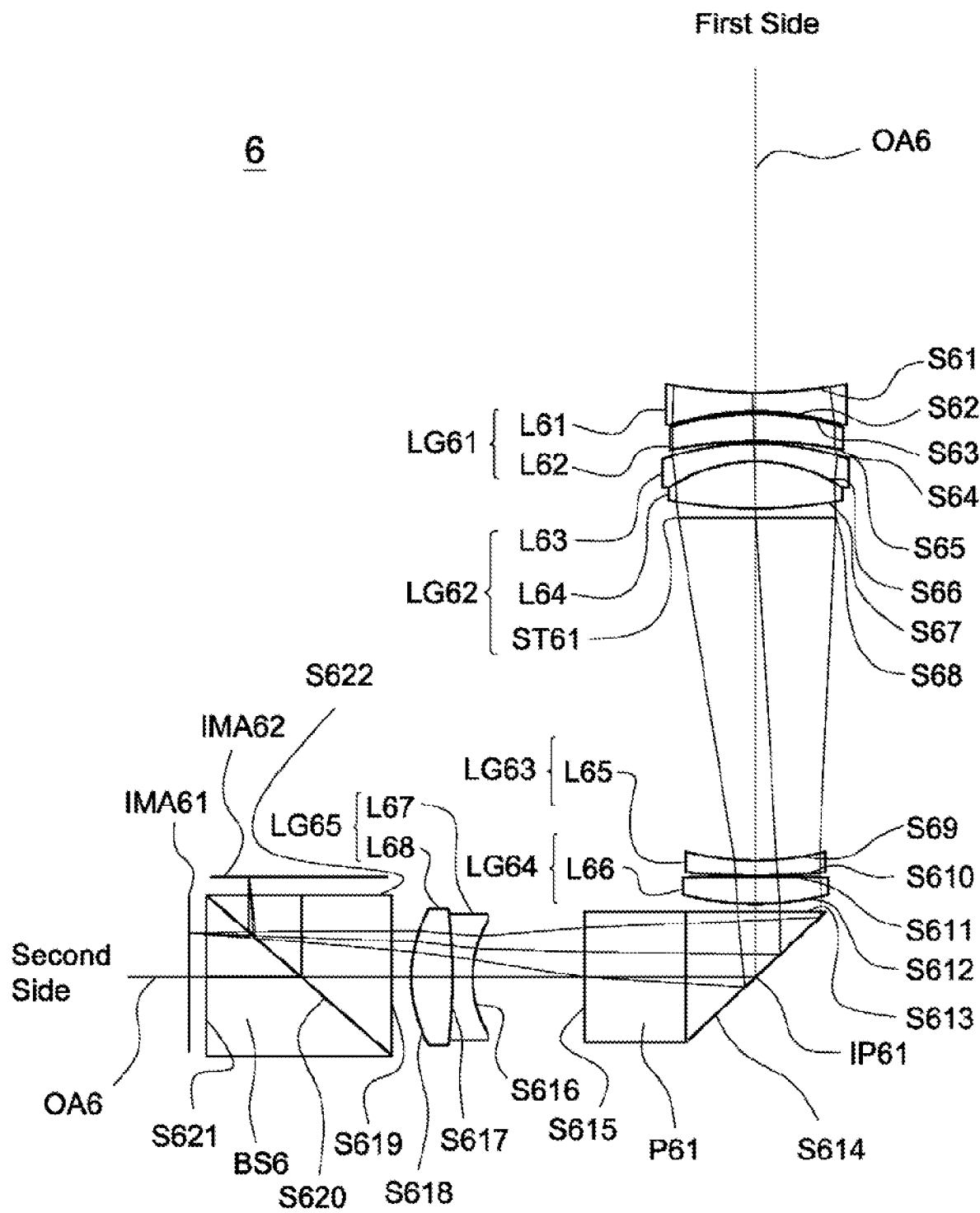

Referring to FIG. 9A and FIG. 9B. The lens assembly 6 includes a first lens group LG61, a second lens group LG62, a third lens group LG63, a fourth lens group LG64, a first reflective element P61, a fifth lens group LG65, and a beam splitter BSG, all of which are arranged in order from a first side to a second side along an axis OA6. The first lens group LG61 is with negative refractive power and includes a 1-1 lens L61 and a 1-2 lens L62, both of which are arranged in order from the first side to the second side along the axis OA6. The 1-1 lens L61 is a biconcave, lens with negative refractive power and includes a concave surface S61 facing the first side along the axis OA6 and another concave surface S62 facing the second side along the axis OA6. The 1-2 lens L62 is a meniscus lens with positive refractive power and includes a convex surface S63 facing the first side along the axis OA6 and a concave surface S64 facing the second side along the axis OA6. Both of the 1-1 lens L61 and the 1-2 lens L62 are aspheric lenses. The second lens group LG62 is with positive refractive power and includes a 2-2 lens L63, a 2-1 lens L64, and a first stop ST61, all of which are arranged in order from the first side to the second side along the axis OA6. The 2-2 lens L63 is a meniscus lens with negative refractive power and includes a convex surface S65 facing the first side along the axis OA6 and a concave surface S66 facing the second side along the axis OA6. The 2-1 lens L64 is a biconvex lens with positive refractive power and includes a convex surface S66 facing the first side along the axis OA6 and another convex surface S67 facing the second side along the axis OA6. The first stop ST61 is a variable stop which can be driven by the mechanism of the variable stop by the built-in driving element (not shown) to change the variable stop size to achieve multi-stage changes of the variable stop size. Both of the 2-2 lens L63 and the 2-1 lens L64 are spherical lenses. The third lens group LG63 is with negative refractive power and includes a 3-1 lens L65. The 3-1 lens L65 is a meniscus lens with negative refractive power and includes a concave surface S69 facing the first side along the axis OA6 and a convex surface S610 facing the second side along the axis OA6. The 3-1 lens L65 is an aspheric lens. The fourth lens group LG64 is with positive refractive power and includes a 4-1 lens L66. The 4-1 lens L66 is a biconvex lens with positive refractive power and includes a convex surface S611 facing the first side along the axis OA6 and another convex surface S612 facing the second side along the axis OA6. The 4-1 lens L66 is an aspheric lens.

The first reflective element P61 is a prism and includes a first incident surface S613, a first reflective surface S614, and a first exit surface S615. The first incident surface S613 faces the first side along the axis OA6. The first reflective surface S614 faces the second side along the axis OA6. The first exit surface S615 faces the second side along the axis OA6. The first incident surface S613 and the first exit surface S615 are perpendicular to each other. The first reflective element P61 can also be a reflective mirror. The first reflective element P61 can also only include one reflective surface when the first reflective element P61 is a reflective mirror.

The fifth lens group LG65 is with negative refractive power and includes a 5-2 lens L67 and a 5-1 lens L68, both of which are arranged in order from the first side to the second side along the axis OA6. The 5-2 lens L67 is a biconcave lens with negative refractive power and includes a concave surface S616 facing the first side along the axis OA6 and another concave surface S617 facing the second side, along the axis OA6. The 5-1 lens L68 is a biconvex lens with positive refractive power and includes a convex surface S617 facing the first side along the axis OA6 and another convex surface S618 facing the second side along the axis OA6. Both of the 5-2 lens L67 and the 5-1 lens L68 are spherical lenses.

The beam splitter BS6 includes an incident surface S619, a light splitting surface S620, an exit surface S621, and another exit surface S622. The function of the light splitting surface S620 is the same as that of the light splitting surface S423 in the fourth embodiment, and ill not be described here again. The shape of the first stop ST61 is the same as that of the first stop ST11 in the first embodiment, and will not be described here again.

During zooming, the first lens group LG61 is fixed, the second lens group LG62 moves to the first side along the axis OA6, the third lens group LG63 is fixed, and the fourth lens group LG64 is fixed to adjust the interval between the first lens group LG61 and the second lens group LG62 be decreased, the interval between the second lens group LG62 and the third lens group LG63 be increased, making the lens assembly 6 zooming from the wide-angle end to the telephoto end. The above-mentioned intervals change as the lens assembly 6 zooms from the wide-angle end to the telephoto end can be clearly seen in FIG. 9A and FIG. 9B.

The fifth lens group LG65 can move to the second side or the point IP61 along the axis OA6 far auto focus. In operation, the light path of the light from the third side (not shown) is the same as that of in the fourth embodiment, and will not be described here again.

In addition, the lens assembly 6 satisfies at least one of the conditions (1)-(11), wherein the definition of each parameter is the same as that of in the first embodiment, and will not be described here again. When any one of the above, conditions (1)-(11) is satisfied, the refractive power of the lens assembly 6 can be effectively distributed to reduce the sensitivity of the lens assembly 6. With the above design of the lenses, stop ST61, reflective element P61, beam splitter BS6, and at least any one of the conditions (1)-(11) satisfied, the lens assembly 6 can have an effectively decreased total lens length, an effective increased resolution, an effective corrected aberration, and true optical zoom function can be realized.

Table 10 shows the optical specification of the lens assembly 6 in FIG. 9A and FIG. 9B, when the lens assembly 6 is at ide-angle end and telephoto end respectively.

TABLE 10

W(Wide-angle End) Effective Focal Length = 15.0245 mm  F-number = 3.56
Total Lens Length = 59.0526 mm  Field of View = 4.300 mm
The Effective Diameter of the First Stop = 6.94 mm
T(Telephoto End) Effective Focal Length = 44.0393 mm  F-number = 5.61
Total Lens Length = 59.0526 mm  Field of View = 2.35 mm
The Effective Diameter of the First Stop = 7.81 mm

| Surface Number | Radius of Curvature (mm) | Thickness (mm) | Nd | Vd | Effective Focal Length (mm) | Remark |
|---|---|---|---|---|---|---|
| S60 | ∞ | ∞ | | | | Object |
| S61 | −21.72698 | 0.9999225 | 1.510488 | 64.212328 | −16.0698 | L61 |
| S62 | 13.44665 | 0.09201584 | | | | |
| S63 | 12.65265 | 1.478291 | 2.003307 | 23.289542 | 45.2791 | L62 |
| S64 | 16.45816 | 17.6253 (W) | | | | |
| | | 0.197612 (T) | | | | |
| S65 | 13.23593 | 0.9941129 | 2.003307 | 28.31737 | −18.0429 | L63 |
| S66 | 7.376885 | 2.522269 | 1.691807 | 55.258426 | 8.21916 | L64 |
| S67 | −21.64357 | 0.501323 | | | | |
| S68 | ∞ | 0.7097243 (W) | | | | ST61 |
| | | 18.3502 (T) | | | | |
| S69 | −12.06564 | 0.7971656 | 1.820425 | 40.000635 | −24.5505 | L65 |
| S610 | −30.78198 | 0.09 | | | | |
| S611 | 47.54077 | 1.43721 | 1.643151 | 32.442026 | 19.0267 | L66 |
| S612 | −16.40551 | 0.4449116 | | | | |
| S613 | ∞ | 3.5 | 2.003397 | 28.320089 | | P61, The First Incident Surface |
| S614 | ∞ | 8.5 | 2.003397 | 28.320089 | | P61, The First Reflective Surface, P61, The First Exit Surface |
| S615 | ∞ | 5.536662 | | | | |
| S616 | −6.891162 | 0.9987156 | 1.675104 | 27.508353 | −7.92832 | L67 |
| S617 | 26.13955 | 2.060601 | 1.521754 | 57.1 | 11.8974 | L68 |
| S618 | −7.95349 | 0.9643317 | | | | |
| S619 | ∞ | 4.4 | 2.003307 | 28.31737 | | BS6, The Incident Surface |
| S620 | ∞ | 4.4 | 2.003307 | 28.31737 | | The Light Splitting Surface |
| S621 (S622) | ∞ | 1 | | | | The Exit Surface |

The definition of aspheric surface sag z of each aspheric lens in table 10 is the same as that of in Table 1, and is not described here again. In the sixth embodiment, the conic constant k and the aspheric coefficients A, B, C, D, E, F, G of each aspheric lens are shown in Table 11.

TABLE 11

| Surface Number | k | A | B | C | D | E | F | G |
|---|---|---|---|---|---|---|---|---|
| S61 | 0.605534 | −8.2521E−06 | −4.2900E−06 | 1.1144E−07 | 1.6441E−08 | 1.9782E−11 | −4.1374E−11 | 8.8215E−13 |
| S62 | −0.05297 | −9.8776E−06 | 3.9308E−07 | −1.1968E−08 | 5.7062E−09 | 1.5351E−10 | −5.6251E−12 | 3.4005E−13 |
| S63 | 0.069091 | −5.1377E−07 | −2.7525E−06 | −8.2468E−08 | −7.3903E−09 | −9.2040E−11 | 4.4839E−12 | 3.3640E−13 |
| S64 | 0.180518 | 2.0777E−06 | −3.2906E−06 | −2.7644E−07 | 4.1752E−10 | 1.3338E−10 | −4.2991E−12 | −1.8689E−13 |
| S69 | −0.46605 | 2.3596E−05 | 2.0210E−06 | 2.7809E−07 | 1.8273E−08 | 1.0821E−09 | 4.9151E−11 | −2.2898E−11 |
| S610 | −2.79878 | 7.3967E−06 | 2.0203E−06 | 7.9069E−08 | 1.2561E−08 | 1.2412E−09 | 2.8550E−11 | −1.5229E−11 |
| S611 | −49.0118 | −1.1863E−04 | −7.7431E−06 | −2.1814E−07 | −3.4040E−08 | −8.2242E−09 | 1.8031E−10 | 2.7308E−11 |
| S612 | 2.164263 | −1.0333E−04 | −8.4585E−07 | −5.8238E−07 | −4.2275E−08 | −5.2315E−09 | 2.5239E−10 | 1.3735E−11 |

Table 12 shows the parameters and condition values for conditions (1)-(11) in accordance with the sixth embodiment of the invention. It can be seen from Table 12 that the lens assembly 6 of the sixth embodiment satisfies the conditions (1)-(11).

TABLE 12

| | | | | | |
|---|---|---|---|---|---|
| TL1 | 31.2 mm(W) | $D_{L4}$ | 8.65 mm | TL2 | 27.9 mm(W) |
| | 31.2 mm(T) | | | | 27.9 mm(T) |
| $D_{MAX}$ | 9.11 mm | $D_{LOBJ}$ | 8.93 mm | TTL | 59.1 mm |
| $D_{LIMG}$ | 6.76 mm | $D_{REF}$ | 7 mm | | |
| $TL1/D_{L4}$ | 3.61(W) | | | $TL2/D_{L4}$ | 3.23(W) |
| | 3.61(T) | | | | 3.23(T) |
| TL1/TL2 | 1.12(W) | | | $D_{MAX}/TL1$ | 0.29(W) |
| | 1.12(T) | | | | 0.29(T) |
| $TTL/D_{LOBJ}$ | 6.62 | | | $TTL/D_{LIMG}$ | 8.74 |
| $TL2/D_{REF}$ | 3.99(W) | | | $TC23_{WIDE}$ | 88.15 |
| | 3.99(T) | | | $TC23_{TELE}$ | |
| $D_{REF}/D_{MAX}$ | 0.77 | | | | |
| $D_{MAX}/TL2$ | 0.33(W) | | | | |
| | 0.33(T) | | | | |
| $TL1/D_{REF}$ | 4.46(W) | | | | |
| | 4.46(T) | | | | |

Figure 10A:
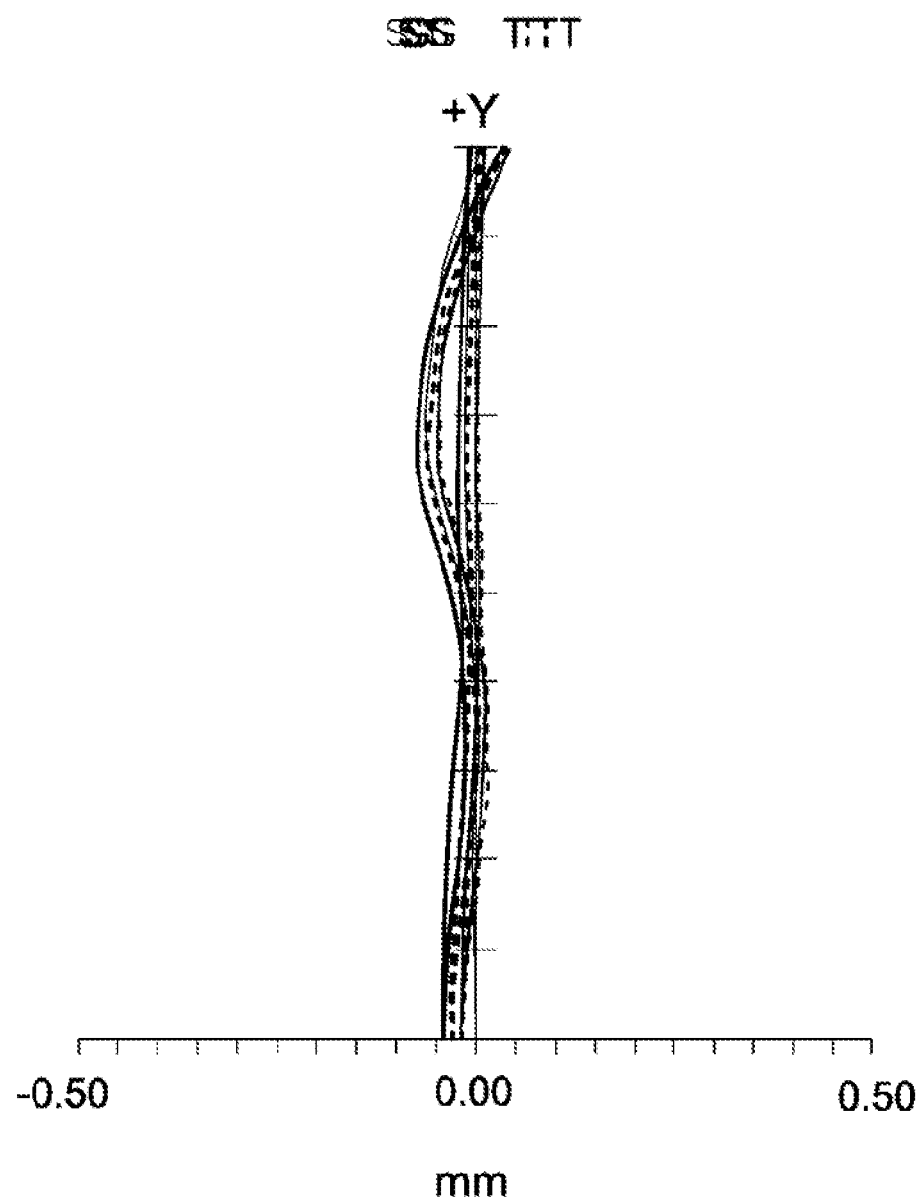
FIGS. 10A, 10B, 10C are field curvature diagram, distortion diagram, and modulation transfer function diagram of the lens assembly at wide-angle end in accordance with the sixth embodiment of the invention respectively.
Figure 10B:
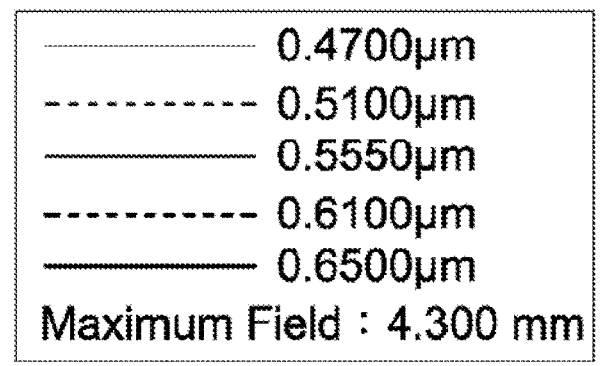
Figure 10B:
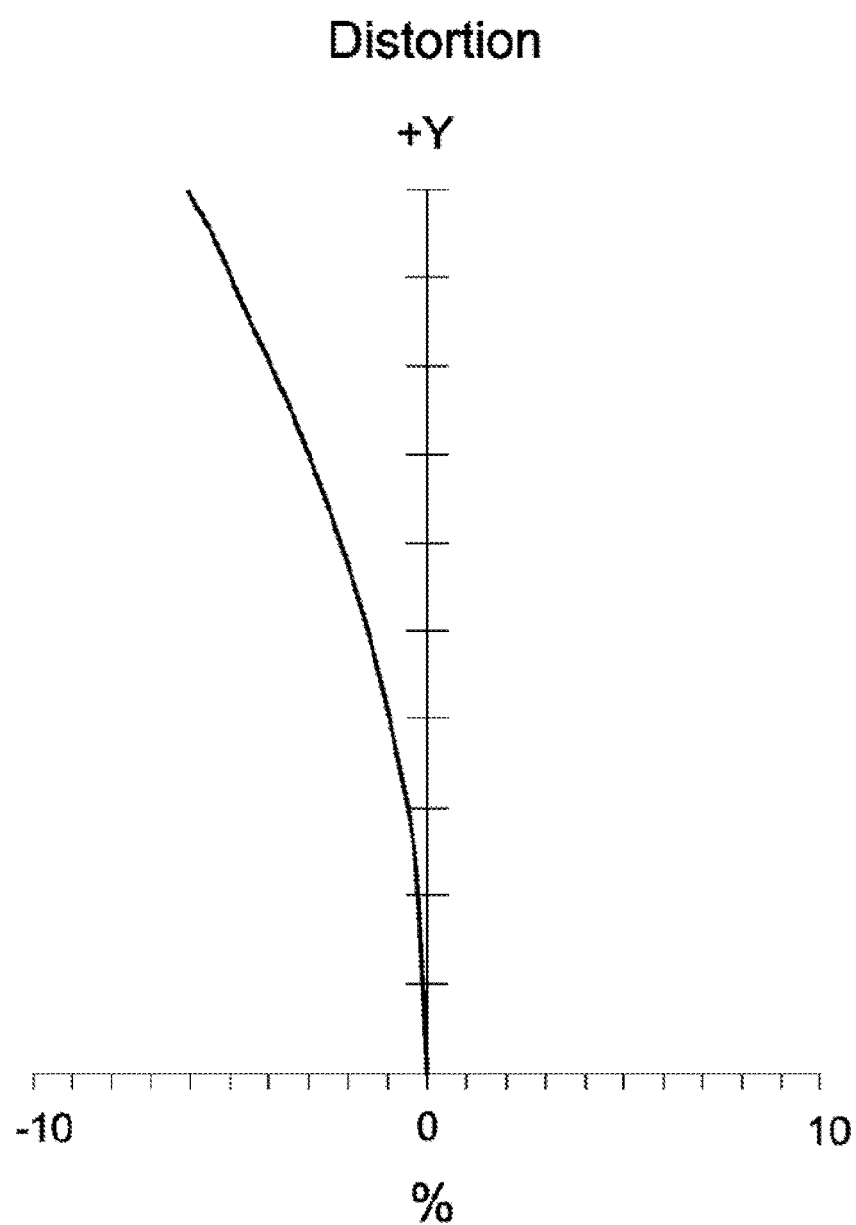
Figure 10C:
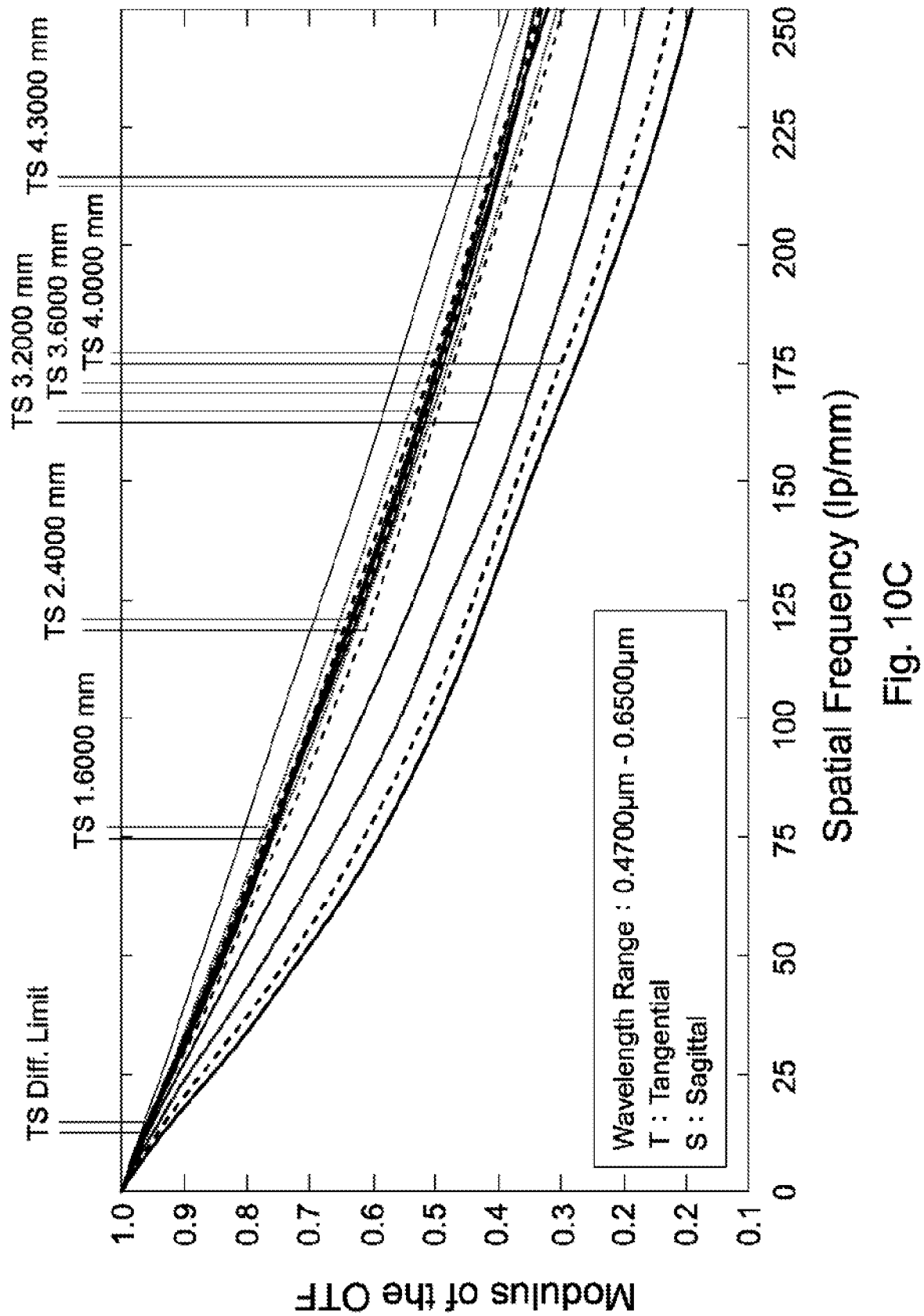

In addition, the lens assembly 6 of the sixth embodiment can meet the requirements of optical performance as seen in FIGS. 10A-10C. It can be seen from FIG. 10A that the field curvature of tangential direction and sagittal direction in the lens assembly 6 of the sixth embodiment ranges from −0.1 mm to 0.05 mm. It can be seen from FIG. 10B that the distortion in the lens assembly 6 of the sixth embodiment ranges from −6% to 0%. It can be seen from FIG. 10C that the modulation transfer function of tangential direction and sagittal direction in the lens assembly 6 of the sixth embodiment ranges from 0.1 to 1.0. It is obvious that the field curvature and the distortion of the lens assembly 6 of the sixth embodiment can be corrected effectively, the image resolution can meet the requirements. Therefore, the lens assembly 6 of the sixth embodiment is capable of good optical performance.

Figure 11A:
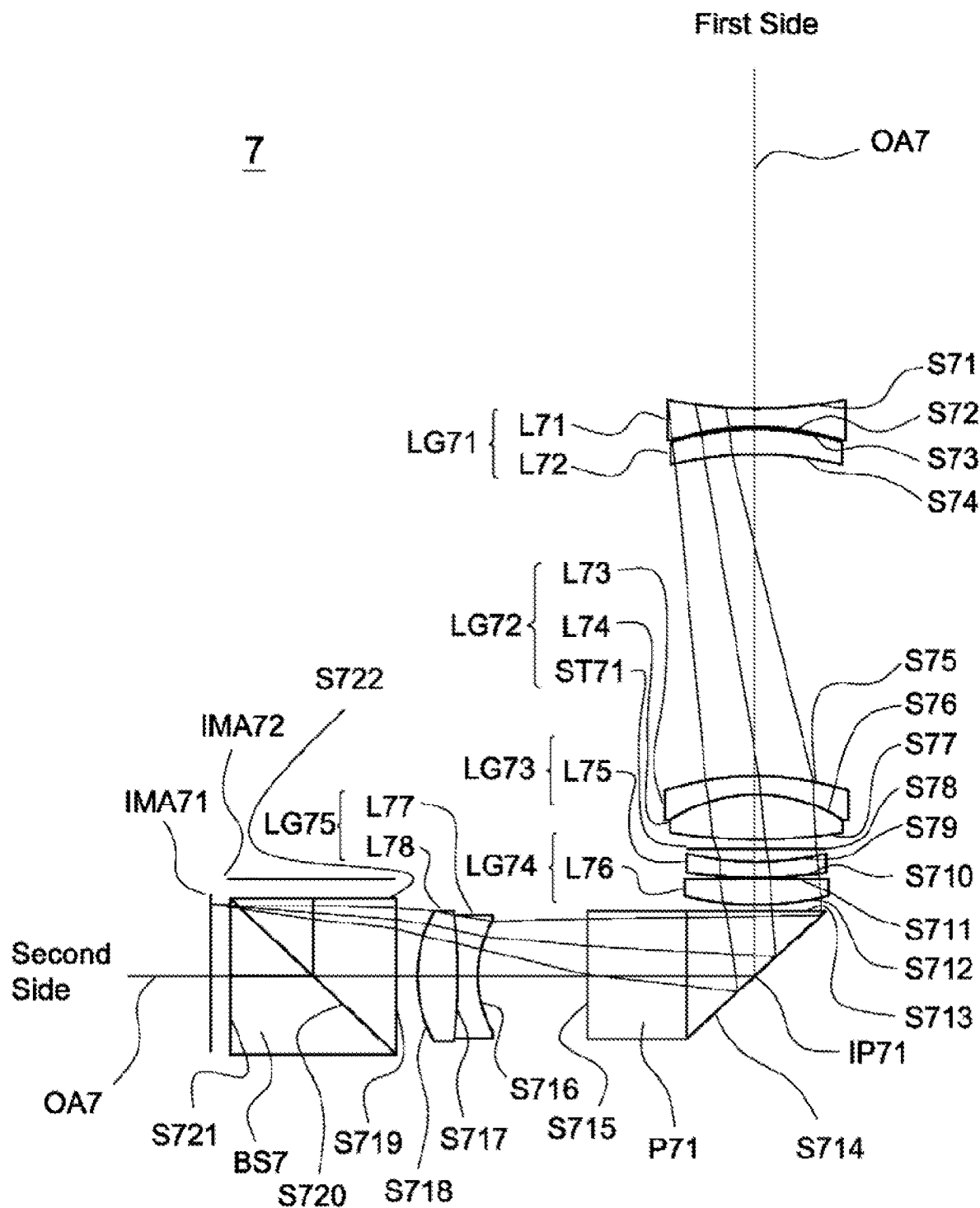
FIGS. 11A, 11B are lens layout and optical path diagrams of a lens assembly at wide-angle end and at telephoto end in accordance with a seventh embodiment of the invention respectively.
Figure 11B:
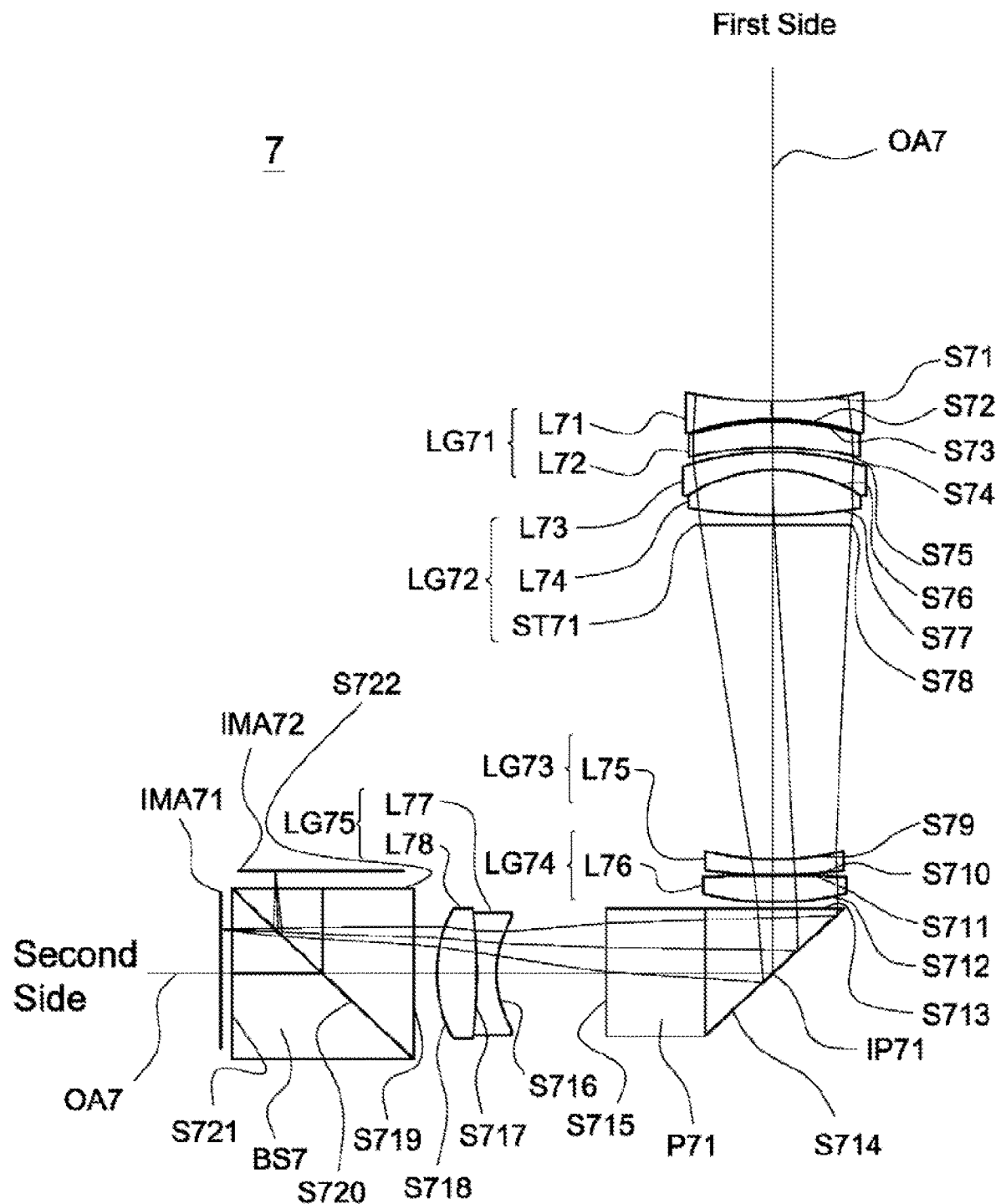

Referring to FIG. 11A and FIG. 11B. The lens assembly 7 includes a first lens group LG71, a second lens group LG72, a third lens group LG73, a fourth lens group LG74, a first reflective element P71, a fifth lens group LG75, and a beam splitter BS7 all of which are arranged in order from a first side to a second side along an axis OA7. The first lens group LG71 is with negative refractive power and includes a 1-1 lens L71 and a 1-2 lens L72, both of which are arranged in order from the first side to the second side along the axis OA7. The 1-1 lens L71 is a biconcave lens with negative refractive power and includes a concave surface S71 facing the first side along the axis OA7 and another concave surface S72 facing the second side along the axis OA7. The 1-2 lens L72 is a meniscus lens with positive refractive power and includes a convex surface S73 facing the first side along the axis OA7 and a concave surface S74 facing the second side along the axis OA7. Both of the 1-1 lens L71 and the 1-2 lens L72 are aspheric lenses. The second lens group LG72 is with positive refractive power and includes a 2-2 lens L73, a 2-1 lens L74, and a first stop ST71, all of which are arranged in order from the first side to the second side along the axis OA7. The 2-2 lens L73 is a meniscus lens with negative refractive power and includes a convex surface S75 facing the first side along the axis OA7 and a concave surface S76 facing the second side along the axis OA7. The 2-1 lens L74 is a biconvex lens with positive refractive power and includes a convex surface S76 facing the first side along the axis OA6 and another convex surface S77 facing the second side along the axis OA7. The first stop ST71 is a variable stop which can be driven the mechanism of the variable stop by the built-in driving element (not shown) to change the variable stop size to achieve multi-stage changes of the variable stop size. Both of the 2-2 lens L73 and the 2-1 lens L74 are spherical lenses. The third lens group LG73 is with negative refractive power and includes a 3-1 lens L75. The 3-1 lens L75 is a meniscus lens with negative refractive power and includes a concave surface S79 facing the first side along the axis OA7 and a convex surface S710 facing the second side along the axis OA7. The 3-1 lens L75 is an aspheric lens. The fourth lens group LG74 is with positive refractive power and includes a 4-1 lens L76. The 4-1 lens L76 is a biconvex lens with positive refractive power and includes a convex surface S711 facing the first side along the axis OA7 and another convex surface S712 facing the second side along the axis OA7. The 4-1 lens L76 is an aspheric lens.

The first reflective element P71 is a prism and includes a first incident surface S713, a first reflective surface S714 and a first exit surface S715. The first incident surface S713 faces the first side alone the axis OA7. The first reflective surface S714 faces the second side along the axis OA7. The first exit surface S715 faces the second side alone the axis OA7. The first incident surface S713 and the first exit surface S715 are perpendicular to each other. The first reflective element P71 can also be a reflective mirror. The first reflective element P71 can also only include one reflective surface when the first reflective element P71 is a reflective mirror.

The fifth lens group LG75 is with negative refractive power and includes a 5-2 lens L77 and a 5-1 lens L78, both of which are arranged in order from the first side to the second side along the axis OA7. The 5-2 lens L77 is a biconcave lens with negative refractive power and includes a concave surface S716 facing the first side along the axis OA7 and another concave surface S717 facing the second side along the axis OA7. The 5-1 lens L78 is a biconvex lens with positive refractive power and includes a convex surface S717 facing the first side along the axis OA7 and another convex surface S718 facing the second side along the axis OA7. Both of the 5-2 lens L77 and the 5-1 lens L78 are spherical lenses.

The beam splitter BS7 includes an incident surface S719, a light splitting surface S720, an exit surface S721, and another exit surface S722. The function of the light splitting surface S720 is the same as that of the light splitting surface S42.3 in the fourth embodiment, and will not be described here again. The shape of the first stop ST71 is the same as that of the first stop ST11 in the first embodiment, and will not be described here again.

During zooming, the first lens group LG71 is fixed, the second lens group LG72 moves to the first side along the axis OA7, the third lens group LG73 is fixed, and the fourth lens group LG74 is fixed to adjust the interval between the first lens group LG71 and the second lens group LG72 be decreased, the interval between the second lens group LG72 and the third lens group LG73 be increased, making the lens assembly 7 zooming from the wide-angle end to the telephoto end. The above-mentioned intervals change as the lens assembly 7 zooms from the wide-angle end to the telephoto end can be clearly seen in FIG. 11A and FIG. 11B.

The fifth lens group LG75 can move to the second side or the point IP71 along the axis OA7 for auto focus. In operation, the light path of the light from the third side (not shown) is the same as that of in the fourth embodiment, and will not be described here again.

In addition, the lens assembly 7 satisfies at least one of the conditions (1)-(11), wherein the definition of each parameter is the same as that of in the first embodiment, and will not be described here again. When any one of the above conditions (1)-(11) is satisfied, the refractive power of the lens assembly 7 can be effectively distributed to reduce the sensitivity of the lens assembly 7. With the above design of the lenses, stop ST71, reflective element P71, beam splitter BS7, and at least any one of the conditions (1)-(11) satisfied, the lens assembly 7 can have an effectively decreased total lens length, an effective increased resolution, an effective corrected aberration, and true optical zoom function can be realized.

Table 13 shows the optical specification of the lens assembly 7 in FIG. 11A and FIG. 11B, when the lens assembly 7 is at wide-angle end and telephoto end respectively.

TABLE 13

| | | | | | F-number = 3.58 | |
|---|---|---|---|---|---|---|
| W(Wide-angle End) | Effective Focal Length = 15.0297 mm | | | | | |
| | Total Lens Length = 59.185 mm | | | | Field of View | |
| | | | The Effective Diameter of the First Stop = 7.084 mm | | | |
| T(Telephoto) End | Effective Focal Length = 43.9948 mm | | | | F-number = 5.64 | |
| | Total Lens Length = 59.185 mm | | | | Field of View = 2.35 mm | |
| | | | The Effective Diameter of the First Stop = 7.797 mm | | | |

| Surface Number | Radius of Curvature (mm) | Thickness (mm) | Nd | Vd | Effective Focal Length (mm) | Remark |
|---|---|---|---|---|---|---|
| S70 | ∞ | ∞ | | | | Object |
| S71 | −22.94997 | 0.9806425 | 1.522076 | 64.2.13772 | −15.623 | L71 |
| S72 | 12.89615 | 0.09634989 | | | | |
| S73 | 12.46179 | 1.205115 | 2.003307 | 26.964224 | 42.7605 | L72 |
| S74 | 16.66474 | 18.40732 (W) | | | | |
| | | 0.195055 (T) | | | | |
| S75 | 13.07442 | 0.981252 | 2.003307 | 28.31737 | −17.977 | L73 |
| S76 | 7.3135 | 2.596359 | 1.693805 | 52.765167 | 8.0872 | L74 |
| S77 | −20.89947 | 0.4948374 | | | | |
| S78 | | 0.6853101 (W) | | | | ST71 |
| | | 15.98254 (T) | | | | |
| S79 | −11.58154 | 0.7868526 | 1.832291 | 40.000028 | −22.6345 | L75 |
| S710 | −30.77326 | 0.08172539 | | | | |
| S711 | 45.8138 | 1.418617 | 1.647604 | 33.800362 | 18.4978 | L76 |
| S712 | −16.13891 | 0.439243 | | | | |
| S713 | ∞ | 3.5 | 2.003397 | 28.320089 | | P71, The First Incident Surface |
| S714 | ∞ | 8.344755 | 2.003397 | 28.320089 | | P71, The First Reflective Surface |
| S715 | ∞ | 5.610515 | | | | P71, The First Exit Surface |
| S716 | −6.750817 | 0.9870629 | 1.669252 | 28.32 | −6.61257 | L77 |
| S717 | 13.85867 | 2.033943 | 1.532502 | 57.1 | 10.0796 | L78 |
| S718 | −8.356062 | 0.8618852 | | | | |
| S719 | ∞ | 4.343077 | 2.003307 | 28.31737 | | BS7, The Incident Surface |
| S720 | ∞ | 4.343077 | 2.003307 | 28.31737 | | The Light Splitting Surface |
| S721 (S722) | ∞ | 0.9870629 | | | | The Exit Surface |

The definition of aspheric surface sag z of each aspheric lens in table 13 is the same as that of in Table 1, and is not described here again.

In the seventh embodiment, the conic constant k and the aspheric coefficients A, B, C, D, E, F, G of each aspheric lens are shown in Table 14.

TABLE 14

| Surface Number | k | A | B | C | D | E | F | G |
|---|---|---|---|---|---|---|---|---|
| S71 | −2.19753 | 1.2037E−05 | −2.7426E−06 | 1.3463E−07 | 5.4523E−09 | 2.7361E−10 | 4.0142E−12 | −8.0340E−13 |
| S72 | 0.008939 | −5.0656E−06 | 4.9166E−06 | 1.1412E−09 | 7.4214E−09 | 2.2891E−10 | −3.8136E−13 | −1.1847E−12 |
| S73 | −0.03465 | −6.9026E−06 | −2.5862E−06 | −5.5345E−08 | −1.0640E−08 | −8.1505E−10 | −8.0190E−12 | 8.6588E−13 |
| S74 | 0.03678 | 2.5656E−06 | −2.8241E−06 | −3.6127E−07 | −1.2784E−08 | −2.1059E−10 | −3.0311E−12 | 6.0928E−13 |
| S79 | −0.54075 | 3.0100E−05 | 3.3269E−06 | 3.9374E−07 | 4.0048E−08 | 3.6970E−09 | 2.5172E−11 | −3.3037E−11 |
| S710 | −4.29291 | 1.2859E−05 | 4.0305E−06 | 2.4030E−07 | 3.2645E−08 | 1.9717E−09 | 1.8866E−11 | −1.9793E−11 |
| S711 | −29.6583 | −1.3357E−04 | −7.2523E−06 | −4.1475E−07 | −8.1685E−08 | −1.0972E−08 | 3.9946E−11 | 3.8029E−11 |
| S712 | 2.144044 | −9.2351E−05 | −2.2845E−06 | −1.0099E−06 | −6.3232E−08 | −7.6981E−09 | 2.5046E−10 | 1.5873E−11 |

Table 15 shows the parameters and condition values for conditions (1)-(11) in accordance with the seventh embodiment of the invention. It can be seen from Table 15 that the lens assembly 7 of the seventh embodiment satisfies the conditions (1)-(11).

TABLE 15

| TL1 | 31.7 mm(W) | $D_{L4}$ | 9.06 mm | TL2 | 27.5 mm(W) |
|---|---|---|---|---|---|
| | 31.7 mm(T) | | | | 27.5 mm(T) |
| $D_{MAX}$ | 9.51 mm | $D_{LOBJ}$ | 8.92 mm | TTL | 59.2 mm |
| $D_{LIMG}$ | 6.7 mm | $D_{REF}$ | 7 mm | | |
| TL1/$D_{L4}$ | 3.50(W) | TL2/$D_{L4}$ | 3.04(W) | $D_{REF}$/ | 0.74 |
| | 3.50(T) | | 3.04(T) | $D_{MAX}$ | |
| TL1/TL2 | 1.15(W) | $D_{MAX}$/TL1 | 0.30(W) | $D_{MAX}$/ | 0.35(W) |
| | 1.15(T) | | 0.30(T) | TL2 | 0.35(T) |
| TTL/$D_{LOBJ}$ | 6.64 | TTL/$D_{LIMG}$ | 8.84 | TL1/ | 4.53(W) |
| | | | | $D_{REF}$ | 4.53(T) |

TABLE 15-continued

| | | | |
|---|---|---|---|
| $TL2/D_{REF}$ | 3.93(W) | $TC23_{WIDE}/$ | 92.05 |
| | 3.93(T) | $TC23_{TELE}$ | |

Figure 12A:
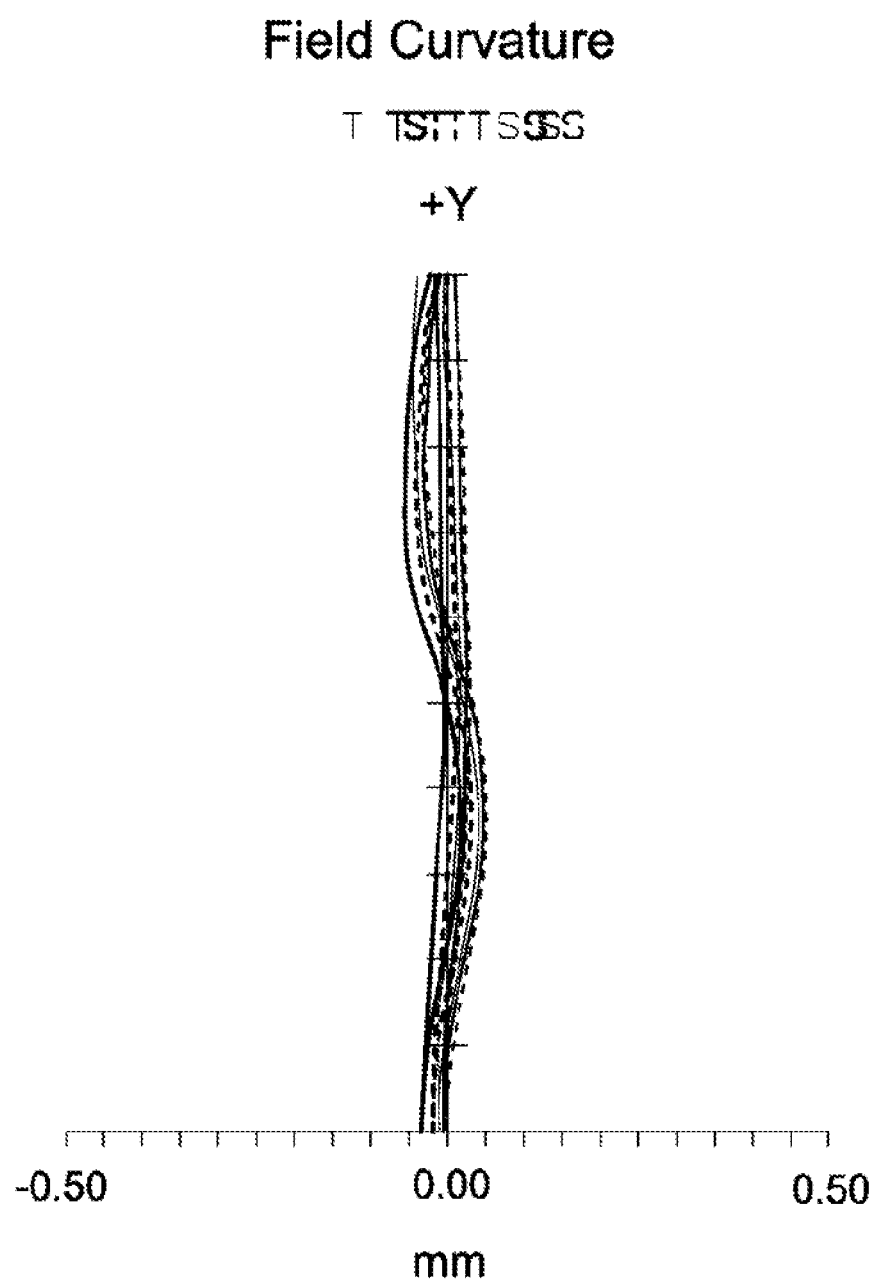
FIGS. 12A, 12B, 12C are field curvature diagram, distortion diagram, and modulation transfer function diagram of the lens assembly at wide-angle end in accordance with the seventh embodiment of the invention.
Figure 12B:
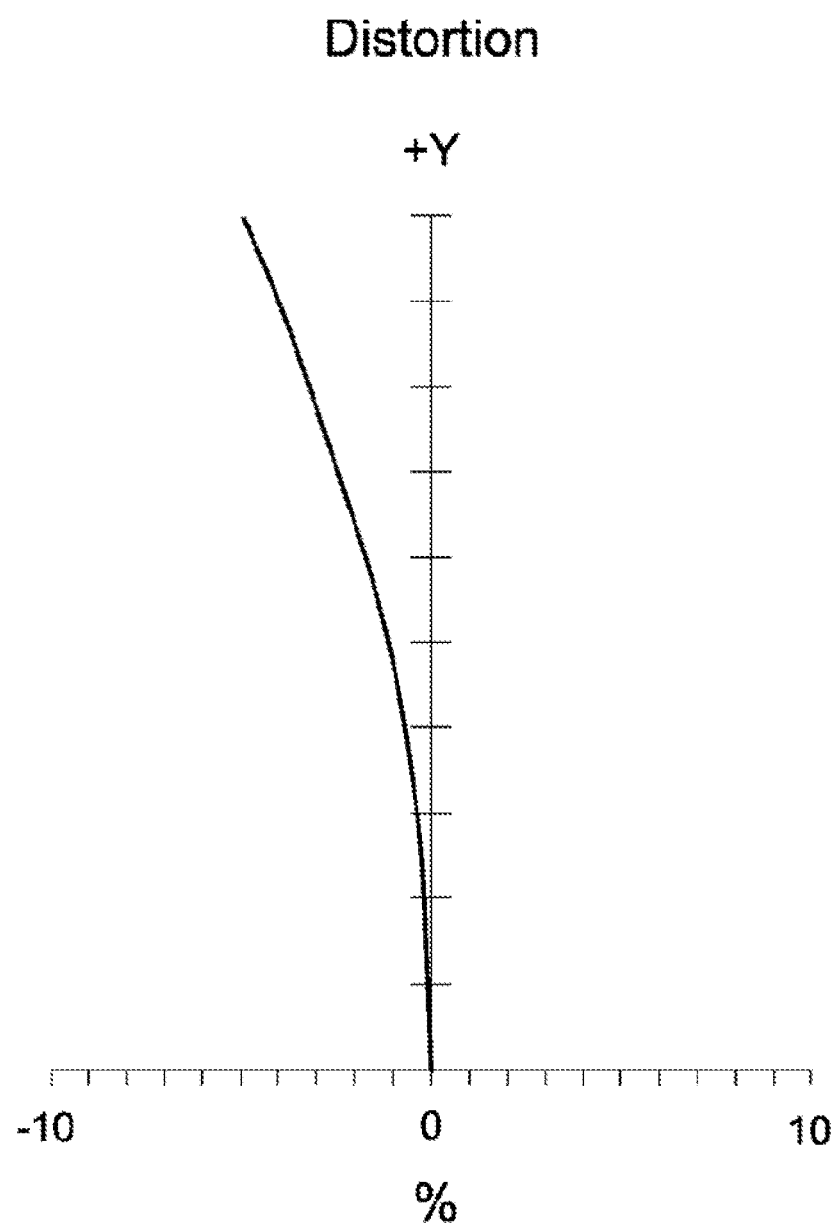
Figure 12C:
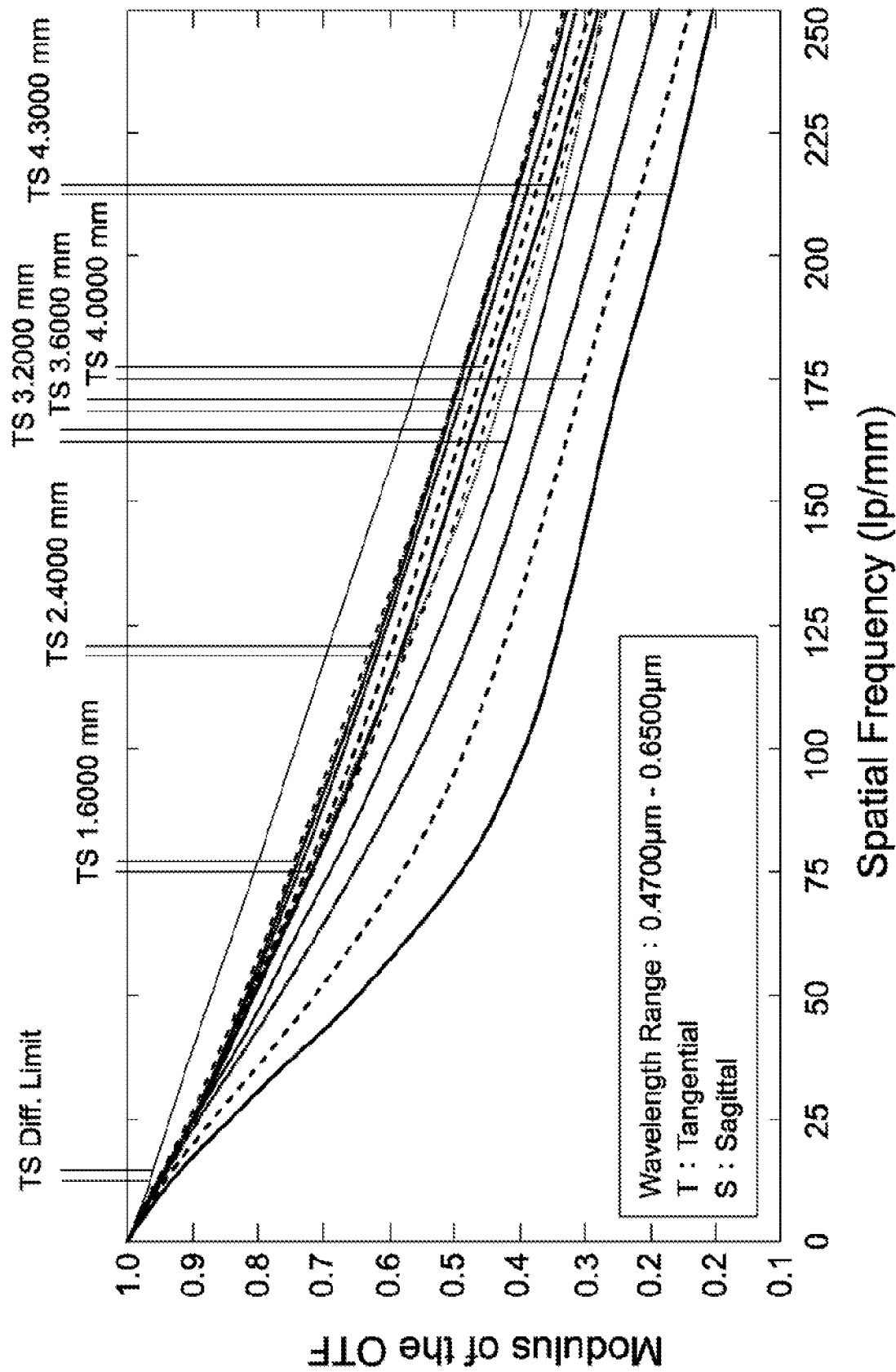

In addition, the lens assembly 7 of the seventh embodiment can meet the requirements of optical performance as seen in FIGS. 12A-12C. It can be seen from FIG. 12A that the field curvature of tangential direction and sagittal direction in the lens assembly 7 of the seventh embodiment ranges from −0.1 mm to 0.1 mm. It can be seen from FIG. 12B that the distortion in the lens assembly 7 of the seventh embodiment ranges from −5% to 0%. It can be seen from FIG. 12C that the modulation transfer function of tangential direction and sagittal direction in the lens assembly 7 of the seventh embodiment ranges from 0.11 to 1.0. It is obvious that the field curvature and the distortion of the lens assembly 7 of the seventh embodiment can be corrected effectively, the image resolution can meet the requirements. Therefore, the lens assembly 7 of the seventh embodiment is capable of good optical performance.

The lens assembly of the present invention can be provided with an image sensor on the image plane to capture image. Part of the pixel data of the image sensor can be cropped and then calculated by the image processing software to magnify the image. In other words, the image can be enlarged even without using optical zoom. In addition, the image captured by the optical zoom can also be cropped to only intercept part of the pixel data of the image sensor, and then calculated by the image processing software to magnify the image, making the image magnification is equal to the optical zoom magnification multiplied by the image cropping magnification, which also falls into the scope of the invention.

The lens assembly of the present invention can also add a beam splitter and at least two image sensors, wherein the beam splitter is disposed between the fifth lens group and the second side and the plurality of image sensors are disposed on one side of the beam splitter respectively. The beam splitter decomposes the visible light into at least two light beams according to different wavelength bandwidth, such as a red light, a green light and a blue light. The red light, green light, and blue light of specific wavelengths are then incident on the image sensors respectively to produce a red light image, a green light image, and a blue light image. The red, green, and blue images are then processed by image processing software to synthesize a visible light image, which can avoid insufficient brightness of the image caused by energy consumption after light splitting, so that the brightness of the visible light image is increased and the color is more realistic, which also falls into the scope of the invention.

Figure 13:
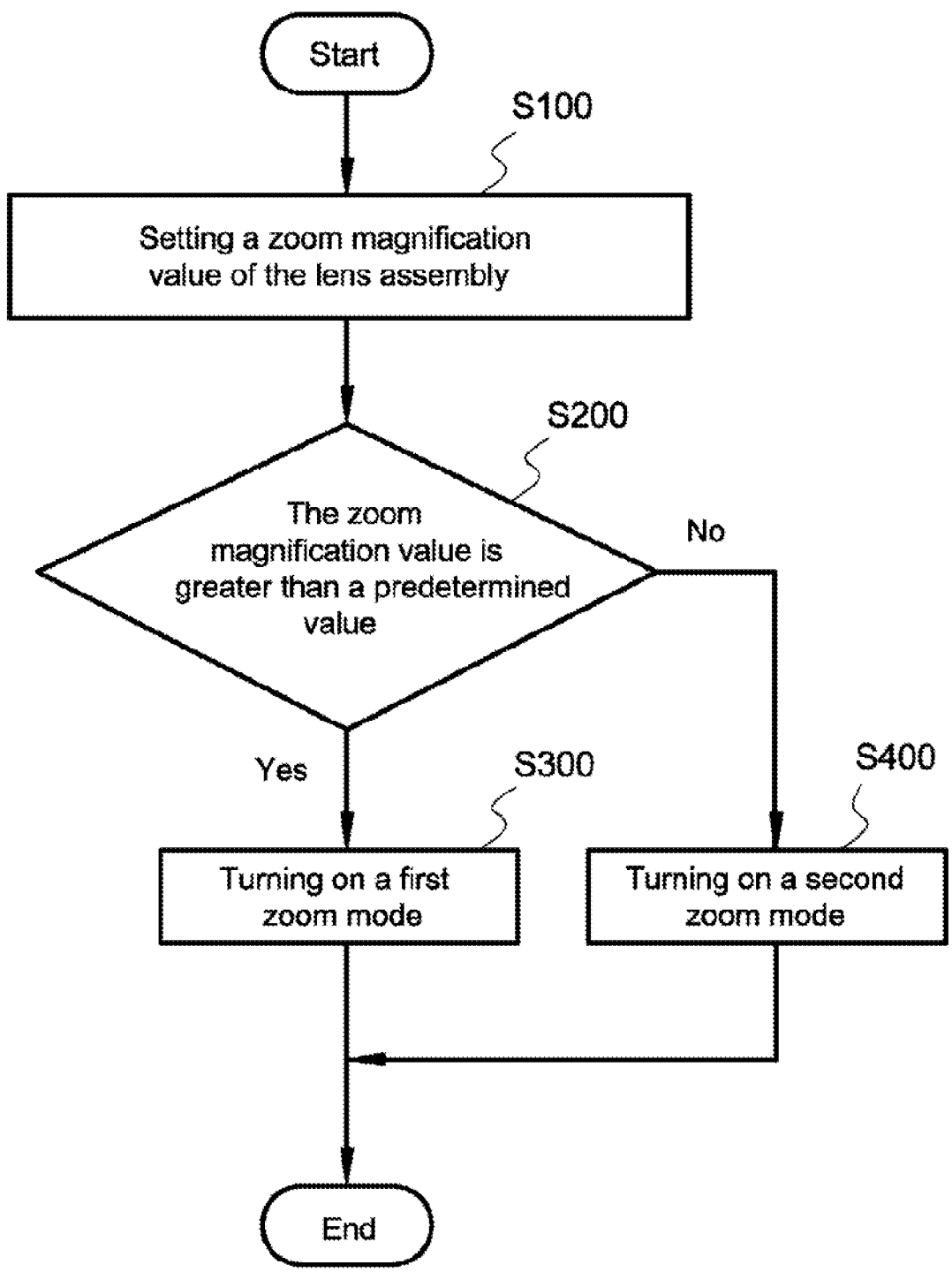
FIG. 13 is a flow chart of a zoom control method of the lens assembly in accordance with an embodiment of the invention.

Retelling to FIG. 13 The operation process of this embodiment is explained below with FIG. 13.

Step S100: Setting a zoom magnification value of the lens assembly. After the lens assembly is powered on, a zoom magnification value can be set, and the process goes to step S200.

Step S200: Determining whether a zoom magnification value is greater than a predetermined value. If the zoom magnification value is greater than the predetermined value (that is, high zoom magnification condition), step S300 is performed. If the zoom magnification value is less than or equal to the predetermined value, step S400 is performed.

Step S300: Turning on a first zoom mode for shooting. In this embodiment, the first zoom mode is an optical zoom mode.

Step S400: Turning on a second zoom mode for shooting. In this embodiment, the second zoom mode is an image cropping zoom mode.

In the present invention, a zoom magnification value can be selected through a touch screen and the zoom magnification value can be adjusted by the touch screen or keys. The user can select a zoom magnification value according to actual requirements. When receiving the zoom magnification value, a control unit of the lens assembly compares the zoom magnification value with a predetermined value (the predetermined value is, for example, four-times magnification) (Step S200). If the zoom magnification value is greater than the predetermined value (that is, high zoom magnification condition), the control unit will turn on a first zoom mode for shooting (Step S300). The first zoom mode changes the relative position of the lens group to perform optical zoom and captures clear images at high zoom magnification. If the zoom magnification value is less than the predetermined value (that is, low zoom magnification condition), the control unit will turn off the first zoom mode and turn on a second zoom mode for shooting (Step S400). The second zoom mode is an image cropping zoom mode for achieving image magnification and capturing clear images at low zoom magnification. According to the method of image cropping, the image sensor (not shown) located on the image plane outputs image with M×N pixels corresponding to a predetermined value, wherein M is a value on the long side and N is a value on the wide side of the image sensor. When the zoom magnification value is less than the predetermined value, the image sensor (not shown) takes the optical axis as the center of symmetry, and outputs image with P×Q pixels, wherein P is a value on the long side, Q is a value on the wide side, and the image pixel of P×Q is smaller than the image pixel of M×N.

In the above-mentioned embodiment, the initial value and the predetermined value of the zoom magnification value can be set in the lens assembly in advance by the manufacturer. However, the present invention is not limited thereto. It is understood that, in the present invention, the users can also adjust the predetermined value by themselves to meet personal usage habits.

As described, the first zoom mode is turned on in Step S300. In another embodiment of the zoom control method of the lens assembly of the present invention, the first zoom mode is not only an optical zoom mode. Instead, the first zoom mode can be a combination selected from an optical zoom mode and an image cropping zoom mode. For example, when a first zoom mode is executed in Step S300, an optical zoom mode is executed and then an image cropping zoom mode is executed. For another example, when a first zoom mode is executed in Step S300, an image cropping zoom mode is executed and then an optical zoom mode is executed. For another example, when a first zoom mode is executed in Step S300, an image cropping zoom mode is executed, an optical zoom mode is executed, and then another image cropping zoom mode is executed. However, the present invention is not limited thereto. Any combinations of executions of the optical zoom mode and the image cropping zoom mode are within the scope of the present invention. Further, it is understood that the same method can apply to Step S400.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens group which is with negative refractive power and comprises a 1-1 lens;
   a second lens group which is with positive refractive power and comprises a 2-1 lens;
   a third lens group which is with refractive power;
   a fourth lens group which is with refractive power; and
   a fifth lens group which is with refractive power;
   wherein the first lens group, the second lens group, the third lens group, the fourth lens group, and the fifth lens group are arranged in order from a first side to a second side along an axis;
   wherein the lens assembly further comprises a first reflective element disposed between the first lens group and the fifth lens group;
   wherein the first reflective element comprises a first reflective surface;
   wherein the lens assembly satisfies at least one of the following conditions:

$3 < TL1/D_{L4} < 8$;

$0 < TL2/D_{L4} < 4$;

$0 < D_{REF}/D_{MAX} < 2$;

$0.5 < TL1/TL2 < 3.5$;

$0.1 < D_{MAX}/TL1 < 0.8$;

$0.2 < D_{MAX}/TL2 < 1$;

$2 < TTL/D_{LOBJ} < 7$;

$4 < TTL/D_{LIMG} < 10$;

$4 < TL1/D_{RER} < 6$;

$1 < TL2/D_{REF} < 5$;

$80 < TC23_{WIDE}/TC23_{TELE} < 120$;

wherein $D_{L4}$ is an effective optical diameter of an object side surface of the 2-1 lens, $D_{REF}$ is an effective optical diameter of the first reflective surface, $D_{MAX}$ is a maximum effective optical diameter of all lenses, TL1 is an interval from an object side surface of the 1-1 lens to the first reflective surface along the axis, TL2 is an interval from the first reflective surface to an image plane along the axis, TTL is an interval from an object side surface of the lens closest to the first side to the image plane along the axis, $D_{LOBJ}$ is an effective optical diameter of the object side surface of the lens closest to the first side, $D_{LIMG}$ is an effective optical diameter of an object side surface of the lens closest to the second side, $TC23_{WIDE}$ is an interval from the first lens group to the second lens group along the axis when the lens assembly is at a wide-angle end, and $TC23_{TELE}$ is an interval from the first lens group to the second lens group along the axis when the lens assembly is at a telephoto end.

2. The lens assembly as claimed in claim 1, further comprising a first stop disposed between the first lens group and the fifth lens group, wherein the first stop comprises an inner circumferential portion and an outer circumferential portion, and the inner circumferential portion and the outer circumferential portion are non-circular.

3. The lens assembly as claimed in claim 2, wherein:
   the 1-1 lens is with negative refractive power and comprises a concave surface facing the first side along the axis;
   the 2-1 lens is a biconvex lens with positive refractive power and comprises a convex surface facing the first side along the axis and another convex surface facing the second side along the axis;
   the third lens group comprises a 3-1 lens which is with refractive power and comprises a convex surface facing the second side along the axis;
   the fourth lens group comprises a 4-1 lens which is with refractive power and comprises a convex surface facing the second side along the axis;
   the fifth lens group comprises a 5-1 lens which is with positive refractive power;
   the second lens group can move along the axis, the first lens group is fixed, and the third lens group and the fourth lens group are fixed or can move along the axis to perform zooming from a wide-angle end to a telephoto end for the lens assembly;
   the lens assembly further comprises a beam splitter and at least two image sensors, wherein the beam splitter is disposed between the fifth lens group and the second side, the image sensors are disposed on one side of the beam splitter respectively, and the beam splitter splits the visible light into at least two light beams with different bandwidths and the image sensors receive the light beams with different bandwidths respectively; and
   the second lens group further comprises the first stop, wherein the first stop is a variable stop and the 2-1 lens and the first stop are arranged in order from the first side to the second side along the axis.

4. The lens assembly as claimed in claim 3, wherein:
   the first lens group further comprises a 1-2 lens disposed between the 1-1 lens and the second lens group, wherein the 1-2 lens is a biconvex lens or a meniscus lens with positive refractive power, the 1-1 lens is a biconcave lens, and the 1-1 lens and the 1-2 lens are arranged in order from the first side to the second side along the axis; and
   the second lens group further comprises a 2-2 lens disposed between the first lens group and the 2-1 lens, wherein the 2-2 lens is a meniscus lens with negative refractive power and comprises a convex surface facing the first side along the axis and a concave surface facing the second side along the axis, and the 2-2 lens, the 2-1 lens, and the first stop are arranged in order from the first side to the second side along the axis.

5. The lens assembly as claimed in claim 4, wherein:
   the 1-2 lens is a biconvex lens and comprises a convex surface facing the first side along the axis and another convex surface facing the second side along the axis;
   the third lens group is with positive refractive power and further comprises a 3-2 lens disposed between the 3-1 lens and the fourth lens group, wherein the 3-2 lens is a meniscus lens with negative refractive power and comprises a concave surface facing the first side along the axis and a convex surface facing the second side along the axis, the 3-1 lens is a biconvex lens with positive refractive power and further comprises another convex surface facing the first side along the axis, and the 3-1 lens and the 3-2 lens are arranged in order from the first side to the second side along the axis;
   the fourth lens group is with negative refractive power, wherein the 4-1 lens is a meniscus lens with negative refractive power and further comprises a concave surface facing the first side along the axis; and the fifth lens group is with positive refractive power, wherein the 5-1 lens is a meniscus lens and comprises a convex surface facing the first side along the axis and a concave surface facing the second side along the axis.

6. The lens assembly as claimed in claim 4, wherein:

the 1-2 lens is a meniscus lens and comprises a convex surface facing the first side along the axis and a concave surface facing the second side along the axis;

the third lens group is with negative refractive power, wherein the 3-1 lens is a meniscus lens with negative refractive power and further comprises a concave surface facing the first side along the axis;

the fourth lens group is with positive refractive power, wherein the 4-1 lens is a biconvex lens with positive refractive power and further comprises another convex surface facing the first side along the axis; and the fifth lens group is with negative refractive power and further comprises a 5-2 lens disposed between the fourth lens group and the 5-1 lens, wherein the 5-2 lens is a biconcave lens or a meniscus lens with negative refractive power and the 5-1 lens is a biconvex lens or a meniscus lens.

7. The lens assembly as claimed in claim 6, wherein:

the 5-2 lens is a meniscus lens and comprises a concave surface facing the first side along the axis and a convex surface facing the second side along the axis; and the 5-1 lens is a meniscus lens and comprises a concave surface facing the first side along the axis and a convex surface facing the second side along the axis.

8. The lens assembly as claimed in claim 6, wherein:

the 5-2 lens is a biconcave lens and comprises a concave surface facing the first side along the axis and another concave surface facing the second side along the axis; and the 5-1 lens is a biconvex lens and comprises a convex surface facing the first side along the axis and another convex surface facing the second side along the axis.

9. The lens assembly as claimed in claim 4, further comprising a second reflective element disposed between the first side and the first lens group, wherein:

the second reflective element comprises a second reflective surface; and the fifth lens group can move along the axis to perform auto focus.

10. The lens assembly as claimed in claim 1, wherein the second lens group can move along the axis and the first lens group is fixed to perform zooming from a wide-angle end to a telephoto end for the lens assembly.

11. The lens assembly as claimed in claim 10, wherein:

the first lens group further comprises a 1-2 lens, wherein the 1-1 lens is a biconcave lens with negative refractive power and comprises a concave surface facing the first side along the axis, the 1-2 lens is a biconvex lens or a meniscus lens with positive refractive power, and the 1-1 lens and the 1-2 lens are arranged in order from the first side to the second side along the axis;

the second lens group comprises the 2-1 lens, and further comprises a 2-2 lens and a first stop, wherein the 2-2 lens is a meniscus lens with negative refractive power and comprises a convex surface facing the first side along the axis and a concave surface facing the second side along the axis, the 2-1 lens is a biconvex lens with positive refractive power and comprises a convex surface facing the first side along the axis and another convex surface facing the second side along the axis, the first stop is a variable stop, and the 2-2 lens, the 2-1 lens, and the first stop are arranged in order from the first side to the second side along the axis;

the third lens group comprises a 3-1 lens which is with refractive power and comprises a convex surface facing the second side along the axis;

the fourth lens group comprises a 4-1 lens which is with refractive power and comprises a convex surface facing the second side along the axis;

the fifth lens group comprises a 5-1 lens which is with positive refractive power;

the third lens group and the fourth lens group are fixed or can move along the axis;

the lens assembly further comprises a beam splitter and at least two image sensors, wherein the beam splitter is disposed between the fifth lens group and the second side, the image sensors are disposed on one side of the beam splitter respectively, and the beam splitter splits the visible light into at least two light beams with different bandwidths and the image sensors receive the light beams with different bandwidths respectively; and the first stop comprises an inner circumferential portion and an outer circumferential portion, wherein the inner circumferential portion and the outer circumferential portion are non-circular.

12. The lens assembly as claimed in claim 11, wherein:

the fifth lens group is with negative refractive power and further comprises a 5-2 lens disposed between the fourth lens group and the 5-1 lens, wherein the 5-2 lens is a meniscus lens and comprises a concave surface facing the first side along the axis and a convex surface facing the second side along the axis, the 5-1 lens is a meniscus lens and comprises a concave surface facing the first side along the axis and a convex surface facing the second side along the axis, or the 5-2 lens is a biconcave lens and comprises a concave surface facing the first side along the axis and another concave surface facing the second side along the axis, the 5-1 lens is a biconvex lens and comprises a convex surface facing the first side along the axis and another convex surface facing the second side along the axis.

13. The lens assembly as claimed in claim 11, further comprising a second reflective element disposed between the first side and the first lens group, wherein:

the second reflective element comprises a second reflective surface; and the fifth lens group can move along the axis to perform auto focus.

14. The lens assembly as claimed in claim 1, wherein the third lens group and the fourth lens group are fixed or can move along the axis.

15. The lens assembly as claimed in claim 1, wherein:

the 1-1 lens is with negative refractive power;

the 2-1 lens is with positive refractive power;

the second lens group further comprises a first stop and the first stop is a variable stop; and the 2-1 lens and the first stop are arranged in order from the first side to the second side along the axis.

16. The lens assembly as claimed in claim 15, wherein:

the 1-1 lens comprises a concave surface facing the first side along the axis;

the 2-1 lens is a biconvex lens and comprises a convex surface facing the first side along the axis and another convex surface facing the second side along the axis;

the third lens group comprises a 3-1 lens which is with refractive power and comprises a convex surface facing the second side along the axis;

the fourth lens group comprises a 4-1 lens which is with refractive power and comprises a convex surface facing the second side along the axis; and the fifth lens group comprises a 5-1 lens which is with positive refractive power.

17. A lens assembly comprising:
a first lens group which is with negative refractive power;
a second lens group which is with positive refractive power;
a third lens group which is with refractive power;
a fourth lens group which is with refractive power; and
a fifth lens group which is with refractive power;
wherein the first lens group, the second lens group, the third lens group, the fourth lens group, and the fifth lens group are arranged in order from a first side to a second side along an axis;
wherein the lens assembly further comprises a first reflective element disposed between the first lens group and the fifth lens group;
wherein the first reflective element comprises a first reflective surface;
wherein the first lens group further comprises a 1-1 lens which comprises a concave surface facing the first side along the axis;
wherein the second lens group further comprises a 2-1 lens which is a biconvex lens and comprises a convex surface facing the first side along the axis and another convex surface facing the second side along the axis;
wherein the third lens group further comprises a 3-1 lens which is with refractive power and comprises a convex surface facing the second side along the axis;
wherein the fourth lens group further comprises a 4-1 lens which is with refractive power and comprises a convex surface facing the second side along the axis;
wherein the fifth lens group further comprises a 5-1 lens which is with positive refractive power.

18. The lens assembly as claimed in claim 17, wherein the lens assembly satisfies at least one of the following conditions:

$3 < TL1/D_{LA} < 8$;

$0 < TL2/D_{LA} < 4$;

$0 < D_{REF}/D_{MAX} < 2$;

$0.5 < TL1/TL2 < 3.5$;

$0.1 < D_{MAX}/TL1 < 0.8$;

$0.2 < D_{MAX}/TL2 < 1$;

$2 < TTL/D_{LOBJ} < 7$;

$4 < TTL/D_{LIMG} < 10$;

$4 < TL1/D_{RER} < 6$;

$1 < TL2/D_{REF} < 5$;

$80 < TC23_{WIDE}/TC23_{TELE} < 120$;

wherein $D_{LA}$ is an effective optical diameter of an object side surface of the 2-1 lens, $D_{REF}$ is an effective optical diameter of the first reflective surface, $D_{MAX}$ is a maximum effective optical diameter of all lenses, TL1 is an interval from an object side surface of the 1-1 lens to the first reflective surface along the axis, TL2 is an interval from the first reflective surface to an image plane along the axis, TTL is an interval from an object side surface of the lens closest to the first side to the image plane along the axis, $D_{LOBJ}$ is an effective optical diameter of the object side surface of the lens closest to the first side, $D_{LIMG}$ is an effective optical diameter of an object side surface of the lens closest to the second side, $TC23_{WIDE}$ is an interval from the first lens group to the second lens group along the axis when the lens assembly is at a wide-angle end, and $TC23_{TELE}$ is an interval from the first lens group to the second lens group along the axis when the lens assembly is at a telephoto end.

19. A lens assembly comprising:
a first lens group which is with negative refractive power and comprises a 1-1 lens;
a second lens group which is with positive refractive power and comprises a 2-1 lens;
a third lens group which is with refractive power;
a fourth lens group which is with refractive power; and
a fifth lens group which is with refractive power;
wherein the first lens group, the second lens group, the third lens group, the fourth lens group, and the fifth lens group are arranged in order from a first side to a second side along an axis;
wherein the lens assembly further comprises a first reflective element disposed between the first lens group and the fifth lens group;
wherein the first reflective element comprises a first reflective surface;
wherein the lens assembly further comprising a beam splitter and at least two image sensors, wherein the beam splitter is disposed between the fifth lens group and the second side, the image sensors are disposed on one side of the beam splitter respectively, and the beam splitter splits the visible light into at least two light beams with different bandwidths and the image sensors receive the light beams with different bandwidths respectively.

20. The lens assembly as claimed in claim 19, wherein the lens assembly satisfies at least one of the following conditions:

$3 < TL1/D_{LA} < 8$;

$0 < TL2/D_{LA} < 4$;

$0 < D_{REF}/D_{MAX} < 2$;

$0.5 < TL1/TL2 < 3.5$;

$0.1 < D_{MAX}/TL1 < 0.8$;

$0.2 < D_{MAX}/TL2 < 1$;

$2 < TTL/D_{LOBJ} < 7$;

$4 < TTL/D_{LIMG} < 10$;

$4 < TL1/D_{RER} < 6$;

$1 < TL2/D_{REF} < 5$;

$80 < TC23_{WIDE}/TC23_{TELE} < 120$;

wherein $D_{LA}$ is an effective optical diameter of an object side surface of the 2-1 lens, $D_{REF}$ is an effective optical diameter of the first reflective surface, $D_{MAX}$ is a maximum effective optical diameter of all lenses, TL1 is an interval from an object side surface of the 1-1 lens to the first reflective surface along the axis, TL2 is an interval from the first reflective surface to an image plane along the axis, TTL is an interval from an object side surface of the lens closest to the first side to the image plane along the axis, $D_{LOBJ}$ is an effective optical diameter of the object side surface of the lens closest to the first side, $D_{LIMG}$ is an effective optical diameter of an object side surface of the lens closest to the second side, $TC23_{WIDE}$ is an interval from the first lens group to the second lens group along the axis when the lens assembly is at a wide-angle end, and $TC23_{TELE}$ is an interval from the first lens group to the second lens group along the axis when the lens assembly is at a telephoto end.

\* \* \* \* \*